United States Patent
Allen et al.

(10) Patent No.: US 6,944,787 B2
(45) Date of Patent: Sep. 13, 2005

(54) SYSTEM-MANAGED DUPLEXING OF COUPLING FACILITY STRUCTURES

(75) Inventors: Ruth A. Allen, Springfield, OR (US); Mark A. Brooks, Gaylordsville, CT (US); David A. Elko, Austin, TX (US); Michael J. Jordan, Hurley, NY (US); Georgette L. Kurdt, Wappingers Falls, NY (US); Catherine M. Moxey, Newbury (GB); William C. Neiman, Poughkeepsie, NY (US); Jeffrey M. Nick, West Park, NY (US); Kelly B. Pushong, Highland, NY (US); David H. Surman, Milton, NY (US)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 09/968,242

(22) Filed: Oct. 1, 2001

(65) Prior Publication Data

US 2003/0065971 A1 Apr. 3, 2003

(51) Int. Cl.[7] .................................................. G06F 11/16
(52) U.S. Cl. ..................... 714/4; 714/5; 714/6; 709/213
(58) Field of Search .............................. 714/4, 5, 6, 42, 714/43; 709/213–215, 217; 370/225, 276

(56) References Cited

U.S. PATENT DOCUMENTS

| | | | |
|---|---|---|---|
| 4,569,017 A | 2/1986 | Renner et al. .............. 364/200 |
| 4,674,036 A | 6/1987 | Conforti .................... 364/200 |
| 5,065,397 A | 11/1991 | Shiobara .................... 370/85.5 |
| 5,202,887 A | * 4/1993 | Ueno et al. ..................... 714/5 |
| 5,271,000 A | 12/1993 | Engbersen et al. ........... 370/13 |
| 5,317,739 A | 5/1994 | Elko et al. .................. 395/650 |
| 5,331,673 A | 7/1994 | Elko et al. .................. 395/575 |
| 5,339,405 A | 8/1994 | Elko et al. .................. 395/575 |
| 5,339,427 A | 8/1994 | Elko et al. .................. 395/725 |
| 5,343,461 A | 8/1994 | Barton et al. ................. 370/13 |
| 5,392,397 A | 2/1995 | Elko et al. .................. 395/200 |
| 5,398,331 A | 3/1995 | Huang et al. ............... 395/575 |
| 5,434,975 A | 7/1995 | Allen ......................... 395/200 |
| 5,450,590 A | 9/1995 | Elko et al. .................. 395/700 |

(Continued)

FOREIGN PATENT DOCUMENTS

| | | | |
|---|---|---|---|
| EP | WO9423367 | 10/1994 | .......... G06F/11/14 |
| EP | 817095 | 1/1998 | .......... G06F/13/40 |
| EP | 950954 | 10/1999 | .......... G06F/11/14 |
| FR | 2404970 | 6/1979 | .......... H04B/3/50 |

OTHER PUBLICATIONS

Chalmtac et al., "Performance Models of Asynchronous Multitrunk HYPERchannel Networks," *IEEE Trans. on Computers*, vol. C–36, No. 2, pp. 138–146, Feb. 1987 (Abstract only).

Thierer, M., "Reliability and Monitoring of Computer Controlled Arrangements,", Fernmelde–Praxis, vol. 51, No. 14, pp. 573–591, Jul. 24, 1991 (Abstract Only).

Elko et al., "Coupling Facility Serviceability–Event Notification of Link–Incident Records and Error Reporting", IBM Technical Disclosure Bulletin, vol. 38, No. 4, Apr. 1995, p. 173–181.

*Primary Examiner*—Robert Beausoliel
*Assistant Examiner*—Joseph D Manoskey
(74) *Attorney, Agent, or Firm*—Floyd A. Gonzalez, Esq.; Blanche E. Schiller, Esq.; Heslin Rothenberg Farley & Mesiti P.C.

(57) ABSTRACT

System-managed duplexing of coupling facility structures. A plurality of instances of coupling facility structures are maintained in a plurality of coupling facilities. Duplexing processing associated with the plurality of instances is managed by one or more operating systems, making many of the steps associated with duplexing transparent to the exploiters of the coupling facility structures. System-managed duplexing provides high availability for coupling facility structure data via a robust recovery mechanism (i.e., duplexing failover).

123 Claims, 18 Drawing Sheets

U.S. PATENT DOCUMENTS

| | | | |
|---|---|---|---|
| 5,457,793 A | 10/1995 | Elko et al. | 395/600 |
| 5,463,736 A | 10/1995 | Elko et al. | 395/848 |
| 5,465,359 A | 11/1995 | Allen et al. | 395/700 |
| 5,493,668 A | 2/1996 | Elko et al. | 395/457 |
| 5,515,499 A | 5/1996 | Allen et al. | 395/182.03 |
| 5,537,574 A | 7/1996 | Elko et al. | 395/468 |
| 5,561,809 A | 10/1996 | Elko et al. | 395/800 |
| 5,574,849 A | 11/1996 | Sonnier et al. | 395/182.1 |
| 5,574,945 A | 11/1996 | Elko et al. | 395/825 |
| 5,581,737 A | 12/1996 | Dahlen et al. | 395/497.01 |
| 5,604,863 A | 2/1997 | Allen et al. | 395/182.09 |
| 5,608,865 A | 3/1997 | Midgely et al. | 395/180 |
| 5,630,050 A | 5/1997 | Neuhard et al. | 395/183.03 |
| 5,634,072 A | 5/1997 | Allen et al. | 396/674 |
| 5,664,155 A | 9/1997 | Elko et al. | 711/170 |
| 5,668,943 A * | 9/1997 | Attanasio et al. | 714/4 |
| 5,689,689 A | 11/1997 | Meyers et al. | 395/553 |
| 5,706,432 A | 1/1998 | Elko et al. | 395/200.08 |
| 5,712,856 A | 1/1998 | Finney et al. | 371/20.1 |
| 5,737,600 A | 4/1998 | Geiner et al. | 395/616 |
| 5,742,830 A | 4/1998 | Elko et al. | 395/728 |
| 5,751,955 A | 5/1998 | Sonnier et al. | 395/200.19 |
| 5,761,739 A | 6/1998 | Elko et al. | 711/171 |
| 5,790,776 A | 8/1998 | Sonnier et al. | 395/189.08 |
| 5,860,115 A | 1/1999 | Neuhard et al. | 711/147 |
| 5,881,238 A | 3/1999 | Aman et al. | 395/200.56 |
| 5,887,135 A | 3/1999 | Dahlen et al. | 395/200.8 |
| 5,892,970 A | 4/1999 | Hagersten | 395/825 |
| 5,923,890 A | 7/1999 | Kubala et al. | 395/800.01 |
| 5,948,060 A | 9/1999 | Gregg et al. | 709/212 |
| 5,963,976 A * | 10/1999 | Ogawa et al. | 714/6 |
| 6,061,807 A | 5/2000 | Albert et al. | 714/3 |
| 6,080,203 A | 6/2000 | Njinda et al. | 716/4 |
| 6,158,031 A | 12/2000 | Mack et al. | 714/724 |
| 6,178,421 B1 | 1/2001 | Dahlen et al. | 707/8 |
| 6,230,243 B1 | 5/2001 | Elko et al. | 711/130 |
| 6,233,644 B1 | 5/2001 | Dahlen et al. | 710/200 |
| 2002/0138704 A1 * | 9/2002 | Hiser et al. | 714/6 |

* cited by examiner

REBUILD PROCESS TYPES MATRIX

| | USER-MANAGED _204_ | SYSTEM-MANAGED _206_ |
|---|---|---|
| REBUILD _200_ | _208_<br>• "CLASSIC" STRUCTURE REBUILD PROCESS<br>• BASIC REBUILD SETXCF AND D XCF EXTERNALS | _210_<br>• PROGRAMMING INTERFACES FOR SYSTEM-MANAGED PROCESS ENABLEMENT<br>• INTERNALIZATION OF REBUILD PHASE PROCESSING, "SYSTEM" MANAGEMENT<br>• PLANNED RECONFIGURATION |
| DUPLEXING REBUILD _202_ | _212_<br>• "DB2 GBP DUPLEXING"<br>• BASIC DUPLEXING SETXCF AND D XCF EXTERNALS<br>• BASIC CFRM POLICY CONTROLS FOR DUPLEXING<br>• CONCEPTS OF DUPLEX ESTABLISHED, "FAILOVER" | _214_<br>• HARDWARE/LIC ASSISTED CF STRUCTURE DUPLEXING<br>• CF REQUEST SPLITTING AND MERGING FOR OPERATION TRANSPARENCY<br>• FAILOVER TRANSPARENCY | fig. 2

SYSTEM-MANAGED DUPLEXING OF COUPLING FACILITY STRUCTURES

CROSS-REFERENCE TO RELATED APPLICATIONS/PATENTS

This application contains subject matter which is related to the subject matter of the following applications/patents, each of which is assigned to the same assignee as this application. Each of the below listed applications/patents is hereby incorporated herein by reference in its entirety:

"TEST TOOL AND METHOD FOR FACILITATING TESTING OF DUPLEXED COMPUTER FUNCTIONS", Jones et al., Ser. No. 09/968,420, filed Oct. 01, 2001;

"RESTARTING A COUPLING FACILITY COMMAND USING A TOKEN FROM ANOTHER COUPLING FACILITY COMMAND", Elko et al., Ser. No. 09/968,729, filed Oct. 01, 2001;

"DYNAMICALLY DETERMINING WHETHER TO PROCESS REQUESTS SYNCHRONOUSLY OR ASYNCHRONOUSLY", Jordan et al., Ser. No. 09/968,185, filed Oct. 01, 2001;

"MANAGING THE STATE OF COUPLING FACILITY STRUCTURES", Elko et al., Ser. No. 09/968,248, filed Oct. 01, 2001;

"SYNCHRONIZING PROCESSING OF COMMANDS INVOKED AGAINST DUPLEXED COUPLING FACILITY STRUCTURES", Elko et al., Ser. No. 09/968,179, filed Oct. 01, 2001;

"COUPLING OF A PLURALITY OF COUPLING FACILITIES USING PEER LINKS", Brooks et al., Ser. No. 09/968,244, filed Oct. 01, 2001;

"METHOD, SYSTEM AND PROGRAM PRODUCTS FOR PROVIDING USER-MANAGED DUPLEXING OF COUPLING FACILITY CACHE STRUCTURES", Elko et al., Ser. No. 09/255,382, filed Feb. 22, 1999;

"CASTOUT PROCESSING FOR DUPLEXED CACHE STRUCTURES", Elko et al., Ser. No. 09/255,383, filed Feb. 22, 1999;

"SYSTEM-MANAGED REBUILD OF COUPLING FACILITY STRUCTURES", Allen et al., Ser. No. 09/378,780, filed Aug. 23, 1999;

"METHOD, SYSTEM AND PROGRAM PRODUCTS FOR COPYING COUPLING FACILITY STRUCTURES", Allen et al., Ser. No. 09/379,054, filed Aug. 23, 1999;

"METHOD, SYSTEM AND PROGRAM PRODUCTS FOR MODIFYING COUPLING FACILITY STRUCTURES", Brooks et al., Ser. No. 09/379,435, filed Aug. 23, 1999;

"DIRECTED ALLOCATION OF COUPLING FACILITY STRUCTURES", Dahlen et al., Ser. No. 09/378,861, filed Aug. 23, 1999;

"METHOD, SYSTEM AND PROGRAM PRODUCTS FOR COPYING COUPLING FACILITY LOCK STRUCTURES", Allen et al., Ser. No. 09/379,053, filed Aug. 23, 1999;

"METHOD OF CONTROLLING THE FLOW OF INFORMATION BETWEEN SENDERS AND RECEIVERS ACROSS LINKS BEING USED AS CHANNELS", Gregg et al. Ser. No. 09/151,051, filed Sep. 10, 1998;

"SYSTEM OF CONTROLLING THE FLOW OF INFORMATION BETWEEN SENDERS AND RECEIVERS ACROSS LINKS BEING USED AS CHANNELS", Gregg et al. Ser. No. 09/150,942, filed Sep. 10, 1998;

"SYSTEM OF PERFORMING PARALLEL CLEANUP OF SEGMENTS OF A LOCK STRUCTURE LOCATED WITHIN A COUPLING FACILITY", Dahlen et al., U.S. Pat. No. 6,233,644 B1, issued May 15, 2001;

"MULTI CHANNEL INTER-PROCESSOR COUPLING FACILITY PROCESSING RECEIVED COMMANDS STORED IN MEMORY ABSENT STATUS ERROR OF CHANNELS", Elko et al., U.S. Pat. No. 5,574,945, issued Nov. 12, 1996;

"METHOD, SYSTEM AND PROGRAM PRODUCTS FOR MANAGING CHANGED DATA OF CASTOUT CLASSES", Elko et al., U.S. Pat. No. 6,230,243 B1, issued May 8, 2001;

"METHOD AND SYSTEM FOR CAPTURING AND CONTROLLING ACCESS TO INFORMATION IN A COUPLING FACILITY", Neuhard et al., U.S. Pat. No. 5,630,050, issued May 13, 1997;

"DYNAMICALLY ASSIGNING A DUMP SPACE IN A SHARED DATA FACILITY TO RECEIVE DUMPING INFORMATION TO BE CAPTURED", Elko et al., U.S. Pat. No. 5,664,155, issued Sep. 2, 1997;

"METHOD AND APPARATUS FOR DISTRIBUTED LOCKING OF SHARED DATA, EMPLOYING A CENTRAL COUPLING FACILITY", Elko et al., U.S. Pat. No. 5,339,427, issued Aug. 16, 1994;

"METHOD AND SYSTEM FOR LOG MANAGEMENT IN A COUPLED DATA PROCESSING SYSTEM", Geiner et al., U.S. Pat. No. 5,737,600, issued Apr. 7, 1998;

"METHOD OF PERFORMING PARALLEL CLEANUP OF SEGMENTS OF A LOCK STRUCTURE", Dahlen et al., U.S. Pat. No. 6,178,421 B1, issued Jan. 23, 2001;

"SPEEDING-UP COMMUNICATION RATES ON LINKS TRANSFERRING DATA STRUCTURES BY A METHOD OF HANDING SCATTER/GATHER OF STORAGE BLOCKS IN COMMANDED COMPUTER SYSTEMS", Gregg et al., U.S. Pat. No. 5,948,060, issued Sep. 7, 1999;

"METHOD OF MANAGING RESOURCES IN ONE OR MORE COUPLING FACILITIES COUPLED TO ONE OR MORE OPERATING SYSTEMS IN ONE OR MORE CENTRAL PROGRAMMING COMPLEXES USING A POLICY", Allen et al., U.S. Pat. No. 5,634,072, issued May 27, 1997;

"METHOD AND APPARATUS FOR OPTIMIZING THE HANDLING OF SYNCHRONOUS REQUESTS TO A COUPLING FACILITY IN A SYSPLEX CONFIGURATION", Kubala et al., U.S. Pat. No. 5,923,890, issued Jul. 13, 1999;

"METHOD FOR RECEIVING MESSAGES AT A COUPLING FACILITY", Elko et al., U.S. Pat. No. 5,706,432, issued Jan. 6, 1998;

"COMMAND EXECUTION SYSTEM FOR USING FIRST AND SECOND COMMANDS TO RESERVE AND STORE SECOND COMMAND RELATED STATUS INFORMATION IN MEMORY PORTION RESPECTIVELY", Elko et al., U.S. Pat. No. 5,392,397, issued Feb. 21, 1995;

"SOFTWARE CACHE MANAGEMENT OF A SHARED ELECTRONIC STORE IN A SUPPLEX", Elko et al., U.S. Pat. No. 5,457,793, issued Oct. 10, 1995;

"REQUESTING A DUMP OF INFORMATION STORED WITHIN A COUPLING FACILITY, IN WHICH THE DUMP INCLUDES SERVICEABILITY INFORMATION FROM AN OPERATING SYSTEM THAT LOST COMMUNICATION WITH THE COUPLING FACILITY", Neuhard et al, U.S. Pat. No. 5,860,115, issued Jan. 12, 1999;

"AUTHORIZATION METHOD FOR CONDITIONAL COMMAND EXECUTION", Elko et al, U.S. Pat. No. 5,450,590, issued Sep. 12, 1995;

"IN A MULTIPROCESSING SYSTEM HAVING A COUPLING FACILITY, COMMUNICATING MESSAGES BETWEEN THE PROCESSORS AND THE COUPLING FACILITY IN EITHER A SYNCHRONOUS OPERATION OR AN ASYNCHRONOUS OPERATION", Elko et al., U.S. Pat. No. 5,561,809, issued Oct. 1, 1996;

"COUPLING FACILITY FOR RECEIVING COMMANDS FROM PLURALITY OF HOSTS FOR ACTIVATING SELECTED CONNECTION PATHS TO I/O DEVICES AND MAINTAINING STATUS THEREOF", Elko et al., U.S. Pat. No. 5,463,736, issued Oct. 31, 1995;

"METHOD AND SYSTEM FOR MANAGING DATA AND USERS OF DATA IN A DATA PROCESSING SYSTEM", Allen et al., U.S. Pat. No. 5,465,359, issued Nov. 7, 1995;

"METHODS AND SYSTEMS FOR CREATING A STORAGE DUMP WITHIN A COUPLING FACILITY OF A MULTISYSTEM ENVIRONMENT", Elko et al., U.S. Pat. No. 5,761,739, issued Jun. 2, 1998;

"METHOD AND APPARATUS FOR COUPLING DATA PROCESSING SYSTEMS", Elko et al., U.S. Pat. No. 5,317,739, issued May 31, 1994;

"METHOD AND APPARATUS FOR EXPANSION, CONTRACTION, AND REAPPORTIONMENT OF STRUCTURED EXTERNAL STORAGE STRUCTURES", Dahlen et al., U.S. Pat. No. 5,581,737, issued Dec. 3, 1996;

"SYSPLEX SHARED DATA COHERENCY METHOD", Elko et al., U.S. Pat. No. 5,537,574, issued Jul. 16, 1996;

"MULTIPLE PROCESSOR SYSTEM HAVING SOFTWARE FOR SELECTING SHARED CACHE ENTRIES ON AN ASSOCIATED CASTOUT CLASS FOR TRANSFER TO A DASD WITH ONE I/O OPERATION", Elko et al., U.S. Pat. No. 5,493,668, issued Feb. 20, 1996;

"INTEGRITY OF DATA OBJECTS USED TO MAINTAIN STATE INFORMATION FOR SHARED DATA AT A LOCAL COMPLEX", Elko et al., U.S. Pat. No. 5,331,673, issued Jul. 19, 1994;

"COMMAND QUIESCE FUNCTION", Elko et al., U.S. Pat. No. 5,339,405, issued Aug. 16, 1994;

"METHOD AND APPARATUS FOR PERFORMING CONDITIONAL OPERATIONS ON EXTERNALLY SHARED DATA", Elko et al., U.S. Pat. No. 5,742,830, issued Apr. 21, 1998;

"METHOD AND SYSTEM FOR RECONFIGURING A STORAGE STRUCTURE WITHIN A STRUCTURE PROCESSING FACILITY", Allen et al., U.S. Pat. No. 5,515,499, issued May 7, 1996;

"METHOD FOR COORDINATING EXECUTING PROGRAMS IN A DATA PROCESSING SYSTEM", Allen et al., U.S. Pat. No. 5,604,863, issued Feb. 18, 1997; and "SYSTEM AND METHOD FOR MANAGEMENT OF OBJECT TRANSITIONS IN AN EXTERNAL STORAGE FACILITY ACCESSED BY ONE OR MORE PROCESSORS", Dahlen et al., U.S. Pat. No. 5,887,135, issued Mar. 23, 1999.

TECHNICAL FIELD

This invention relates, in general, to data processing within a distributed computing environment, and in particular, to system-managed duplexing of coupling facility structures and of commands used to access those structures.

BACKGROUND OF THE INVENTION

Some distributed computing environments, such as Parallel Sysplexes, today provide a non-volatile shared storage device called the coupling facility, that includes multiple storage structures of either the cache or list type. These structures provide unique functions for the operating system and middleware products employed for the efficient operation of a Parallel Sysplex. For example, the cache structures provide directory structures and cross-invalidation mechanisms to maintain buffer coherency for multisystem databases, as well as a fast write medium for database updates. These are used by, for instance, the data sharing versions of DB2 and IMS, offered by International Business Machines Corporation, Armonk, N.Y.

The list structures provide many diverse functions. One such list structure function is to provide for high-performance global locking, and this function is exploited by such products as the IMS Resource Lock Manager (IRLM) and the Global Resource Serialization (GRS) function in OS/390, offered by International Business Machines Corporation, Armonk, N.Y. Another list structure function is to provide a message passing mechanism with storage for maintaining multiple messages on a per system basis and a mechanism for notifying a system of the arrival of new messages. This function is exploited by the XCF component of OS/390, which in turn is exploited by numerous multisystem applications for providing a capability to pass messages between their various instances. A third list structure function is to provide for shared queue structures that can be ordered and accessed by LIFO/FIFO ordering, by key, or by name. Workload Manager (WLM), IMS Shared Message Queues and MQ Series, all offered by International Business Machines Corporation, Armonk, N.Y., are examples of exploiters of this feature. While these functions provide examples of the list structure uses, other uses exist.

Various components of a Parallel Sysplex have been documented in numerous applications/patents, which are listed above and hereby incorporated herein by reference in their entirety. The capabilities defined in some of those patents provide the basic system structure to create and manage cache and list structure instances. Additionally, various of the applications/patents listed above provide extensions to the base functions of the Parallel Sysplex.

In order to increase the robustness of coupling facility structures, over the years, various processes have been introduced that enable coupling facility structures to be rebuilt either for a planned reconfiguration or in response to a failure. Examples of these rebuild processes are described below:

User-managed rebuild
    User-managed rebuild allows the operating system to coordinate a structure rebuild process with the active connected users of the structure, in which those connectors participate in the steps of allocating a new structure instance, propagating the necessary structure data to the new structure, and switching over to using the new structure instance.
    User-managed rebuild provides both a planned reconfiguration capability and, in most cases, a robust failure recovery capability for coupling facility structure data, but often requires prodigious amounts of support from the structure connectors (adding to the overall cost of exploiting the coupling facility to provide data sharing functions). Furthermore, in some cases, it is impossible or impractical for the structure connectors to reconstruct the structure data, when it is lost as a result of a hard failure (such as a coupling facility failure or structure failure). This is particularly true when the structure is lost in conjunction with the simultaneous loss of one or more of the active connectors to the structure, where the connectors' protocol for rebuilding the structure requires each of the active connectors to provide some portion of the data in order to reconstruct the complete contents of the structure that was lost. In such cases, user-managed rebuild does not provide a robust failure recovery capability.

User-managed duplexing rebuild

User-managed duplexing rebuild allows the operating system to coordinate a structure rebuild process with the active connected users of the structure, in which those connectors participate in the steps of allocating a new structure instance, propagating the necessary structure data to the new structure, but then keeping both structure instances allocated indefinitely. Having thus created a duplexed copy of the structure, the connectors may then proceed to duplex their ongoing structure updates into both structure instances, using their own unique serialization or other protocols for ensuring synchronization of the data in the two structure instances.

User-managed duplexing rebuild addresses the shortcoming noted above for user-managed rebuild, in which it may be impossible or impractical for the structure exploiters to reconstruct the structure data when it is lost as a result of a failure. With user-managed duplexing, the exploiter can build and maintain a duplexed copy of the data in advance of any failure, and then when a failure occurs, switch over to using the unaffected structure instance in simplex mode. User-managed duplexing rebuild thus provides a robust failure recovery capability, but it does not address (and may in fact aggravate) the problem of requiring prodigious amounts of exploiter support from the structure connectors. Note also that user-managed duplexing is limited to cache structures only; list and lock structures are not supported.

System-managed rebuild

System-managed rebuild allows the operating system to internalize many aspects of the user-managed rebuild process that formerly required explicit support and participation from the connectors. In this processing, the operating system internally allocates the new structure and propagates the necessary structure data to the new structure, then switches over to using the new structure instance.

System-managed rebuild is only able to propagate the data to the new structure by directly copying it, so that system-managed rebuild provides only a planned reconfiguration capability; it is not capable of rebuilding the structure in failure scenarios, and thus, does not provide a robust failure recovery mechanism. However, by internalizing many of the "difficult" steps in the rebuild process into the operating system and taking them out of the hands of the exploiters, system-managed rebuild greatly simplifies the requirements on the structure exploiters, drastically reducing the development and test cost for the exploiters to provide a planned-reconfiguration rebuild capability.

Based on the foregoing, a need still exists for a system-managed duplexing capability. That is, a need exists for a duplexing capability that is managed by the operating system and largely transparent to the users of the system. Further, a need exists for a duplexing capability that enables duplexing of the various types of coupling facility structures, including cache, list and lock structures.

SUMMARY OF THE INVENTION

The shortcomings of the prior art are overcome and additional advantages are provided through the provision of a method of duplexing coupling facility structures. The method includes, for instance, creating, independent of user control, an instance of a coupling facility structure, wherein the instance of the coupling facility structure and another instance of the coupling facility structure co-exists; and processing a command against the instance of the coupling facility structure and the another instance of the coupling facility structure.

In a further aspect of the present invention, a method of facilitating access to coupling facility structures is provided. The method includes, for instance, splitting a command to be processed against a duplexed coupling facility structure into multiple instances of the command; and forwarding at least a plurality of instances of the multiple instances of the command to a plurality of instances of the duplexed coupling facility structure.

In yet a further aspect of the present invention, a method of providing duplexing within a computing environment is provided. The method includes, for instance, duplexing a coupling facility structure, wherein one instance of the coupling facility structure is located within one coupling facility of the computing environment and another instance of the coupling facility structure is located within another coupling facility of the computing environment, the one coupling facility and the another coupling facility being coupled via one or more CF-to-CF connections; splitting a command to be processed against the coupling facility structure into one command instance and another command instance; forwarding, substantially in parallel, the one command instance to the one instance of the coupling facility structure and the another command instance to the another instance of the coupling facility structure; and processing the one command instance and the another command instance.

In one embodiment, the method further includes receiving responses from the one command instance and the another command instance; merging the responses into one response; and forwarding the one response to a requester of the command.

In another aspect of the present invention, a method of monitoring processing modes of coupling facility structures is provided. The method includes, for instance, determining whether a coupling facility structure processing in simplex mode is to be processed in duplex mode; and automatically initiating duplexing of the coupling facility structure, in response to the determining indicating that the coupling facility structure is to be processed in duplex mode.

In yet a further aspect of the present invention, a method of managing processing associated with coupling facility structures is provided. The method includes, for instance, determining that a mode of processing associated with a coupling facility structure is to be altered; and altering, independent of user control, the mode of processing associated with the coupling facility structure, in response to the determining.

In still yet another aspect of the present invention, a method of managing connections to coupling facility structures is provided. The method includes, for instance, determining whether a potential connector has connectivity to one instance of a duplexed coupling facility structure or to the one instance and another instance of the duplexed coupling facility structure; and connecting the potential connector to the one instance or to the one instance and the another instance, in response to the determining, wherein the connecting is managed independent of the potential connector.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 illustrates a matrix of four rebuild process types, in accordance with an aspect of the present invention;

BEST MODE FOR CARRYING OUT THE INVENTION

In accordance with one or more aspects of the present invention, a system-managed duplexing capability is provided, in which one or more coupling facility structures of a computing environment are duplexed under the control of one or more operating systems of the environment.

At a high level, coupling facility duplexing includes creating a second, duplex copy of an existing coupling facility structure, in another coupling facility. Relevant data and content from the original coupling facility structure is replicated in the duplexed copy. This duplexed copy is established initially in advance of any failure which might affect the structure or compromise the data that the structure contains. Then, the operating system maintains the duplex pair of structures in a synchronized, duplexed state during normal operation, as the structure's exploiter performs coupling facility operations that update the structure's content. In effect, coupling facility operations that have the potential to modify coupling facility structure data, or other structure objects, are replicated to both structures, so that the updates can be made in a coordinated way in both structure instances.

In one aspect, coupling facility duplexing is to provide a robust failure recovery capability through the ability to failover to the unaffected structure instance at any time, whenever a failure of any kind affects one of the two duplexed structure instances. Another aspect is to internalize many of the difficult steps that formerly required coupling facility exploiter support and participation (e.g., in user-managed duplexing rebuild processes) into the operating system, thereby greatly reducing the exploiter's cost to provide a structure duplexing capability relative to the previous techniques (e.g., user-managed duplexing rebuild).

System-managed duplexing rebuild thus provides both a robust failure recovery capability for coupling facility structure data and content via the redundancy of duplexing, and at the same time, low exploitation cost via system-managed, internalized processing. Additionally, unlike user-managed duplexing rebuild, which supports only cache structures, system-managed duplexing rebuild supports all types of coupling facility structures (including list and lock structures, as well as cache structures).

Figure 1:
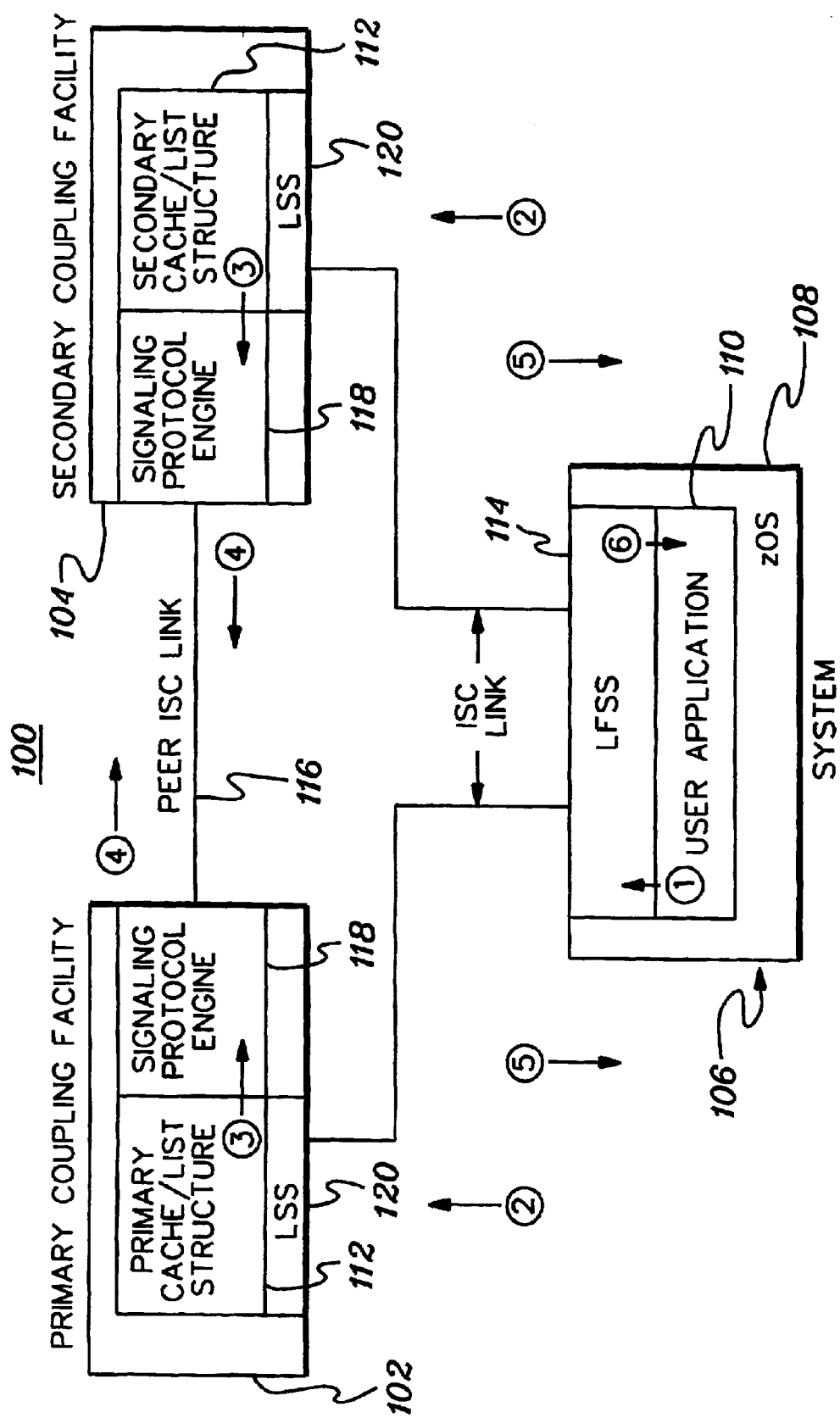
FIG. 1 depicts one embodiment of a computing environment incorporating and using one or more aspects of the present invention.

One embodiment of a computing environment incorporating and using one or more aspects of the present invention is depicted in FIG. 1 and described herein.

FIG. 1 depicts one embodiment of a configuration 100, which includes two coupling facilities 102, 104 coupled to a system 106 in a Parallel Sysplex. In one example, the system is running an instance of the z/OS operating system 108, offered by International Business Machines Corporation, Armonk, N.Y. Further, in one example, the system is running an application 110 that is coupled to a coupling facility structure 112 (either of a cache or list type), whose location is not known to the application. The actual physical connection is managed by a Locking Facility Support Services (LFSS) component 114 of the z/OS operating system and commands initiated by the user application flow through the LFSS component.

Two instances of the coupling facility structure are maintained in separate coupling facilities, referred to as the primary coupling facility and the secondary coupling facility. A CF-to-CF connection 116 (e.g., a peer connection), such as an Intersystem Channel (ISC) link, couples the two coupling facilities. The peer ISC link can transmit both primary message commands and secondary message commands in either direction. This may be physically represented by either two unidirectional links, one with a sender channel on the primary coupling facility and a receiver channel on the secondary coupling facility, and the second link oppositely configured. This may also be represented by a single physical link where the channel interface in each coupling facility supports both sender and receiver functionality. This latter capability exists in ISC3 links and their variants: ICB3 and IC3, all of which are offered by International Business Machines Corporation, Armonk, N.Y.

The peer ISC link between the coupling facilities is used, for instance, to exchange message path commands on the primary message command interface to configure and couple the two coupling facilities. Once configured and coupled, the peer ISC link is also used to send secondary commands of the list-notification type to exchange signals as part of a signaling protocol for duplexed command execution. The sending and receiving of these secondary commands is managed by a coupling facility component called a signaling protocol engine 118. Requests by the cache and list component of the coupling facility for sending and receiving duplexing signals flow through the signaling protocol engine.

One embodiment of the steps in a normal command execution for the coupling facility-to-coupling facility duplexing model are shown in FIG. 1 in numeric sequence that approximates the time sequence of the command. In these steps, various components of the signaling protocol are described. Further details regarding the signaling protocol are described in detail in a co-filed patent application entitled "Coupling Of A Plurality Of Coupling Facilities Using Peer Links," Brooks et al., Ser. No. 09/968,244, which is hereby incorporated herein by reference in its entirety.

Step 1. The user application generates a command and communicates this command to the LFSS through a system macro interface.

Step 2. The LFSS creates two copies of the command, sending one to the primary coupling facility and the second to the secondary coupling facility. The LFSS uses an asynchronous SEND MESSAGE interface without notification to allow the two commands to be initiated in parallel. The LFSS also sets a synchronous completion on initial status (SCIS) bit of the SEND MESSAGE to minimize the effects of any busy conditions encountered on the channel interface. A link-subsystem (LSS) component 120 of the coupling facility control code (CFCC) in the primary coupling facility receives the command and transfers control to the cache or list component, as appropriate. Likewise, the link-subsystem (LSS) component in the secondary coupling facility receives the command and transfers control to the cache or list component, as appropriate.

Step 3. The cache/list component of the primary coupling facility executes the command to the point where a message response block (MRB) would be returned to the application. But, before sending the MRB and while the internal latches are held for the objects referenced by the command, a request is made to the signaling protocol engine in the primary coupling facility to send a completion signal on the peer ISC link to the secondary coupling facility. Likewise, the cache/list component of the secondary coupling facility executes the command to the point where the MRB would be returned to the application. But, before sending the MRB and while the internal latches are held for the objects referenced by the command, a request is made to the signaling protocol engine in the secondary coupling facility to send a completion signal on the peer ISC link to the primary coupling facility.

Step 4. The signaling protocol engine in the primary coupling facility sends the completion signal to the secondary coupling facility and then waits for the reception of the completion signal from the secondary coupling facility. Likewise, the signaling protocol engine in the secondary coupling facility sends the completion signal to the primary coupling facility and then waits for the reception of the completion signal from the primary coupling facility.

Step 5. When the primary coupling facility recognizes the reception of the completion signal from the secondary coupling facility, the primary coupling facility sends the MRB and releases the latches. Likewise, when the secondary coupling facility recognizes the reception of the completion signal from the primary coupling facility, it also sends the MRB and releases the latches. If a failure occurs during this period of time and either the primary coupling facility or the secondary coupling facility fails to recognize the reception of a completion signal, then duplexing is broken by the coupling facility by, for instance, resetting a duplexing active indicator for the structure.

Step 6. Assuming no errors have occurred, the LFSS receives both MRBs from the two coupling facilities and constructs a single message response block by reconciling the results of the two MRBs and gives this response to the application. If, on the other hand, duplexing has been broken by one of the two coupling facilities, then the operating system invokes failover recovery and one of the two structures is selected as the surviving instance. Once the error is corrected, duplexing can be reestablished.

With the above processing, user transparency is provided because the duplexing functions are performed by the LFSS without awareness by the user application.

Failure isolation is also provided by creating two copies of the structure in separate facilities, each of which can continue as the surviving structure in a situation involving the failure of the other. Further, command atomicity is provided by maintaining latches on both structures until both commands complete.

Performance is optimized in several ways. First, sending the commands in parallel allows for maximum overlap of data transfer and command execution. Second, by exchanging completion signals immediately upon reaching the MRB send point in the command, the completion can be detected with minimal intervening latency. Third, the amount of data sent in the signal itself is small relative to the amount of data sent on the primary link for the command. So, a single peer ISC link can handle the combined signal traffic generated by commands sent on a significant number of primary ISC links. In fact, for small distances, a single ISC link can handle the combined traffic of the commands generated in a 32-system Parallel Sysplex. Fourth, by using list notification as the signaling transport mechanism, the signal can be processed by the receiver channel engine without needing to interrupt the coupling facility control code (CFCC) to process the signal. Fifth, by using the SCIS facility, contention detected by a SEND MESSAGE can be minimized by causing redrives to be performed substantially immediately.

Although in the embodiment described above, an ISC link is used to couple the two coupling facilities, this is only one example. Other links may be used, including, for instance, an ICB or IC link. Further, more than two coupling facilities may be coupled to one another. However, it is not necessary for all coupling facilities to be coupled to each other. For instance, a third coupling facility may be coupled to Coupling Facility 2 via a peer connection, but not to Coupling Facility 1.

In addition to the above, the coupling facilities that are coupled may be in separate Central Processing Complexes (CPC), in separate partitions of one CPC, or a combination thereof. In the situation that the facilities are in separate partitions of one CPC, the same links can be used for both duplexing and command traffic.

In another embodiment, multiple peer links can be configured as redundant connections. In this scenario, the duplexing protocol recognizes a link failure and maintains signal exchanges on surviving links.

Further details regarding system-managed duplexing are described hereinafter. The manner in which system-managed duplexing fits in with other rebuild processes is pictorially depicted in FIG. 2. As depicted in FIG. 2, the four types of rebuild process can be viewed as occupying a two-dimensional space. One dimension indicates the rebuild process type: whether the intent of the rebuild process is to simply rebuild the structure (200) from one location to another, or to duplex the structure (202). The other dimension indicates the rebuild process technique: whether the process is user-managed (204) or system-managed (206). These dimensions define the different rebuild processes: user-managed rebuild (208), system-managed rebuild (210), user-managed duplexing rebuild (212), and system-managed duplexing rebuild (214). Various aspects of system-managed duplexing rebuild are described below.

Problems Solved by System-Managed Coupling Facility Structure Duplexing

System-managed duplexing provides a general-purpose, hardware-assisted, easy-to-exploit mechanism for duplexing coupling facility structure data. This provides a robust recovery mechanism for failures, such as loss of a single structure or coupling facility, or loss of connectivity to a single coupling facility, through the ability to perform a rapid failover to the other structure instance of the duplex pair.

Previously, coupling facility exploiters had several potential mechanisms for providing recovery in these hard failure scenarios, each with its own costs and compromises related to availability.

Some coupling facility structures provide no recovery mechanism whatsoever for hard failures. Whatever data is placed in the coupling facility structure, along with whatever processing is dependent on that data, is therefore unrecoverable in a failure scenario. CICS Shared Temporary Storage structures and CICS Coupling Facility Data Tables structures are two examples of this. (CICS is offered by International Business Machines Corporation, Armonk, N.Y.)

Some coupling facility structures can recover for hard failures by maintaining another hardened copy of the data on another medium, such as DASD. For example, data in a directory-only cache or store-through cache structure is hardened on DASD and is therefore recoverable from DASD in the event of loss of the coupling facility structure. System Logger (a product offered by International Business Machines Corporation, Armonk, N.Y.) is such an example, with its use of staging datasets to maintain a second copy of the logstream data from the time it is written to the coupling facility until it is offloaded. Such structure exploiters typically incur a substantial undesirable mainline performance cost to write their updates synchronously to DASD.

Some coupling facility structures can recover for hard failures by maintaining another "soft" copy of the data in a location which is failure-isolated with respect to the coupling facility structure, such as an in-storage buffer. For example, data in a System Logger logstream can be maintained in such an in-storage buffer from the time it is written to the coupling facility until it is offloaded. Locks held by the IRLM lock manager or the VSAM RLS lock manager are other examples; each of the lock manager instances maintains a local copy of the locks that it holds. Such structure exploiters typically incur some mainline performance cost and significant storage use costs. (IRLM and VSAM RLS are products of International Business Machines Corporation, Armonk, N.Y.)

Note that with this approach, all instances of the exploiter are to be failure-isolated from the coupling facility where the structure resides, or else they are exposed to the possibility that a single failure might cause both the coupling facility structure and one or more of the exploiter instances to fail at the same time, which in turn would result in the unrecoverable loss of whatever data those failed connectors were maintaining in-storage.

Some coupling facility structures can recover for hard failures through logging and log recovery. For example, changed data in an unduplexed DB2 group buffer pool (GBP) cache structure can be recovered through processing of the merged DB2 logs. Such structure exploiters typically incur a mainline performance cost associated with these logs (though the logging may prove useful in recovering from loss of data even with duplexed coupling facility structures), but more significant is the often unacceptable availability impact when the logs are to (usually at great length) be merged and used to perform data recovery after a failure, during which time all data is unavailable for use. (DB2 is a product of International Business Machines Corporation, Armonk, N.Y.)

Some structures can recover for hard failures through user-managed duplexing failover. For example, changed data in a duplexed DB2 group buffer pool (GBP) cache structure can be recovered in this way. Such structure exploiters may obtain both very good mainline performance and excellent availability in failure situations due to the rapid duplexing failover capability, but there is a very significant development/test cost associated with providing user-managed duplexing support.

As can be seen from the above, none of these approaches is ideal. Several of them have significant performance overhead associated with them during mainline operation (for example, the cost of synchronously hardening data out to DASD in addition to the coupling facility in a store-through cache model); some of them compromise availability in a failure scenario by involving a potentially lengthy rebuild or log recovery process during which the data is unavailable (for example, log merge and recovery for an unduplexed DB2 group buffer pool cache). Furthermore, some of these recovery approaches involve considerable development and test expense on the part of the coupling facility exploiters to provide the appropriate level of recovery, as each exploiter implements their own unique recovery mechanisms.

System-managed duplexing is intended to address such problems by providing an easily-exploited common framework for duplexing the structure data contained in any type of coupling facility structure, with installation control over which structures are duplexed. Overhead of duplexing during mainline operation is minimized via architecturally-defined, hardware-assisted serialization and synchronization between the primary and secondary structure updates. Availability in failure scenarios is maximized by providing a rapid failover to the unaffected structure instance of the duplexed pair, with very little disruption to the ongoing execution of work by the exploiter and applications.

Transparency to Exploiters

When a duplexing rebuild is system-managed (rather than user-managed), the operating system performs most of the significant steps in the overall duplexing rebuild process on behalf of the users. For example, the operating system can internally quiesce the use of the structure on the user's behalf (the user may also elect to perform some amount of rerouting of work away from the structure at the user's level), allocate a second instance of the structure, establish attachment to the new structure on the users' behalf, copy all necessary or desired data from the old structure instance to the new in order to establish duplexing, and then while in the duplex established phase, the operating system transparently duplexes user's mainline coupling facility operations to both structures, as needed, to maintain the duplexed pair of structure images.

In contrast, user-managed duplexing requires the coupling facility exploiters to be aware of, and to participate directly in, each of these steps, as described in, for instance, "Method, System And Program Products For Providing User-Managed Duplexing Of Coupling Facility Cache Structures", Elko et al., U.S. application Ser. No. 09/255,382, filed Feb. 22, 1999, which is hereby incorporated herein by reference in its entirety. Advantageously, from the exploiter's perspective, this aspect of the present invention is thus, a great simplification in achieving a structure duplexing capability relative to previous techniques.

Moreover, since the duplex copy of the structure is established in advance of any failures that may eventually occur, and duplexing synchronization between the structures is maintained over time as the users perform coupling facility mainline accesses, system-managed duplexing provides a robust recovery capability for the various types of failure scenarios. Structure failures or total losses of coupling facility connectivity can be handled transparently by the operating system, by:

- hiding the observed failure condition from the exploiters using the structure, so that they do not perform unnecessary recovery actions,
- switching over to the structure instance that did not experience the failure, and
- then reestablishing a new duplex copy of the structure, if appropriate.

Although many aspects of the system-managed duplexing are transparent, one or more aspects are not totally transparent. For example, transitions into or out of the duplexed state caused by establishing duplexing initially (transitioning from simplex to duplex mode) or falling out of duplexing (transitioning from duplex to simplex mode) are not conducted in a totally transparent manner, in that the exploiters are not completely unaware of the transition taking place.

However, while system-managed duplexing does not provide the exploiters with complete transparency from the standpoint of enablement support and of transitions into and out of the duplexed state, it does provide exploiters with transparency in the following aspects:

Mainline coupling facility operation transparency—when the exploiter performs coupling facility commands to a structure, it is transparent to the exploiter whether the structure is in simplex or duplex mode. The operating system makes this determination and duplexes the operation, or not, without any participation or awareness by the exploiter.

Failover transparency—when a duplexed structure experiences a failure condition, such as a loss of coupling facility connectivity or a structure failure that affects one of the structure instances, the failover to the unaffected structure instance in simplex mode is done transparently without the exploiter being made aware of the failure.

The following sections consider various aspects of the present invention.

Duplexed Processing for Mainline Coupling Facility Operations

Figure 3:
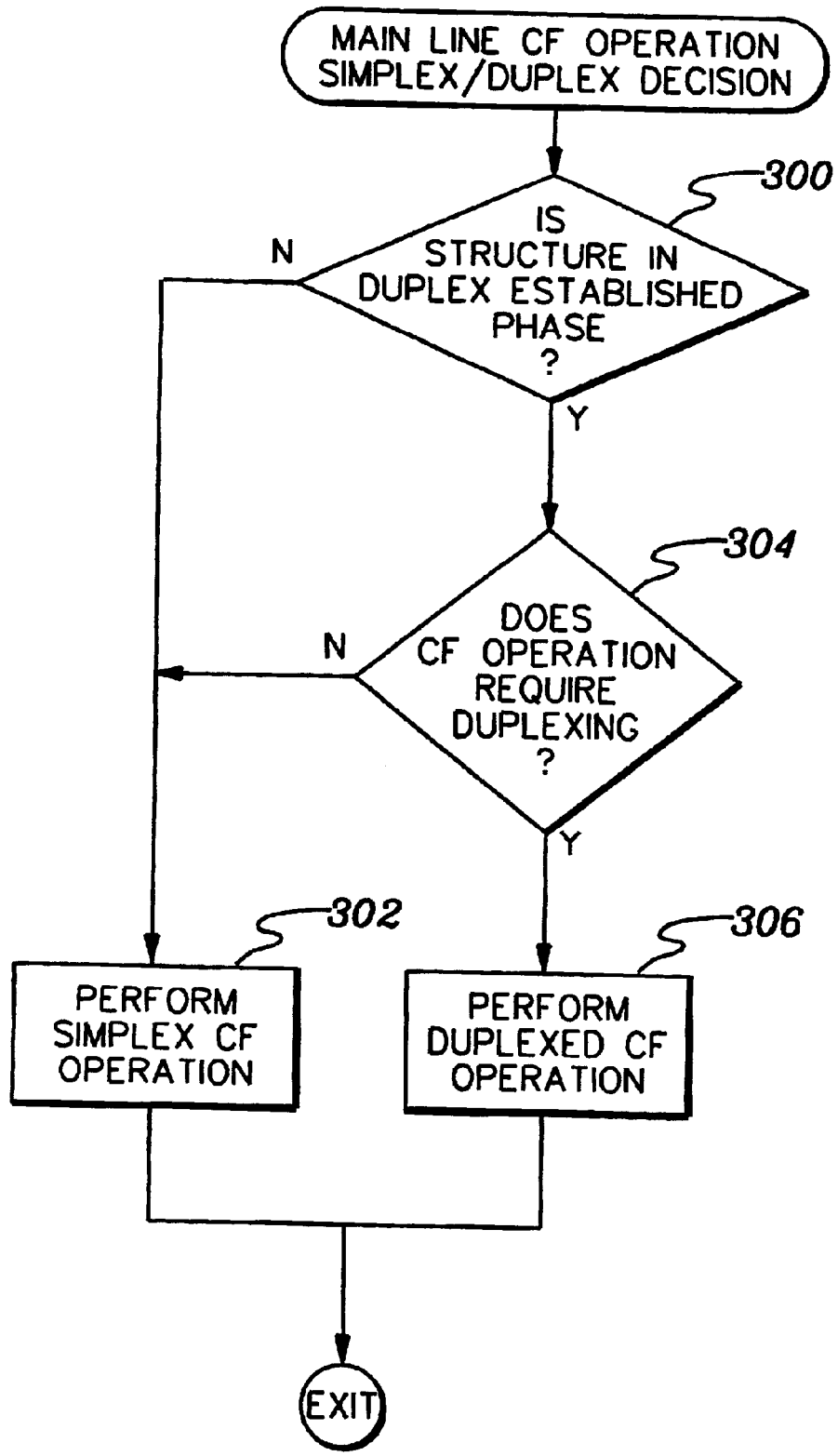
FIG. 3 depicts one embodiment of the operating system processing associated with one coupling facility operation, as it is received from the exploiter, making a determination as to whether simplex or duplexed processing is to be employed, in accordance with an aspect of the present invention.

FIG. 3 depicts one embodiment of operating system processing associated with one coupling facility operation, as it is received from the exploiter, making a determination as to whether simplex or duplexed processing is to be employed. Initially, a primary determination is made by the operating system as to whether the structure itself is duplexed, that is, whether it is in a duplex established phase of a system-managed duplexing rebuild, INQUIRY 300. If the structure is not duplexed, then the user's requested operation is performed in simplex mode against the simplex structure using known simplex processing, STEP 302. However, if the structure is duplexed, a further determination is made as to whether the coupling facility operation being performed requires or desires duplexed processing, INQUIRY 304.

In some cases, the determination at INQUIRY 304 is straightforward. For example, some coupling facility commands are architecturally defined as simplex mode commands only, because they do not have a capability of updating any structure objects which are duplexed; such commands lack the request operands that architecturally request duplexed execution. Thus, such commands are processed in simplex mode, STEP 302. These commands include, for instance:

Read List Structure Controls
Read List Controls
Read Lock Table Entry
Read Next Lock Table Entry
Read User Controls
Read List
Read List Set
Read Event Monitor Controls
Read Event Queue Controls
Read EMC List
Read Directory
Read Castout Class
Read Castout Class Information
Process Reference List
Invalidate Complement Copies
Set Reclaiming Vector
Read Storage Class Information
Read Cache Structure Information
Read Local Cache Information
Read WWCO Queue
Read Local Cache Registers.

In some cases, the determination at INQUIRY 304 is made by virtue of the context in which the commands are executed. For example, while the commands do update structure objects, they do so only in the context of structure instance management; that is, in the course of the operating system itself establishing duplexing or managing the primary or secondary structure instances. Such commands lack the request operands that architecturally request duplexed execution and are also processed in simplex mode, STEP 302. Examples of such commands include, for instance:

Allocate List Structure
Deallocate List Structure
Attach List Structure User
Detach List Structure User
Clear Lock Table
Dequeue Event Monitor Controls
Cleanup Lock Table Entries
Read Lock Table Range
Store Lock Table Entries
Write List Set Scan Controls
Write List Copy Controls
Queue Pending EMCs
Allocate Cache Structure
Deallocate Cache Structure
Attach Local Cache
Detach Local Cache
Write Storage Class Information
Write Cache Copy Controls
Write Castout Class Scan Controls.

Some coupling facility commands either may or may not update duplexed structure objects, depending on the command-specific operands that the user has requested on the command. When such commands are executing with operands specified that preclude possible updates to duplexed structure objects, the operating system performs these as simplex operations directed against the primary structure instance, STEP 302. Such commands, and their request-specific operands that indicate they may be performed as simplex requests, include, for instance:

Read List Entry—with request operands that request no lock update, no list authority update, no list cursor update, and no version number update.
Write And Register—with request operands that request the entry to be written unchanged, with no obtain of the castout lock, and no change-bit overindication.
Write When Registered—with request operands that request the entry to be written unchanged, with no obtain of the castout lock, and no change-bit overindication.
Invalidate Name—with request operands indicating that they are only operating against entries with unchanged data.
Invalidate Name List—with request operands indicating that they are only operating against entries with unchanged data.

Lastly, several cache commands have the property that they can cause an update to the storage class for a cache entry, but no specific operand controls whether an update is in fact being requested; rather, these commands simply set the storage class for the entry, and it may or may not cause a change to the storage class previously defined for the entry. Since in general, updating the storage class for an entry is believed to be a rare occurrence, these commands will optimistically be driven in simplex mode against the primary structure, STEP 302, with an operand that causes the command to fail if in fact a storage class update occurs. When these commands fail in this way, they are redriven by the operating system, transparently, as duplexed requests. Such commands include, for instance:

Register Name List
Read and Register.

In one embodiment, in general, commands are driven in simplex mode whenever possible, to avoid the overhead associated with the duplexing protocols. However, for any command that supports duplexed execution, if it cannot be reliably determined that the operands or context of the request imply that no duplexed structure objects can be updated by the command, then the request is performed in a duplexed fashion, STEP 306. Further details regarding the processing of a duplexed coupling facility operation are described with reference to FIGS. 4 and 5a–5h.

Figure 4:
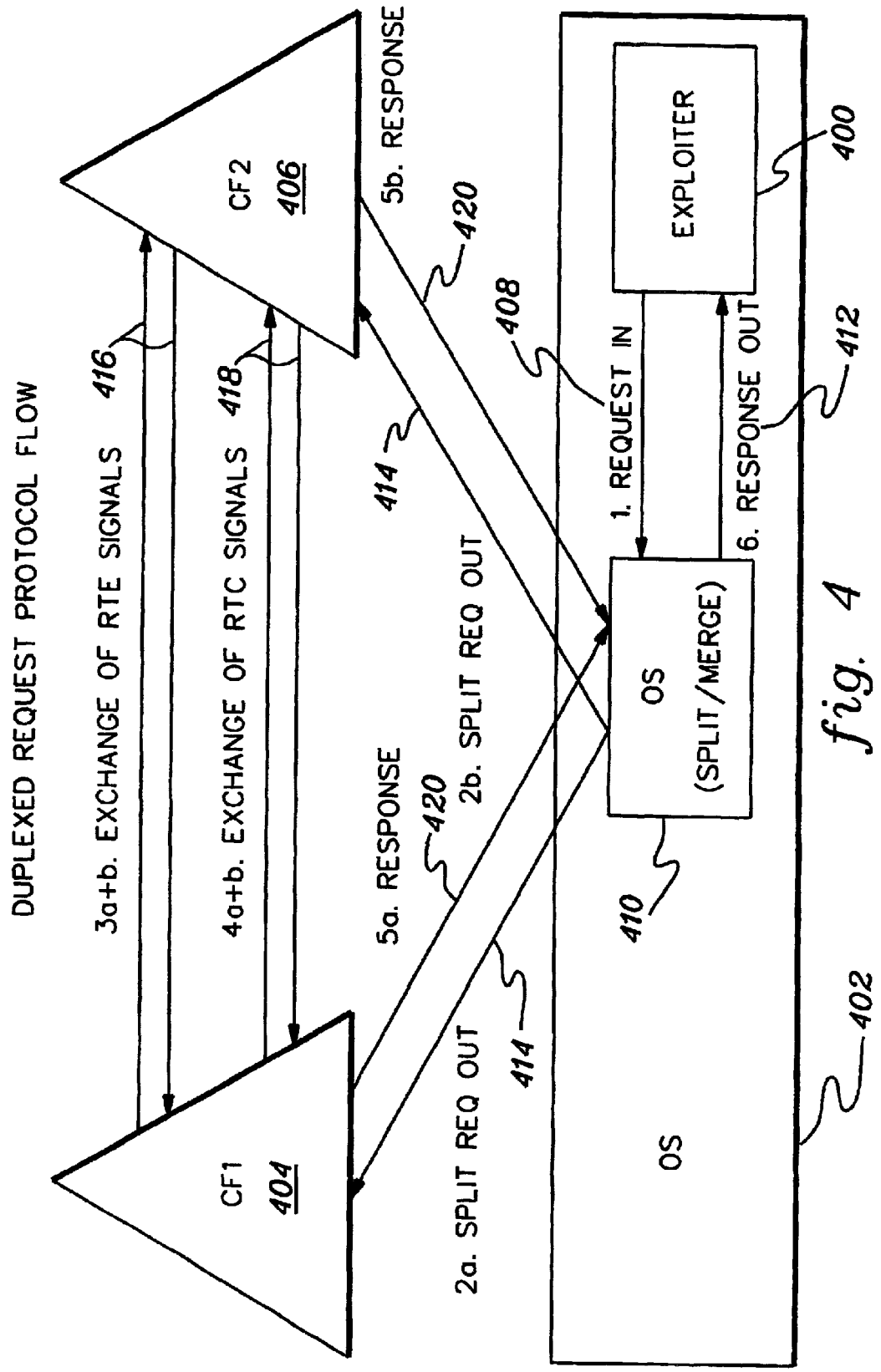
FIG. 4 depicts one embodiment of the processing and associated protocol flows for a duplexed coupling facility operation, in accordance with an aspect of the present invention.

FIG. 4 depicts one embodiment of the processing and associated protocol flows for a duplexed coupling facility operation. Here, an exploiter instance 400 is executing on an operating system image 402. Two coupling facilities, CF 1 (404) and CF 2 (406), are in use by the operating system image, and they contain a duplexed pair of coupling facility structures being used by structure exploiter 400. The exploiter submits a coupling facility request 408, which is processed by an operating system component 410 designated to handle such coupling facility requests. This operating system component makes the determination whether to process the request in simplex or duplexed mode, as described above in FIG. 3. Note that when the request is processed in a duplexed fashion, as shown here, exploiter 400 ultimately receives one (and only one, in this embodiment) merged response 412 to the request, which is indistinguishable from the response that would have been received from a request processed in simplex mode against a duplexed structure, or a request processed in simplex mode against a simplex structure. This is to maintain mainline operation transparency for duplexing. That is, the exploiter does not, in general, know whether requests being submitted are being processed as simplex mode or duplex mode requests.

When operating system 402 processes the request in duplex mode, it splits the request into two coupling facility commands, one of which is driven in parallel to each of the two structure instances (414), the primary and secondary, that reside in the two coupling facilities. The two commands are "tagged" with the architected request operands that denote duplexed execution, including, for example: a command sequence number (CSN), which is a number associated with a currently executing duplexed command; a duplexing signal-group index (DSGX), which is a value that identifies the duplex signal group to be updated in a signaling vector; and a duplexing retry index (DRX), which is a value that designates a signaling vector entry for the signaling vector identified by remote facility controls. These operands allow the architected duplexing signal exchanges to be carried out when these commands arrive at the respective target coupling facilities. For instance, the coupling facilities exchange Ready to Execute (RTE) signals 416, when they are ready to commence execution, and exchange Ready to Complete (RTC) signals 418, when they have acquired all necessary command serialization and are ready to complete. These architected duplexing operands, signals, and signal exchange protocols are described in further detail in a co-filed patent application entitled "Coupling Of A Plurality Of Coupling Facilities Using Peer Links," Brooks et al. Ser. No. 09/968,244, which is hereby incorporated herein by reference in its entirety.

When the duplexed commands complete at their respective coupling facility instances, they have updated the necessary structure objects in a coordinated manner so that the duplexed pair of structures remains in synch with one another. At that time, the two commands complete and return response information 420. The operating system observes the completion of each of the two coupling facility operations separately, and when both operations of the duplexed pair have completed, it merges and reconciles the results so as to arrive at a single, combined response 412 for the request, which is returned to exploiter 400.

Additional details associated with operating system software processing of a duplexed request, once the request has been determined to employ duplexed processing, are described with reference to FIGS. 5a–5h.

Figure 5A:
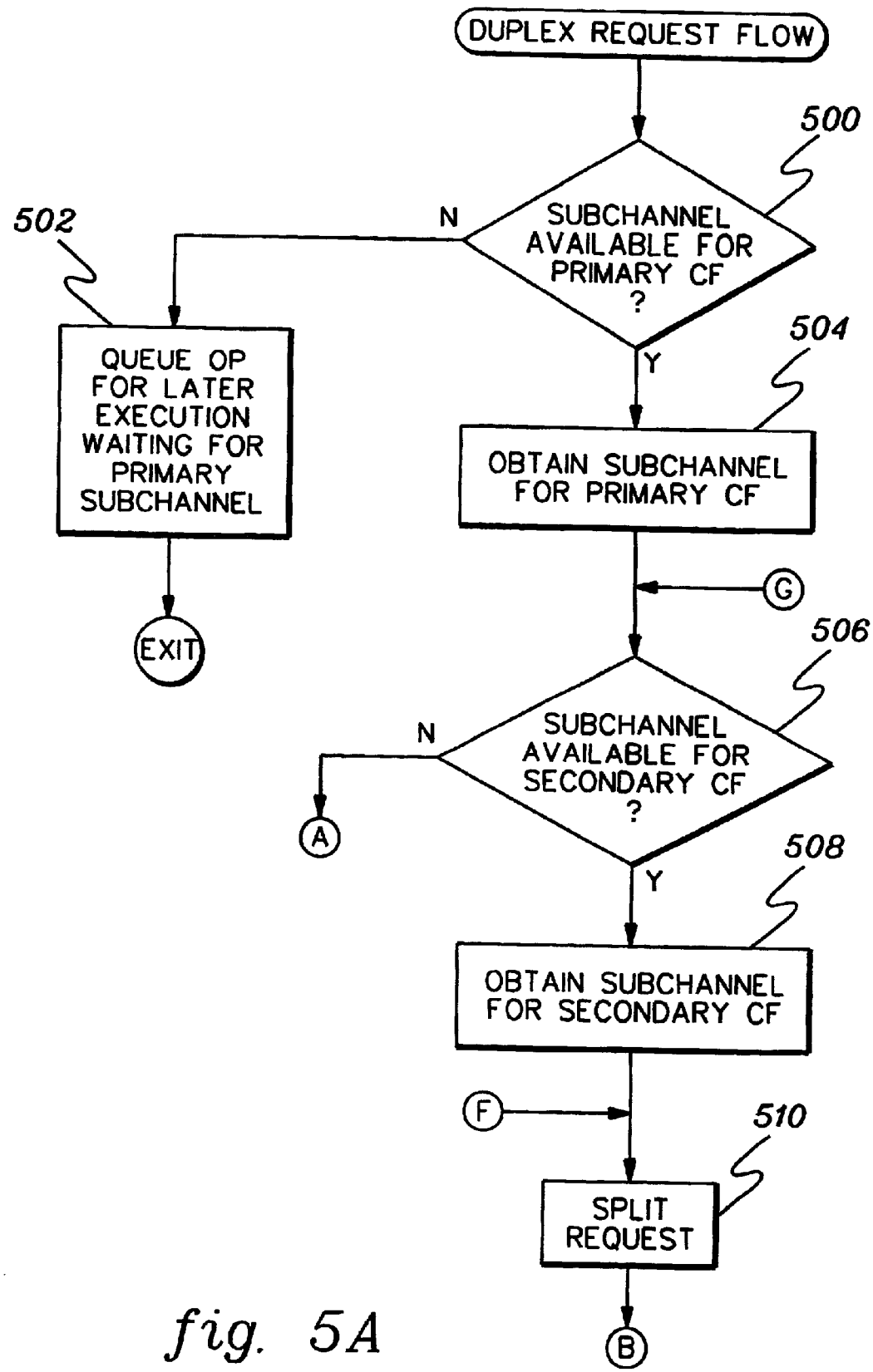
FIGS. 5a–5h depict one embodiment of operating system processing of a duplexed request, once the request has been determined to employ duplexed processing, in accordance with an aspect of the present invention.

Referring to FIG. 5a, in order to perform a duplexed coupling facility operation, the operating system acquires I/O resources (e.g., subchannels), which are used to perform the operations at each of the two coupling facilities that include the primary and secondary structure instances. At the time of the request, either both coupling facilities have subchannels available for use, in which case the duplexed request may be started immediately, or one or the other of the two coupling facilities (or both of them) does not have a subchannel available, in which case the duplexed request is not started immediately and is, instead, queued for later execution.

Should a subchannel not be available for the primary coupling facility, INQUIRY 500, then the operation is queued for later execution, waiting for the primary coupling facility to have an available subchannel, STEP 502. The processing to redrive this queued operation is described hereinafter. However, if a subchannel is available for the primary coupling facility, then an available subchannel is obtained from the primary coupling facility's free pool of subchannels for use in processing this duplexed operation, STEP 504. Then, with the primary subchannel in hand, a determination is made as to whether there is an available subchannel for the secondary coupling facility, INQUIRY 506.

If a subchannel is available for the secondary coupling facility, then an available subchannel is obtained from the secondary coupling facility's free pool of subchannels for use in processing this duplexed operation, STEP 508. At this point, the subchannel I/O resources needed to perform the duplexed operation have been obtained.

Next, the exploiter's request is split into a plurality of (e.g., two) requests, a primary and a secondary request, which are driven to the primary structure and secondary structure in the duplexed pair, respectively, STEP 510. One embodiment of the logic associated with splitting a request is described hereinafter with reference to FIG. 5g.

Figure 5B:
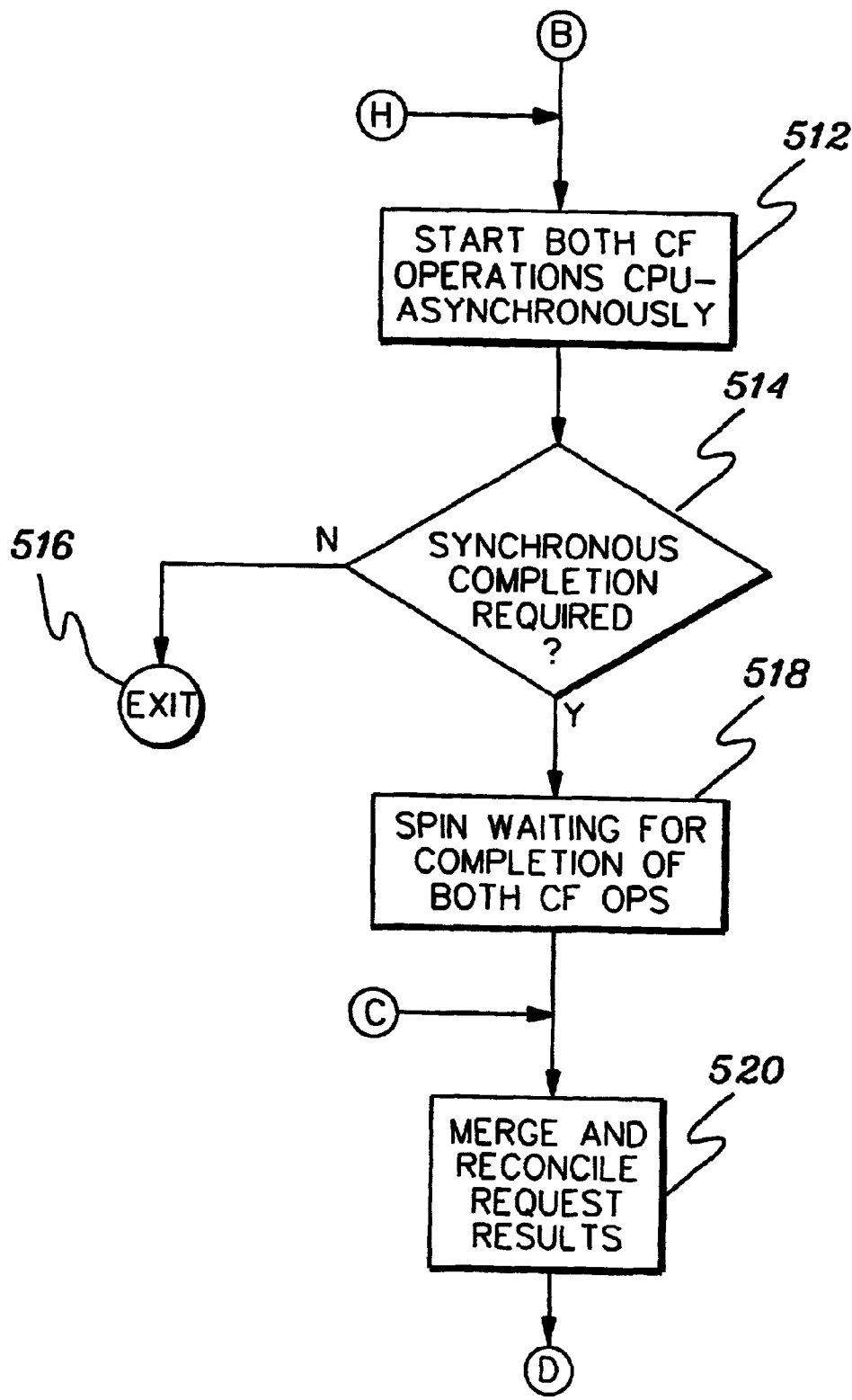

Subsequent to splitting the request, the primary and secondary coupling facility operations are initiated on their respective subchannels, targeting the primary and secondary structures, STEP 512 (FIG. 5B). Both operations are initiated in a CPU-asynchronous manner, but once both are initiated, the pair of operations may either be completed synchronously under the same unit of work that initiated them, or may be allowed to complete asynchronously and be completed under a different unit of work than the one that initiated them, INQUIRY 514. One embodiment for making the determination of synchronous or asynchronous completion is described in a co-filed application entitled "Dynamically Determining Whether To Process Requests Synchronously Or Asynchronously", Jordan et al., U.S. Ser. No. 09/968,185, filed herewith, which is hereby incorporated herein by reference in its entirety.

If it is determined that synchronous completion is not required (or desired), then the current flow exits, STEP 516. This is because asynchronous completion for the duplexed pair of requests occurs under a separate flow of execution under separate units of work, one embodiment of which is described hereinafter with reference to FIG. 5d.

However, if it is determined that synchronous completion is required (or desired), then processing spins waiting for both of the coupling facility operations to complete, STEP 518. In one example, this polling includes testing the primary subchannel to see if it is complete, then testing the secondary subchannel to see if it is complete, and so on, alternately, until it has been ascertained that both are complete.

Once both coupling facility operations are observed to have completed, the operating system merges and reconciles the results of the two coupling facility operations into a single response to the end user exploiter, STEP 520. One embodiment of the logic associated with merging/reconciliation is described hereinafter with reference to FIG. 5h.

Figure 5C:
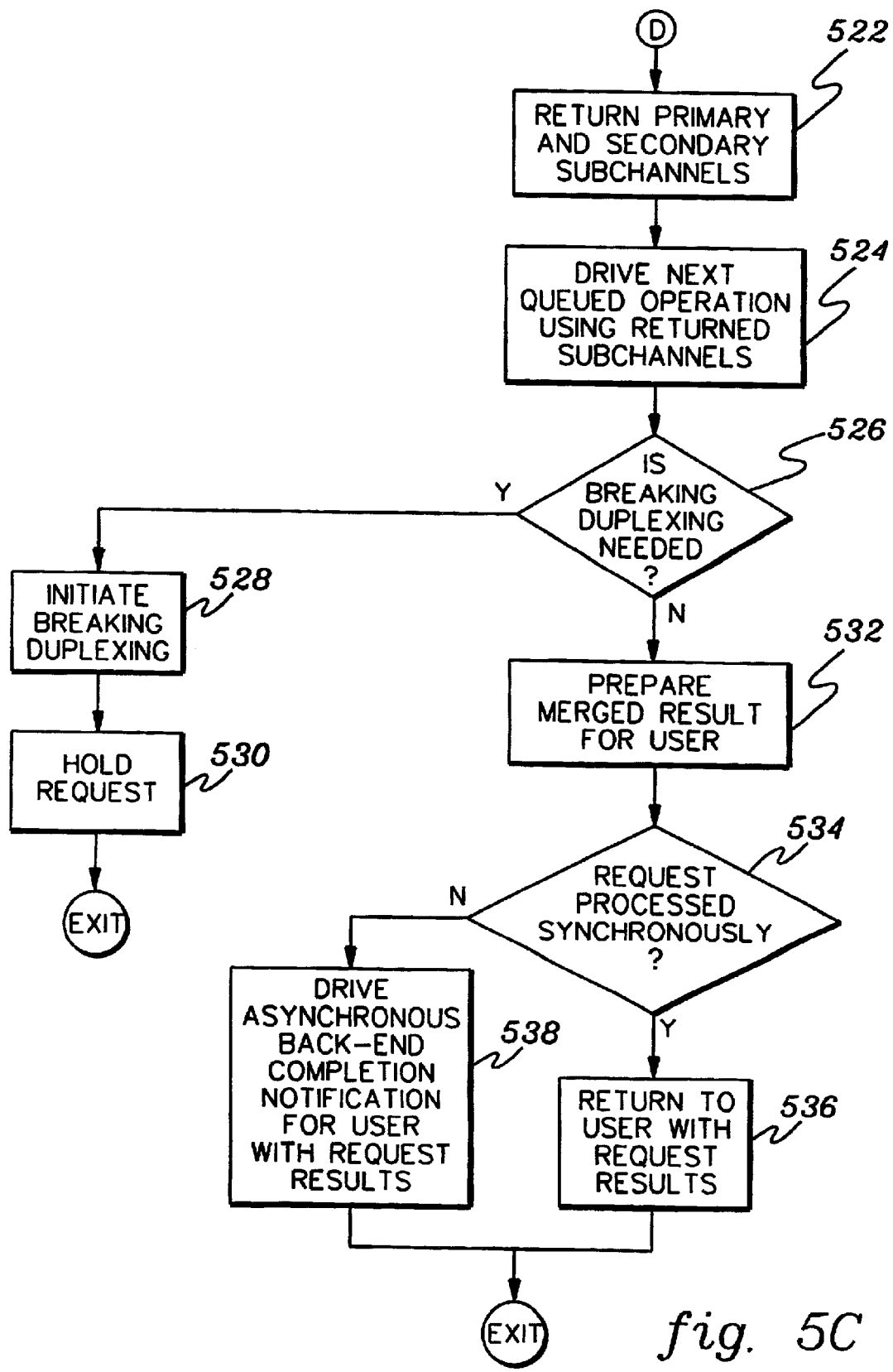
Figure 5D:
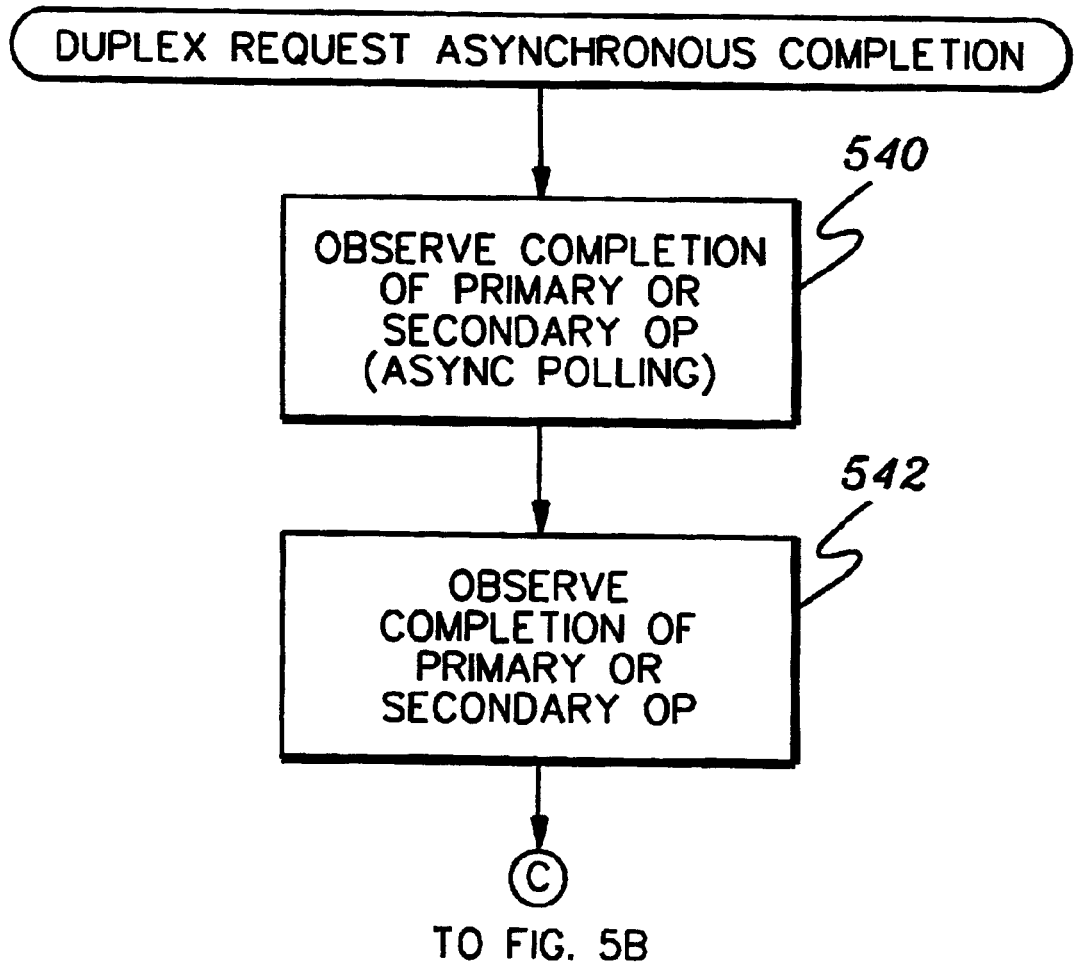

At this point, processing is finished with the subchannel I/O resources for both coupling facilities, and thus, these subchannels are returned to the free pool of subchannels associated with each coupling facility, from whence they were obtained, STEP 522 (FIG. 5c). These returned subchannels may be usable in driving one or more queued operations that were previously unstartable due to the unavailability of subchannel resources for another request. Thus, if there are any such queued operations for either the primary or the secondary coupling facility, those operations are driven at this time using the subchannels that were just returned, STEP 524. One embodiment of the logic associated with this processing is described hereinafter with reference to FIG. 5f.

Subsequently, a determination is made as to whether the merged/reconciled results of the request (from STEP 520) indicates that duplexing was, or needs to be, broken as a result of this request, INQUIRY 526. If so, then processing to break duplexing is initiated, STEP 528, and the results of the current request are not presented back to the exploiter at this time; rather, the request is "held" on a special hold queue, until the process of breaking duplexing for the structure and reverting to simplex mode is complete, STEP 530. One embodiment of the processing associated with breaking duplexing, holding requests, and redriving or completing held requests once the structure is back in simplex mode is described hereinafter with reference to FIGS. 7 and 8a–8b.

When breaking of duplexing is not needed, the merged result (provided at STEP 520 (FIG. 5b)) is prepared for presentation to the exploiter using any appropriate notification mechanism, STEP 532.

Subsequently, if the request was processed synchronously under the exploiter's requesting unit of work, INQUIRY 534, then control is returned to the exploiter with the merged request results, STEP 536. However, if the request was processed asynchronously, then the requestor's back-end completion mechanism is driven, as appropriate, to notify the user of the merged request results, STEP 538. This completes processing of the duplex request flow. However, further details of selected steps are described below.

Return to INQUIRY 514 (FIG. 5b), when asynchronous completion for the duplexed pair of requests is employed, asynchronous completion occurs under a separate flow of execution. One embodiment of the logic associated with asynchronous back-end completion processing for a duplexed coupling facility request is described with reference to FIG. 5d. The two asynchronous coupling facility operations that were initiated to the coupling facilities having the primary and secondary structures are executing somewhat independently, so they will be observed to complete at different points in time based on many factors relating to the performance of the two coupling facility images and the I/O connectivity to the two coupling facility images. (Of course, these coupling facility operations are not completely independent in their execution; they are participating in the duplexing command protocol and signal exchanges as described in FIG. 4). In general, normal polling for completion of asynchronous coupling facility requests observes first the completion of one of the two operations, STEP 540, and then the completion of the other operation, STEP 542, and it is unpredictable which of the two operations will complete first, and which will complete second. Once both operations have been observed to complete, processing flows to (c) in FIG. 5b, where the results of the two coupling facility operations are merged/reconciled, as described herein.

Figure 5E:
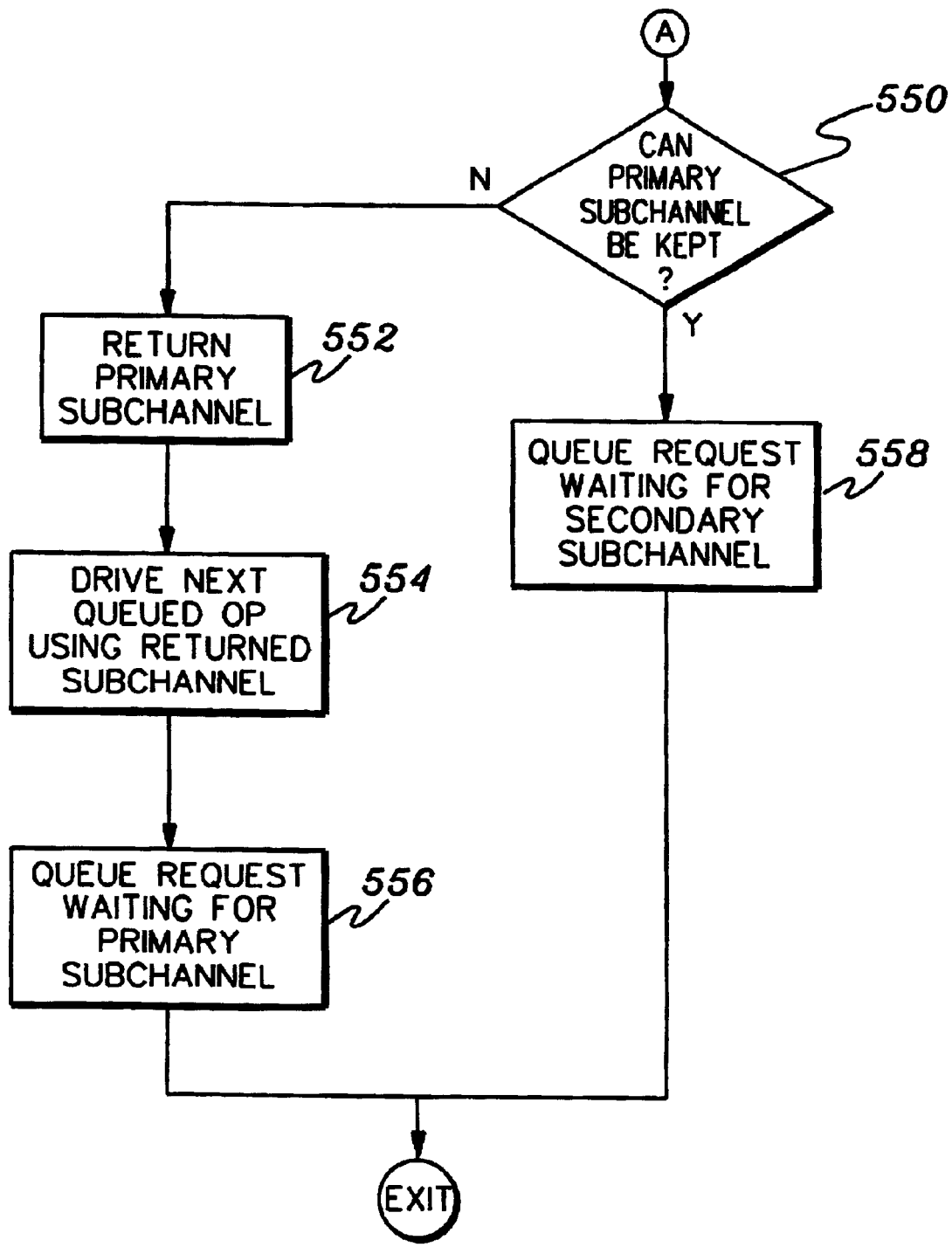

Returning to INQUIRY 506 (FIG. 5a), when the primary subchannel has been obtained for use in a duplexed operation, but the secondary subchannel is not available, then processing continues as described with reference to FIG. 5e. Initially, a determination is made as to whether the primary coupling facility subchannel can be "kept," while waiting for a subchannel for the secondary coupling facility to become available for use in starting the duplexed pair of operations, INQUIRY 550. Care is to be taken in making this determination, or deadlocks can result.

For example, suppose that a configuration contains two duplexed structures, Structure A and Structure B, and that the primary instance of Structure A and the secondary instance of Structure B reside in CF 1, and that the secondary instance of Structure A and the primary instance of Structure B reside in CF 2, and that each coupling facility has two subchannels associated with it. Suppose that two coupling facility requests for Structure A and two coupling facility requests for Structure B are received from their respective exploiters, and are processed concurrently by the operating system. Each of the two operations for Structure A might obtain a primary subchannel (using up all of the available subchannels for CF 1), and each of the two operations for Structure B might obtain a primary subchannel (using up all of the available subchannels for Coupling Facility 2), and then each of the operations would attempt to obtain its secondary subchannels and be unable to do so. If they all decided to "keep" their primary subchannels, while waiting for a secondary subchannel to become available, then this would deadlock indefinitely as the operations for Structures A and B are each "keeping" their own primary subchannels, which the other needs to acquire for use as their secondary subchannels.

To prevent this deadlock, in one example, the determination at INQUIRY 550 only keeps a primary subchannel associated with a particular coupling facility, if it is the only such kept primary subchannel associated with that coupling facility. If there is already a primary subchannel that is being kept associated with a duplexed request for that coupling facility, then additional subchannels are not permitted to be kept. In this case, the primary subchannel, which was previously obtained, is returned to the free pool of subchannels associated with the primary coupling facility, STEP 552, where it can be used to drive the next queued operation for the coupling facility to which it was returned, STEP 554, as is described in further detail with reference to FIG. 5f. The request now has obtained neither the primary nor secondary subchannel, which it wishes to employ, so the request is queued waiting for a primary subchannel to become available, STEP 556.

On the other hand, if this is the only such kept primary subchannel associated with that coupling facility, then the primary subchannel which was previously obtained is kept for this duplexed request, and the request is queued waiting for the currently-unavailable secondary subchannel to become available, STEP 558.

Other techniques for avoiding a deadlock are also possible here. For example, one way of avoiding a deadlock is to simply always return the primary subchannel, whenever the secondary subchannel cannot be immediately obtained to process the duplexed request, and then try again at a later time to obtain both subchannels, again. However, this suffers from a fairness problem; the request may be tried over and over again with no guarantee that "progress" will ever be made in coming any closer to acquiring all of the resources needed or desired to perform the duplexed operation. In contrast, the technique described with reference to FIG. 5e has the advantage that subchannels can be "kept" for use in a duplexed operation, which has the effect of making "progress" on eventually getting those duplexed requests processed; when a request has kept a primary subchannel, it can be started when only one additional subchannel becomes available (the secondary), rather than having to wait for both the primary and secondary to become available to it at the same time.

In one embodiment, the mechanism for keeping a primary subchannel is intimately related to the mechanism for driving the next queued operation, whenever a subchannel is returned to the free pool, and thus, becomes available for use for a particular coupling facility. One embodiment of this processing is described with reference to FIG. 5f.

Figure 5F:
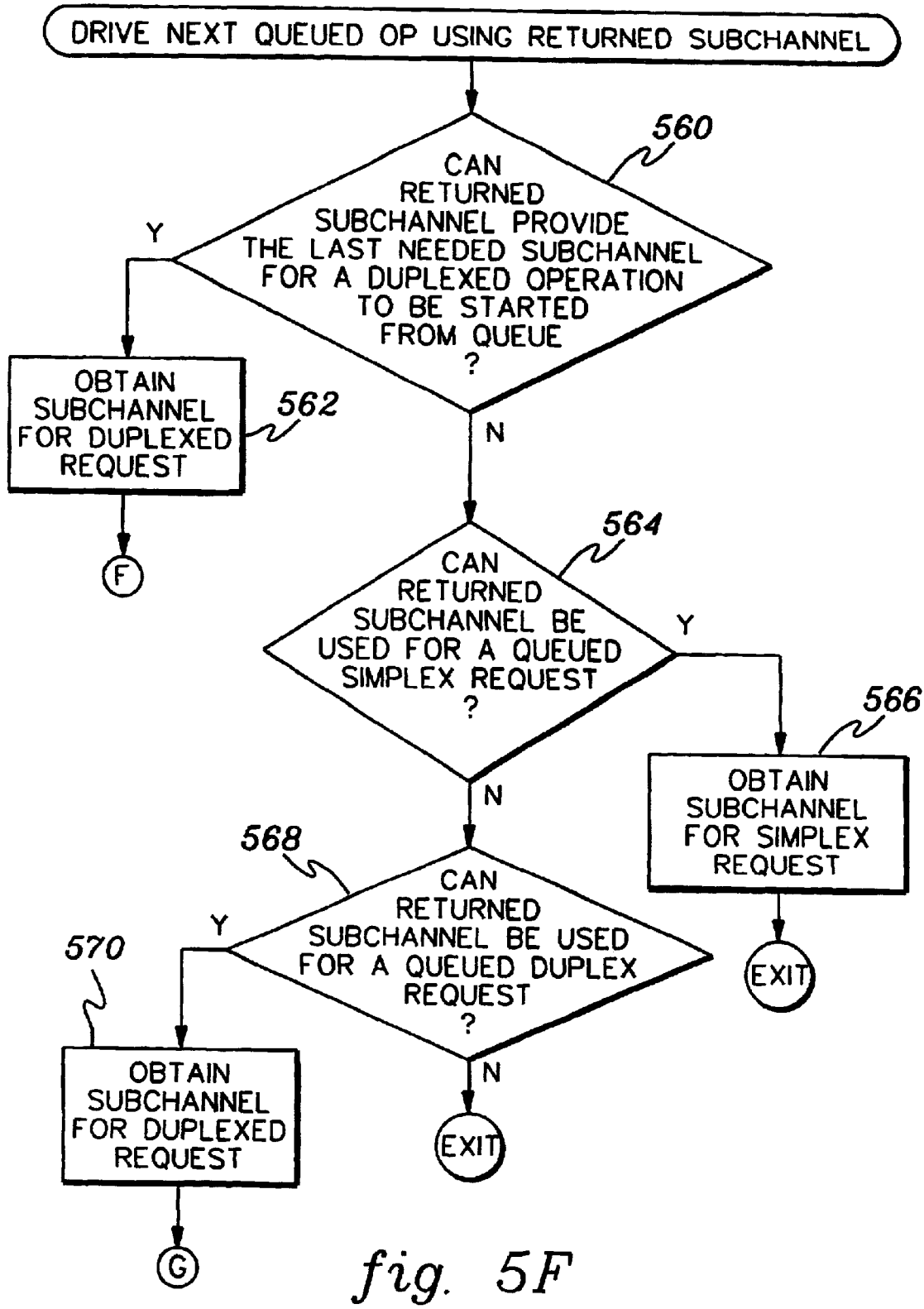

Referring to FIG. 5f, when a subchannel is returned to the free pool for a coupling facility, a determination is made as to whether there are any queued duplexed operations for which the returned subchannel can serve as the last needed subchannel for the duplexed operation to be started, STEP 560. That would be the case, for example, if this returned subchannel was usable as the secondary subchannel for a duplexed operation, which had previously obtained a primary subchannel (STEP 504, FIG. 5a), been unable to obtain a secondary subchannel (INQUIRY 506, FIG. 5a), been able to keep its primary subchannel (INQUIRY 550, FIG. 5e), and been queued waiting for a secondary subchannel (STEP 558, FIG. 5e). When this occurs, the subchannel is obtained for use as the secondary subchannel for the duplexed request, STEP 562, and processing continues at (f) on FIG. 5a.

Otherwise, a further determination is made as to whether the returned subchannel can be used as the subchannel with which a queued simplex request can be driven, INQUIRY 564. If so, the subchannel is obtained for use in processing that simplex request, STEP 566, which flows into known simplex request processing.

On the other hand, a further determination is made as to whether the returned subchannel can be used as a subchannel for a queued duplexed operation, INQUIRY 568. Because of previous checks that have been made (e.g., at INQUIRY 560), this would be, for instance, for a queued duplexed operation that has not obtained and kept a primary subchannel, and thus, is waiting for a primary subchannel. If the returned subchannel can be used for a queued duplex request, then the returned subchannel is obtained for use by the duplexed request, STEP 570, and processing continues at (g) on FIG. 5a.

Otherwise, the returned subchannel cannot currently be used to start any queued coupling facility requests, and simply remains in the free pool for the coupling facility, until it is needed.

Duplexed Request Splitting

Figure 5G:
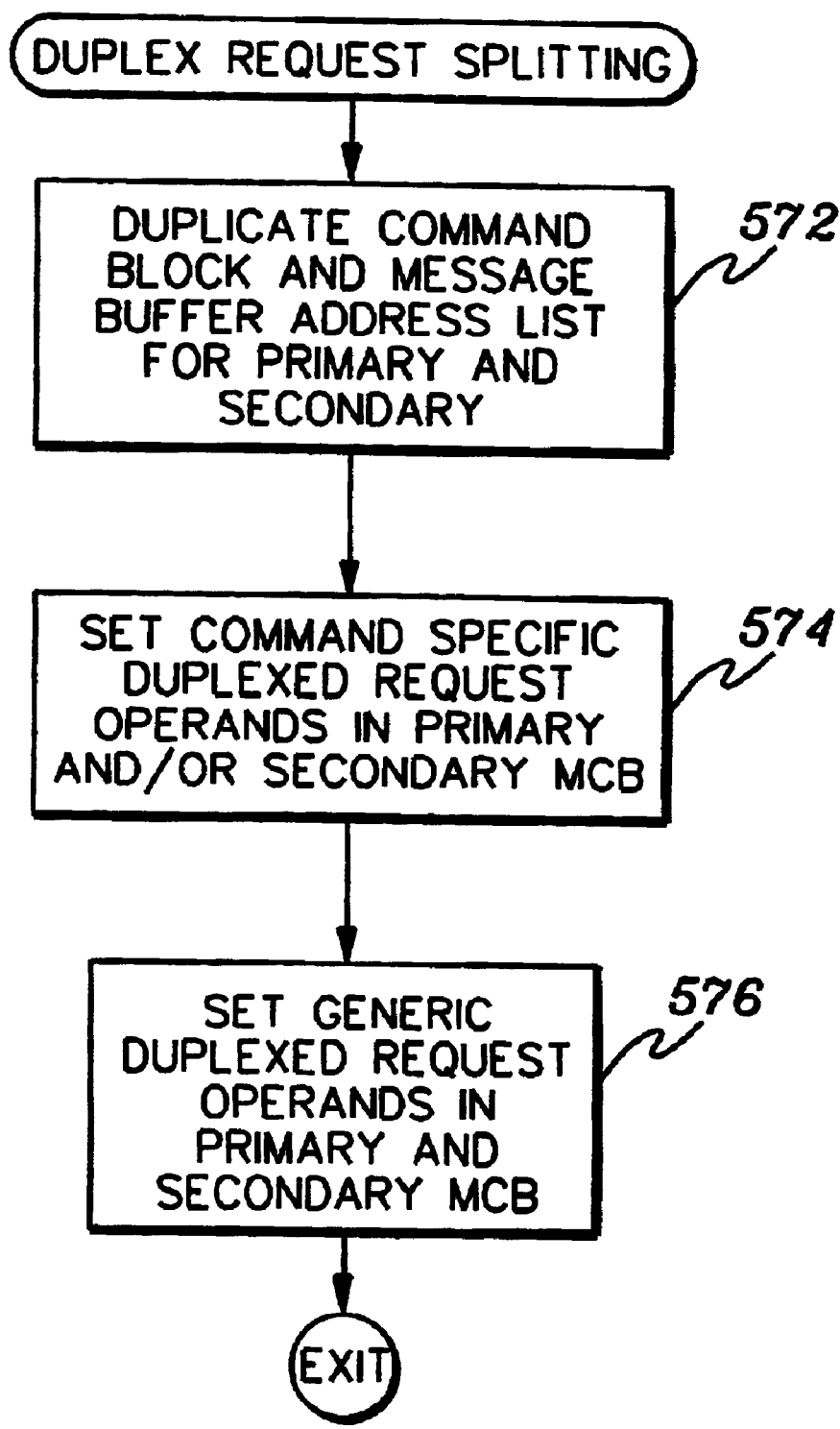

One embodiment of the logic associated with splitting a request (STEP 510, FIG. 5a) received from the exploiter into a plurality (e.g., two) of requests (one for the primary structure, and one for the secondary structure), when duplexed command execution is employed, is described with reference to FIG. 5g.

With duplexing, there are two interrelated operations being constructed and driven to two coupling facilities and coupling facility structures (primary and secondary) as a result of a single exploiter request, with two interrelated responses being received. Certain duplexing-related operands in the primary and/or the secondary Message Command Block (MCB) are set to ensure the appropriate duplexed execution of the request.

As input to the request splitting process, the exploiter's request has already been translated into the appropriate MCB and Message Buffer Address List (MBAL), as if it were going to be performed as a simplex request. The processing for duplex request splitting duplicates this input MCB and MBAL into two separate message command blocks and message buffer address lists, one for each of the two commands (primary and secondary), STEP 572. At this point, they are identical in terms of all MCB operands and MBAL operands/contents.

Next, command-specific duplexed request operands are modified in the primary and/or the secondary command's MCB, depending on what specific command the user has requested, what specific request operands have been requested, environmental factors related to the processing of the request, and the like, STEP 574. Additional details of these command-specific modifications follow. Further, additional details relating to the definition and meaning of the operands that are used by this processing are described in a co-filed application entitled "Coupling Of A Plurality Of Coupling Facilities Using Peer Links," Brooks et al. Ser. No. 09/968,244, which is hereby incorporated herein by reference in its entirety.

Command Specific Modifications

Read and Register

When initially driven, this command is directed in simplex mode to the primary structure. At that time, the Storage-Class-change Control (STCCC) and Duplexing Active Indicator (DUPAI) operands are set on. The STCCC indicates that the request is to be failed in simplex mode, if it will cause the storage class of the processed entry to be modified.

Should that failure occur, the request will be redriven in duplex mode (and thus, employ duplex request splitting). On the duplex flow, the STCCC and DUPAI operands are set off in both the primary and secondary. Additionally, the assignment control (AC) and name replacement control (NRC) operands are set off in the secondary, and the suppress registration (SREG) operand is set on in the secondary (since, in this example, only changed data is duplexed, and since registrations are not duplexed). Furthermore, the suppress read (SR) and test message buffer size indicator (TMBSI) operands are set on in the secondary, since this is a read command, and there is no need to actually read the data twice from both structures.

Read for Castout

The local cache entry registration control (LCERC) and NRC operands are set off in the secondary, since registrations are not duplexed. The suppress read (SR) operand is set on in the secondary, since this is a read command, and there is no need to actually read the data twice from both structures.

Read Directory, Read Castout Class, Read Castout Class Information, Read List Controls, Read Lock Table Entry, Read Next Lock Table Entry, Read List, Read List Set, Read Event Monitor Controls, Read Event Queue Controls These commands are driven in simplex mode. The DUPAI is set on in the command sent to the primary structure.

Write When Registered

When this command executes in simplex mode, the DUPAI is set on in the command sent to the primary structure.

When this command executes in duplex mode, the suppress registration test (SREGT) and wait on ready to complete indicator (WRTCI) operands are set on in the secondary, since registrations are not duplexed.

Write And Register

When this command executes in simplex mode, the DUPAI is set on in the command sent to the primary structure.

When this command executes in duplex mode, the NRC and assignment suppression control (ASC) operands are set off in the secondary, and the SREG operand is set on in the secondary, since registrations are not duplexed. Furthermore, if the primary request is requesting assignment suppression or version number comparison, the WRTCI operand is set on in the secondary.

Unlock Castout Locks

The immediate reclaim control (IMMRC) operand is set on in the secondary to immediately reclaim entries that are unlocked for castout and are not otherwise marked as changed, since registrations and unchanged data are not duplexed.

Register Name List

When initially driven, this command is directed in simplex mode to the primary structure. At that time, the STCCC and DUPAI operands are set on. The STCCC indicates that the request is to be failed in simplex mode, if it will cause the storage class of a processed entry to be modified.

Should that failure occur, the request is redriven in duplex mode (and thus, employs duplex request splitting). On the duplex flow, the STCCC and DUPAI operands are set off in both the primary and secondary. Additionally, the SREG operand is set on in the secondary (since, in this example, only changed data is duplexed, and since registrations are not duplexed).

Unlock Castout Lock Entry

The IMMRC operand is set on in the secondary to immediately reclaim entries that are unlocked for castout and are not otherwise marked as changed, since registrations and unchanged data are not duplexed, in this example.

Invalidate Name List

The halt-invalidation control (HIC) operand is set off in the secondary to avoid halting processing of the command on the secondary structure when entries are not cached, since only entries with changed data are duplexed, in this example.

Write List Controls, Register List Monitor, Deregister List Monitor, Move List Entry, Delete List Entry, Delete List Entries, Register Event Monitors, Move List Entries For these commands, the suppress notification control (SNC) operand is set on in the secondary to avoid generating any associated list notifications twice, once from the primary structure and once from the secondary structure. Also, the SNC will cause the queueing or withdrawal of EMCs to/from event queues to be suppressed in the secondary structure (event queue contents are not duplexed in the secondary structure, in this example).

Write Lock Table Entry

If the command is requesting structure authority comparison to be performed (compare structure authorities control (CSAUC) is on), then the comparative authority values for the primary structure are propagated and reversed into the secondary request. This is done by copying the primary structure's comparative remote-facility structure authority (CRFSAU) value into the secondary structure's comparative structure authority (CSAU) operand, and copying the primary structure's CSAU value into the secondary structures CRFSAU operand.

Read List Entry

When this command executes in simplex mode, the DUPAI is set on in the command sent to the primary structure.

When this command executes in duplex mode, if the primary command's request operands indicate that data is to be read, then the SR operand is set for the secondary, since this is a read command, and there is no need to actually read the data twice from both structures.

Write List Entry, Write and Move List Entry, Record Global Lock Manager

For these commands, the suppress notification control (SNC) operand is set on in the secondary to avoid generating any associated list notifications twice, once from the primary structure and once from the secondary structure. Also, the SNC will cause the queueing or withdrawal of EMCs to/from event queues to be suppressed in the secondary structure (event queue contents are not duplexed in the secondary structure, in this example). Additionally, if the user did not designate a program-controlled list entry identifier (PLEID) for a request that is creating an entry, then the operating system generates a PLEID value on the user's behalf, and stores that value in the LEID operand of both the primary and secondary operation. This ensures that the created entry is identified by an identical LEID value in both the primary and secondary structure.

Move and Read List Entry, Read and Delete List Entry

For these commands, the SNC operand is set on in the secondary to avoid generating any associated list notifications twice, once from the primary structure and once from the secondary structure. Also, the SNC will cause the queueing or withdrawal of EMCs to/from event queues to be suppressed in the secondary structure (event queue contents are not duplexed in the secondary structure, in this example). Additionally, if the primary command's request operands indicate that data is to be read, then the SR operand is set for the secondary, since this is a read command, and there is no need to actually read the data twice from both structures.

Delete List Set

This command is processed first in simplex mode by converting the user's input request from a Delete List Set command into a simplex Read List Set command (by, for instance, copying the operands from the DLS command to the RLS command). On this Read List Set command, the version request type (VRT) operand is set to request no version number update, the data block size (DBS) operand is set based on the size of the user's input data buffer, the read LEIDs indicator (RLEIDI) operand is set on to request that a list of LEIDs be returned for subsequent use in a Delete List Entries command, and the DUPAI operand is set on.

Upon completion of the simplex mode Read List Set command, processing continues with a duplexed Delete List Entries command. The data buffer that will be passed on both the primary and secondary request contains the LEID list that was returned by the simplex mode Read List Set command. The vast majority of the operands in both the primary and secondary commands are then set as requested on the user's original Delete List Set request (though these operands are being applied now to a Delete List Entries command): These operands include, for instance, the LLB, LRT, KCT, VCRT, KRT, VRT, CGLM, LTEN, list notification (LN), list number comparison type (LNCT), CVN, LEK, LAUCT, SKCT, SKRT, user identifier (UID), MLEK, CLAU, SLEK, and MSLEK.

Additionally, the starting data index (SDI) operand is set to 1 and the ending data index (EDI) operand is set to the read list entry count (RLEC) response operand from the Read List Set command, indicating the number of entries that were returned for processing, in both the primary and secondary commands. The skip nonexistent entries control (SNEC) operand is set on in both the primary and secondary commands, to skip over any entries that might have been deleted since the Read List Set returned the list of entries to be processed.

Also, the suppress notification control (SNC) operand is set on in the secondary to avoid generating any associated list notifications twice, once from the primary and once from the secondary structure. Also, the SNC will cause the queueing or withdrawal of EMCs to/from event queues to be suppressed in the secondary structure (event queue contents are not duplexed in the secondary structure, in this example).

Delete List

This command is processed first in simplex mode by converting the user's input request from a Delete List command into a simplex Read List command. On this Read List command, the VRT operand is set to request no version number update, the DBS operand is set based on the size of the user's input data buffer, the RLEIDI operand is set on to request that a list of LEIDs be returned for subsequent use in a Delete List Entries command, and the DUPAI operand is set on.

Upon completion of the simplex mode Read List command, processing continues with a duplexed Delete List Entries command. The data buffer that will be passed on both the primary and secondary request contains the LEID list that was returned by the simplex mode Read List command. The vast majority of the operands in both the primary and secondary commands are then set as requested on the user's original Delete List request (though these operands are being applied now to a Delete List Entries command). These operands include, for instance, the LLB, LRT, KCT, VCRT, KRT, VRT, CGLM, LTEN, LN, CVN, LEK, LAUCT, SKCT, SKRT, UID, MLEK, CLAU, SLEK, and MSLEK.

Additionally, the LNCT operand is set on in both the primary and secondary commands. The SDI operand is set to 1 and the EDI operand is set to the RLEC response operand from the Read List command, indicating the number of entries that were returned for processing, in both the primary and secondary commands. The intermediate controls returned on timeout control (ICRTOC) and skip-nonexistent entries control (SNEC) operands are set on in both the primary and secondary commands, to skip over any entries that might have been deleted since the Read List returned the list of entries to be processed.

If the Delete List command is requesting structure authority comparison to be performed (CSAUC is on), the comparative authority values for the primary structure are propagated and reversed into the secondary request. This is done by copying the primary structure's CRFSAU value into the secondary structure's CSAU operand, and copying the primary structure's CSAU value into the secondary structures CRFSAU operand.

Also, the SNC operand is set on in the secondary to avoid generating any associated list notifications twice, once from the primary structure and once from the secondary structure. Also, the SNC will cause the queuing or withdrawal of EMCs to/from event queues to be suppressed in the secondary structure (event queue contents are not duplexed in the secondary structure, in this example).

Invalidate Name

This command is processed first in simplex mode by converting the user's input request from an Invalidate Name command into a simplex Read Directory command. On this Read Directory command, the DBS operand is set based on the size of the user's input data buffer, the RTYP operand is set to request that a list of name blocks be returned for subsequent use in an Invalidate Name List command, and the DUPAI operand is set on. Also, the following operands on the Read Directory command are set to the same value that they had on the user's input Invalidate Name request: name mask (NM), restart token (RT), name (N), and version request type (VRT).

Additionally, if version number comparison was requested on the input Invalidate Name request, then the simplex Read Directory command will set the version comparison request type (VCRT) and comparison version number (CVN) operands as in the user's original request, and will set the name block format control (NBFC) operand to request a name block format containing both names and version numbers for version comparison purposes. If version number comparison was not requested, the NBFC operand will be set to request a name block containing just the names, since version number comparison is not needed.

Upon completion of the simplex mode Read Directory command, processing continues with a duplexed Invalidate Name List command. The data buffer that will be passed on both the primary and secondary request contains the list of name blocks (in either format) that was returned by the simplex mode Read Directory command. The majority of the operands in both the primary and secondary commands are then set as requested on the user's original Invalidate Name request (though these operands are being applied now to an Invalidate Name List command). These operands include, for instance, the invalidation type (ITYP), version comparison request type (VCRT), and the version request type (VRT).

Additionally, the start-of-list (SL) operand is set to 1 and the end-of-list (EL) operand is set to the processed count (PC) response operand from the Read Directory command, indicating the number of entries that were returned for processing, in both the primary and secondary commands.

In this embodiment, duplexed commands not explicitly mentioned in the above list do not have any command-specific operand modifications performed at STEP 574.

Continuing, generic duplexed request operands are set in the primary and secondary MCB, STEP 576. These operations are generic in that they are performed for all (in this example) duplex mode commands, regardless of the type of command that is being performed. These generic modifications include, for instance:

Setting the primary and secondary Structure Identifier (SID) operand appropriately to reference the primary and secondary structures in their respective coupling facilities.

Setting the operands which tie the primary and secondary commands together and request duplexing signal exchanges and protocols to be performed by the coupling facility. These include the command sequence number (CSN), duplexing signal group index (DSGX), and duplexing retry index (DRX) request operands. Note that the CSN is set to a timestamp value which is used by the coupling facility in a protocol for deadlock resolution, should the coupling facility experience a protocol deadlock in the processing of this duplexed request vis a vis other duplexed requests. As an example, the CSN value reflects the time at which the request was split, and can be used later during redrive processing to determine how "old" this duplex pair of requests has become, and arbitrate deadlock decisions in favor of processing the "oldest" requests first.

Note that, in this embodiment, there have been no modifications made to the replicated MBAL information. This implies that on a duplexed request that transfers data to the coupling facility, the same data, from the same data buffers, is transferred for both the primary and secondary requests. This also implies that on a duplexed request that receives data from the coupling facility, the same data buffer validation processing can occur for both the primary and secondary requests, although in general the actual "read" data transfer occurs from only the primary coupling facility, and is suppressed from the secondary coupling facility.

Duplexed Request Merging/Reconciliation

One embodiment of the processing associated with merging and reconciling the results of a duplexed pair of coupling facility operations (STEP 520, FIG. 5*b*), once both are observed to have completed at the coupling facility, is described with reference to FIG. 5*h*.

When a duplexed pair of requests is processed by the coupling facility, the coupling facility undertakes a series of architected signal exchanges to coordinate and synchronize the execution of the commands. The protocols associated with the signal exchanges are depicted in FIG. 4 and described in further detail in a co-filed patent application entitled "Coupling Of A Plurality Of Coupling Facilities Using Peer Links," Brooks et al., Ser. No. 09/968,244, which is hereby incorporated herein by reference in its entirety.

In one embodiment, these protocols expect coupling facility-to-coupling facility communication to be operating correctly in order to perform the duplexing protocols. If the coupling facility determines that the communication does not exist at the time that a duplexed command is to be processed, or if the coupling facility detects a failure of the coupling facility-to-coupling facility communication at a point that is critical to the processing of the duplexed requests, it indicates (either via the DDI response operand or via a response code) that duplexing is broken.

The coupling facility may also indicate via a response code that a duplexed operation experienced a signaling protocol "deadlock" which was detected by the coupling facility and handled via "request for suppression" processing. This deadlock detection and handling is described in more detail in a co-filed patent application entitled "COUPLING OF A PLURALITY OF COUPLING FACILITIES USING PEER LINKS," Brooks et al. Ser. No. 09/968,244, which is hereby incorporated herein by reference in its entirety. When such deadlocks are detected and handled by the coupling facility, the duplexed requests will fail with an indicative response code, which is handled by the operating system redriving the requests, transparently to the exploiter.

Yet another possible outcome of the duplexed operation is that the pair of requests both complete "normally," but with a set of response codes or other response operand information that is inconsistent in some way. Should this occur, it indicates that the duplexed structure instances, though still duplexed, have fallen "out of synch" with one another and are no longer maintaining redundant copies of the same duplexed data. While this should not happen if duplexing protocols are operating correctly, the operating system detects such inconsistencies, if in fact they occur, and deals with them appropriately.

Figure 5H:
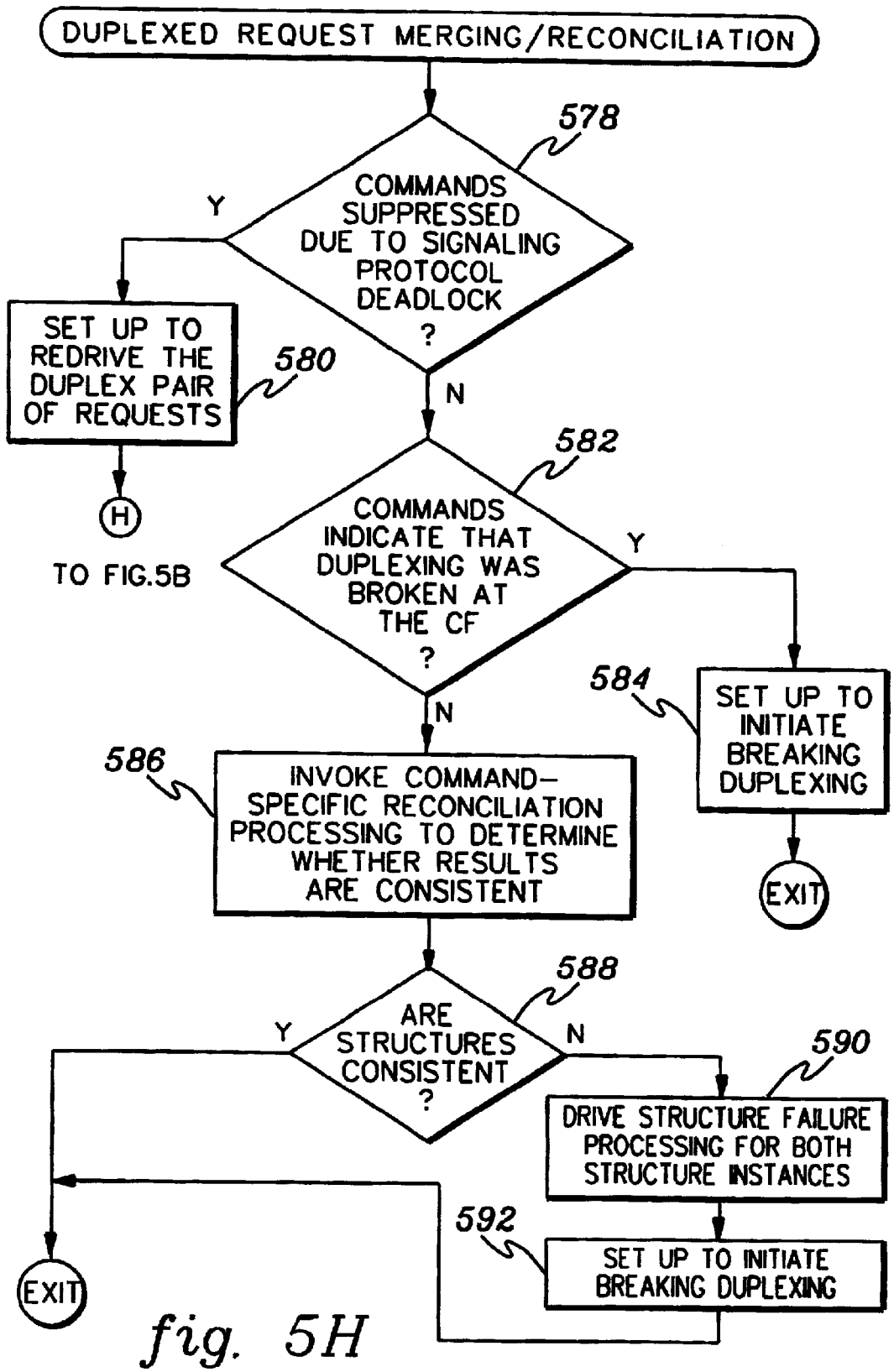

Referring to FIG. 5h, initially, a determination is made as to whether the coupling facility has indicated that the commands were suppressed as a result of a detected signaling protocol "deadlock," as indicated by response codes from the coupling facility, INQUIRY 578. If so, the commands are set up to be redriven again, as a duplexed pair, STEP 580, and processing flows back to (h) in FIG. 5b. In particular, note that the requests have already been "split," so there is no need to repeat this processing, and also that the duplex request operands, such as the CSN have already been set for this duplex pair of requests and are not modified when the commands are redriven. This helps ensure that, when this pair of requests is redriven to the coupling facilities, should another deadlock occur at the coupling facilities involving this request, the coupling facility will be more likely to resolve the deadlock in favor of this "older" command. This promotes "fairness" in ensuring that this duplex pair of requests can make progress towards actually executing in the coupling facilities.

If the commands were not suppressed, INQUIRY 578, then a further determination is made as to whether the coupling facility indicated that duplexing was broken at the coupling facility, either via the DDI response operand or via an indicative response code, INQUIRY 582. If so, set up to initiate software processing for breaking duplexing (as duplexing has already been broken at the coupling facility), STEP 584, and this flow is exited. Upon return to the flow described in FIGS. 5b and 5c, if breaking duplexing is required, this occurs at STEP 528, and the current request is held at STEP 530. Part of the setup processing at STEP 584 (FIG. 5h) may include taking a dump to capture diagnostic information regarding the reason why duplexing is being broken, issuing messages to the operator console indicating that duplexing is broken, and the like.

Returning to INQUIRY 582, otherwise, the requests appear to have completed successfully without breaking duplexing, yet there still may be anomalies present in the primary and secondary operation results that indicate a logical inconsistency between the primary and secondary structure. As a simple example, consider a Write List Entry command that is attempting to update an existing list entry in the structure. The primary and secondary commands should both indicate either that the requested entry was found for processing (and was either updated or not, depending on other processing for the command), or both indicate that the requested entry was not found for processing. If one command indicates that the entry was found while, the other command indicates that the entry was not found, then the duplex pair of structures is out of sync with one another, as the result of some previous breakdown of the duplexing protocols for this structure.

Since the set of command response codes differs from command to command, and since there are cases where different response codes from the primary and secondary structures are allowable and do not indicate that the structures are out of synch with one another, in order to determine whether or not the command results are consistent, a command-specific "reconciliation table" is consulted to determine whether the observed response code results are consistent or inconsistent, STEP 586. Details of this command-specific processing are described below. After this, a determination is made as to whether a structure inconsistency has been detected, INQUIRY 588.

If the structures are consistent, then this flow is exited and returned to the processing described in FIGS. 5b and 5c to complete the processing of the duplexed request in a normal fashion, without breaking duplexing, STEP 532 (FIG. 5c). However, if the structures are inconsistent, INQUIRY 588 (FIG. 5h), then structure failure processing is driven for both of the structure instances, the primary and secondary, STEP 590, a set up to initiate breaking of duplexing is performed, STEP 592, and this flow exits. On return to FIGS. 5b and 5c, software break duplexing processing is initiated for the structure, STEP 528 (FIG. 5c), but with the further caveat that both structure instances have been marked as failed.

In this case, when we have detected that the structures are inconsistent with one another, note that the inconsistency was not caused by the current duplexed operation, it was simply detected by the current duplexed operation. It is not known when the inconsistency was introduced as a result of some prior operation being improperly processed, nor is it known how many other as-yet-undetected inconsistencies may be lurking in the structure, nor is it known with certainty which structure contains the "correct" data for the entry (and in fact, if there are multiple inconsistencies, the primary structure may contain the "correct" data for some entries and the secondary structure may contain the "correct" data for other entries). In this example, there is no way to know how to recover from such an error, once it is detected; and note, the introduction of such inconsistencies is not supposed to be possible within the scope of the duplexing architecture and protocols. Therefore, this type of error is handled by:

Indicating a structure failure on both structures,

Breaking duplexing, and

Externalizing the structure failure associated with the remaining simplex mode structure after duplexing is broken, to the exploiter.

It may or may not be possible for the exploiter to recover from this failure, using existing mechanisms, such as user-managed structure rebuild processing, recovery of the data from logs, etc.

Referring back to STEP 586 (FIG. 5h) the following are examples of command-specific reconciliation tables used in the processing at STEP 586. The tables list possible combinations of response code from the primary (P), in rows, and secondary (S), in columns, which are considered valid, and thus, do not indicate any inconsistency. At each row/column position in the matrix, either there is a value (which if present, indicates that the combination of response codes is valid, and indicates what the resulting response code returned to the exploiter should be), or there is no value, which indicates an inconsistent combination of response codes. Note that the "R" row/column indicates any of several possible responses that indicate that recovery/restart processing is to be performed for the operation for some reason unrelated to duplexing, such as an Interface Control Check error (IFCC). In some cases, additional command-specific response operand verification can also be performed to ensure that the requests have not only completed with a valid pair of response codes, but also with consistent operand information returned; such cases are designated and described by "*" in these tables.

Examples of the reconciliation tables for each duplexed command type appear below, followed by a representative code implementation of those tables (implemented via a macro invocation which lists each valid "triplet" comprised of primary response code, secondary response code, and resultant response code to be given to the exploiter).

HIC value is zero on these commands. When this response code is returned, the secondary MCB is in error.

One example of a macro used to create the above table is as follows:

```
?RTE Command(INL,(4,21),ListForm) RESULTS(
   (KMLC_Success,KMLC_Success,KMLC_Success)
  ,(KMLC_INLTimeout,KMLC_INLTimeout,KMLC_
     INLTimeout,Verify_UCL_INL_CLI)
  ,(KMLC_INLNoName,KMLC_INLTimeout,
     KMLC_INLNoName,Verify_UCL_INL_CLI)
  ,(KMLC_VersCompFailure,KMLC_INLTimeout,
     KMLC_VersCompFailure,Verify_UCL_INL_
     CLI)
  ,(KMLC_INLNoName,Execution_halted,KMLC_
     INLNoName)
  ,(KMLC_VersCompFailure,Execution_halted,
     KMLC_VersCompFailure)
  ,(KMLC_Success,Restart,KMLC_Success)
  ,(Restart,KMLC_Success,KMLC_Success)
  ,(KMLC_INLTimeout,Restart,KMLC_INLTimeout)
  ,(KMLC_INLNoName,Restart,KMLC_
     INLNoName)
  ,(KMLC_VersCompFailure,Restart,KMLC_
     VersCompFailure)
  );
```

INL - Invalidate Name List

| P\S | 0 | 1 | 2 | 3 | 4 | 5 | 6 | 7 | 8 | 9 | 10 | 11 | 12 | 16 | 18 | R |
|---|---|---|---|---|---|---|---|---|---|---|---|---|---|---|---|---|
| 0 | 0 | | | | | | | | | | | | | | | 0 |
| 1 | | 1*# | | | | | | | | | | | | | | 1# |
| 2 | | | | | | | | | | | | | | | | |
| 3 | | | | | | | | | | | | | | | | |
| 4 | | 4* | | | | | | | | | | | | | | 4  4 |
| 5 | | 5* | | | | | | | | | | | | | | 5  5 |
| 6 | | | | | | | | | | | | | | | | |
| 7 | | | | | | | | | | | | | | | | |
| 8 | | | | | | | | | | | | | | | | |
| 9 | | | | | | | | | | | | | | | | |
| 10 | | | | | | | | | | | | | | | | |
| 11 | | | | | | | | | | | | | | | | |
| 12 | | | | | | | | | | | | | | | | |
| 16 | | | | | | | | | | | | | | | | |
| 18 | | | | | | | | | | | | | | | | |
| R | 0 | R# | | | | | | | | | | | | | | R |

*-Verify 'Current List Index' is the same for both operations
-Check whether request has been suppressed
R-Restart Design notes, for this example:

1) Response codes which generate a halt signal ==> 1, 4 and 5.
2) Command suppression response codes ==> 18, 19, 20, 253 & 254
3) For response code pairs (1,1), (4,1) and (5,1) verify that the returned current list item (CLI) is the same for both commands (Note the current list item is only returned for response codes 1, 4 and 5). If the indexes don't match, break duplexing, request a dump and place the request on the hold queue.
4) Response codes 4 and 5 should not be returned for commands driven to the secondary structure because the RAR - Read And Register

| P\S | 0 | 1 | 2 | 3 | 4 | 5 | 6 | 7 | 8 | 9 | 10 | 11 | 12 | 16 | 18 | R |
|---|---|---|---|---|---|---|---|---|---|---|---|---|---|---|---|---|
| 0 | 0  0 | | | | | | | | | | | | | | | 0 |
| 1 | 1  1 | | | | | | | | | | | | | | | 1 |
| 2 | | 2 | | | | | | | | | | | | | | 2 |
| 3 | | | | 3 | | | | | | | | 3 | | | | 3  3 |
| 4 | | | | | | | | | | | | | | | | |
| 5 | | | | | | | | | | | | | | | | |
| 6 | | | | | | | | | | | | | | | | |
| 7 | | | | | | | | | | | | | | | | |
| 8 | | | | | | | | | | | | | | | | |
| 9 | | | | | | | | | | | | | | | | |
| 10 | | | | | | | | | | | | | | | | |
| 11 | | | 11  11 | | | | | | | | | 11 | | | | 11 |
| 12 | | | | | | | | | | | | | | | | |
| 16 | | | | | | | | | | | | | | | | |
| 18 | | | | 3 | | | | | | | | | | | | |
| R | R  R  R | | | | | | | | | | | 11 | | | R |

R-Restart

Design notes, for this example:

1) Response codes which generate a halt signal ==> 3
2) Command suppression response codes ==> 18, 19, 20, 253 & 254
3) Response code 0 should not be returned on the secondary command because the secondary command suppresses the read operation. Response code 1 indicates successful command completion when read suppression is requested. When response code 0 is returned for a secondary command, the MCB is in error.
4) Response code pairs (0,2) and (1,2) can occur and are to be tolerated because the secondary structure does not contain unchanged entries. For these cases, the primary response code is returned.

5) Response code pair (11,3) can occur when the primary command recognizes the insufficient message buffer space (RC 11) condition and the secondary command recognizes the target storage class full (RC 3) condition. This is possible because the insufficient message-buffer response code is not prioritized relative to the target storage class full response code. In this case the insufficient message-buffer response code is returned.

6) Response code 6 should not be returned (from either structure) for duplex commands, because the duplex commands do not request halting when the command results in a storage class change (STCCC=0 is always specified on duplex commands). When this response code is returned, the MCB is in error.

One example of a macro used to create the above table is as follows:

```
?RTE Command(RAR,(4,0)) RESULTS(
    (KRAROk,KRARRegNoData,KRAROk)
    ,(KRAROk,KRARNameNotAssigned,KRAROk)
    ,(KRARRegNoData,KKRARRegNoData,
      KRARRegNoData)
    ,(KRARRegNoData,KRARNameNotAssigned,
      KRARRegNoData)
    ,(KRARNameNotAssigned,KRARNameNotAssigned,
      KRARNameNotAssigned)
    ,(KRARStgClassFull,KRARStgClassFull,
      KRARStgClassFull)
    ,(KRARStgClassFull,kRARInsuffSpace,
      kRARStgClassFull)
    ,(KRARStgClassFull,Execution_Halted,
      KRARStgClassFull)
    ,(KRARInsuffSpace,kRARNameNotAssigned,
      KRARInsuffSpace)
    ,(KRARInsuffSpace,KRARStgClassFull,
      KRARInsuffSpace)
    ,(KRARInsuffSpace,kRARInsuffSpace,
      KRARInsuffSpace)
    ,(Execution_halted,KRARStgClassFull,
      KRARStgClassFull)
    ,(KRAROk,Restart,KRAROk)
    ,(KRARRegNoData,Restart,KRARRegNoData)
    ,(KRARNameNotAssigned,Restart,
      KRARNameNotAssigned)
    ,(KRARStgClassFull,Restart,KRARStgClassFull)
    ,(KRARInsuffSpace,Restart,KRARInsuffSpace)
    ,(Restart,kRARInsuffSpace,KRARInsuffSpace)
);
```

RFCO - Read For CastOut

| P\S | 0 | 1 | 2 | 3 | 4 | 5 | 6 | 7 | 8 | 9 | 10 | 11 | 12 | 16 | 18 | R |
|---|---|---|---|---|---|---|---|---|---|---|---|---|---|---|---|---|
| 0 | 0 |   |   |   |   |   |   |   |   |   |   |    |    |    |    | 0 |
| 1 |   | 1 |   |   |   |   |   |   |   |   |   | 1  |    |    |    | 1 |
| 2 |   |   | 2 |   |   |   |   |   |   |   |   |    |    |    |    | 2 |
| 3 |   |   |   | 3 |   |   |   |   |   |   |   |    |    |    |    | 3 |
| 4 |   |   |   |   |   |   |   |   |   |   |   |    |    |    |    |   |
| 5 |   |   |   |   |   |   |   |   |   |   |   |    |    |    |    |   |
| 6 |   |   |   |   |   |   |   |   |   |   |   |    |    |    |    |   |
| 7 |   |   |   |   |   |   |   |   |   |   |   |    |    |    |    |   |
| 8 |   |   |   |   |   |   |   |   |   |   |   |    |    |    |    |   |
| 9 |   |   |   |   |   |   |   |   |   |   |   |    |    |    |    |   |
| 10 |  |   |   |   |   |   |   |   |   |   |   |    |    |    |    |   |
| 11 | 11 | 11 |   |   |   |   |   |   |   |   |   | 11 |    |    |    | 11 |
| 12 |  |   |   |   |   |   |   |   |   |   |   |    |    |    |    |   |
| 16 |  |   |   |   |   |   |   |   |   |   |   |    |    |    |    |   |
| 18 |  |   |   |   |   |   |   |   |   |   |   |    |    |    |    |   |
| R | R | R | R | R |   |   |   |   |   |   |   | 11 |    | R  | R  |   |

R-Restart

Design notes, for this example:

1) Response codes which generate a halt signal ==> None
2) Command suppression response codes ==> 18, 19, 20, 253 & 254
3) Response code pair (2,3) can occur if the requester specifies an entry that is not changed. Since the entry is not changed, it is allowable for the entry to be absent from the secondary structure. As a result, this response code pair is to be tolerated. The Data not Changed response code (RC 2) will be returned, since this is the condition which allowed the entry to be absent from the secondary structure.
4) Response code 2 should not be returned on the secondary command because the secondary structure only contains changed data.
5) If a restart is indicated from the primary structure, a restart will be indicated regardless of what was returned from the secondary structure: Data is only returned from the primary structure, and there are no retry buffers to retrieve the data from the secondary structure after the fact.

One example of a macro used to create the above table is as follows:

```
?RTE Command(RFCO,(4,1)) RESULTS(
    (KMLC_Success,KMLC_Success,KMLC_Success)
    ,(KMLC_RFCOLocked,KMLC_RFCOLocked,
      KMLC_RFCOLocked)
    ,(KMLC_RFCOLocked,KMLC_CmdBufTooSmall,
      KMLC_RFCOLocked)
    ,(KMLC_RFCOUnchanged,KMLC_RFCONoName,
      KMLC_RFCOUnchanged)
    ,(KMLC_RFCONoName,KMLC_RFCONoName,
      KMLC_RFCONoName)
```

,(KMLC_CmdBufTooSmall,kMLC_RFCOLocked,
    KMLC_CmdBufTooSmall)
,(KMLC_CmdBufTooSmall,kMLC_RFCONOName,
    KMLC_CmdBufTooSmall)
,(KMLC_CmdBufTooSmall,kMLC_
    CmdBufTooSmall,KMLC_CmdBufTooSmall)
,(KMLC_Success,Restart,KMLC_Success)
,(KMLC_RFCOLocked,Restart,KMLC_
    RFCOLocked)
,(KMLC_RFCOUnchanged,Restart,KMLC_
    RFCOUnchanged)
,(KMLC_RFCONoName,Restart,KMLC_
    RFCONoName)
,(KMLC_CmdBufTooSmall,Restart,KMLC_
    CmdBufTooSmall)
,(Restart,KMLC_CmdBufTooSmall,KMLC_
    CmdBufTooSmall)
);

RNL - Register Name List

| P\S | 0 | 1 | 2 | 3 | 4 | 5 | 6 | 7 | 8 | 9 | 10 | 11 | 12 | 16 | 18 | R |
|-----|---|---|---|---|---|---|---|---|---|---|----|----|----|----|----|---|
| 0   | 0*|   |   |   |   |   |   |   |   |   |    |    |    |    |    | 0 |
| 1   |   | 1*#| | 3*#|  |   |   |   |   |   |    |    |    |    |    | R#|
| 2   |   |   |   |   |   |   |   |   |   |   |    |    |    |    |    |   |
| 3   |   |   |   | 3*#| | 3*|   |   |   |   |    |    |    |    | 3  | 3 |
| 4   |   |   |   |   | 4*|  |   |   |   |   |    |    |    |    |    | 4 |
| 5   |   |   |   |   |   | 5*|  |   |   |   |    |    |    |    |    | 5 |
| 6   |   |   |   |   |   |   |   |   |   |   |    |    |    |    |    |   |
| 7   |   |   |   |   |   |   |   |   |   |   |    |    |    |    |    |   |
| 8   |   |   |   |   |   |   |   |   |   |   |    |    |    |    |    |   |
| 9   |   |   |   |   |   |   |   |   |   |   |    |    |    |    |    |   |
| 10  |   |   |   |   |   |   |   |   |   |   |    |    |    |    |    |   |
| 11  |   |   |   |   |   |   |   |   |   |   |    |    |    |    |    |   |
| 12  |   |   |   |   |   |   |   |   |   |   |    |    |    |    |    |   |
| 16  |   |   |   |   |   |   |   |   |   |   |    |    |    |    | 16*| 16|
| 18  |   |   |   | 3 |   |   |   |   |   |   |    |    |    |    |    |   |
| R   | 0 | R#|   | 3 | 4 | 5 |   |   |   |   |    |    |    |    | 16 | R |

*-Verify 'Registration Index' is the same for both operations
-Check whether request has been suppressed
R-Restart Design notes, for this example:
1) Response codes which generate a halt signal ==> 1,3
2) Command suppression response codes ==> 18, 19, 20, 253 & 254
3) For response code pairs (0,0), (1,1), (1,3), (3,1), (3,3), (4,4), (5,5) and (16,16) verify the same registration index (RGX) is returned on both commands (Note the RGX is not returned for response codes 18, 19, 20, 254 and 255). If the indexes don't match, break duplexing, request a dump and place the request on the hold queue.
4) Response codes 5 and 16 should not be returned for duplexed commands.
5) Response code 6 should not be returned for duplexed commands. This response code can only be returned when STCCC='1'b which is only specified on simplex commands.
    One example of a macro used to create the above table is as follows:
    ?RTE Command(RNL,(4,19),ListForm) RESULTS(
    (KRNLOk,KRNLOk,KRNLOk,Verify_RNL_RGX)
    ,(KRNLTimeout,KRNLTimeout,KRNLTimeout,
        Verify_RNL_RGX)
    ,(KRNLTimeout,KRNLStgClassFull,
        KRNLStgClassFull,Verify_RNL_RGX)
    ,(KRNLStgClassFull,KRNLTimeout,
        KRNLStgClassFull,Verify_RNL_RGX)
    ,(KRNLStgClassFull,KRNLStgClassFull,
        KRNLStgClassFull,Verify_RNL_RGX)
    ,(KRNLStgClassFull,Execution_halted,
        KRNLStgClassFull)
    ,(KRNLBadStgClass,KRNLBadStgClass,
        KRNLBadStgClass,Verify_RNL_RGX)
    ,(KRNLBadLCID,KRNLBadLCID,KRNLBadLCID,
        Verify_RNL_RGX)
    ,(KRNLHaltOnInactiveLCID,
        KRNLHaltOnInactiveLCID,
        KRNLHaltOnInactiveLCID,Verify_RNL_RGX)
    ,(Execution_Halted,KRNLStgClassFull,
        KRNLStgClassFull)
    ,(Restart,KRNLOk,KRNLOk)
    ,(KRNLOk,Restart,KRNLOk)
    ,(Restart,KRNLStgClassFull,KRNLStgClassFull)
    ,(KRNLStgClassFull,Restart,KRNLStgClassFull)
    ,(Restart,KRNLBadStgClass,KRNLBadStgClass)
    ,(KRNLBadStgClass,Restart,KRNLBadStgClass)
    ,(Restart,KRNLBadLCID,KRNLBadLCID))
    ,(KRNLBadLCID,Restart,KRNLBadLCID))
    ,(Restart,KRNLHaltOnInactiveLCID,
        KRNLHaltOnInactiveLCID)
    ,(KRNLHaltOnInactiveLCID,Restart,
        KRNLHaltOnInactiveLCID)
);

UCLE - Unlock Castout Lock Entry

| P\S | 0 | 1 | 2 | 3 | 4 | 5 | 6 | 7 | 8 | 9 | 10 | 11 | 12 | 16 | 18 | R |
|-----|---|---|---|---|---|---|---|---|---|---|----|----|----|----|----|---|
| 0   | 0 |   |   |   |   |   |   |   |   |   |    |    |    |    |    | 0 |
| 1   |   |   |   |   |   |   |   |   |   |   |    |    |    |    |    |   |
| 2   |   |   | 2 | 2 |   |   |   |   |   |   |    |    |    |    |    | 2 |
| 3   |   |   |   | 3 |   |   |   |   |   |   |    |    |    |    |    | 3 |
| 4   |   |   |   |   |   |   |   |   |   |   |    |    |    |    |    |   |
| 5   |   |   |   |   |   | 5 |   |   |   |   |    |    |    |    |    | 5 |
| 6   |   |   |   |   |   |   |   |   |   |   |    |    |    |    |    |   |
| 7   |   |   |   |   |   |   |   |   |   |   |    |    |    |    |    |   |
| 8   |   |   |   |   |   |   |   |   |   |   |    |    |    |    |    |   |
| 9   |   |   |   |   |   |   |   |   |   |   |    |    |    |    |    |   |
| 10  |   |   |   |   |   |   |   |   |   |   |    |    |    |    |    |   |
| 11  |   |   |   |   |   |   |   |   |   |   |    |    |    |    |    |   |
| 12  |   |   |   |   |   |   |   |   |   |   |    |    |    |    |    |   |
| 16  |   |   |   |   |   |   |   |   |   |   |    |    |    |    |    |   |
| 18  |   |   |   |   |   |   |   |   |   |   |    |    |    |    |    |   |
| R   | 0 |   | 2 | R | R | 5 |   |   |   |   |    |    |    |    |    |   |

R-Restart

Design notes, for this example:

1) Response codes which generate a halt signal ==> None
2) Command suppression response codes ==> 2, 3, 5, 18, 19, 20, 253 and 254
3) Response code pair (2,3) can occur if the requester specifies an entry that is not locked for castout. Since the entry is not locked for castout it is allowable for the entry to be absent from the secondary structure. As a result, this response code pair is to be tolerated. The Compare Mismatch on CO lock response code (RC 2) will be returned since this is the condition which allowed the entry to be absent from the secondary structure.

One example of a macro used to create the above table is as follows:

```
?RTE Command(UCLE,(4,20))
    HandleRedriveModified(KMLC_Success) RESULTS(
    (KMLC_Success,KMLC_Success,KMLC_Success)
    ,(KMLC_UCLENotHeld,KMLC_UCLENotHeld,
      KMLC_UCLENotHeld)
    ,(KMLC_UCLENotHeld,KMLC_UCLENoName,
      KMLC_UCLENotHeld)
    ,(KMLC_UCLENoName,KMLC_UCLENoName,
      KMLC_UCLENoName)
    ,(KMLC_UCLEBadCOLockState,KMLC_
      UCLEBadCOLockState,KMLC_
      UCLEBadCOLockState)
    ,(Restart,KMLC_Success,KMLC_Success)
    ,(KMLC_Success,Restart,KMLC_Success)
    ,(Restart,KMLC_UCLENotHeld,KMLC_
      UCLENotHeld)
    ,(KMLC_UCLENotHeld,Restart,KMLC_
      UCLENotHeld)
    ,(KMLC_UCLENoName,Restart,KMLC_
      UCLENoName)
    ,(KMLC_UCLEBadCOLockState,Restart,KMLC_
      UCLEBadCOLockState)
    ,(Restart,KMLC_UCLEBadCOLockState,KMLC_
      UCLEBadCOLockState)
    );
```

UCL - Unlock Castout Locks

```
P\S  0  1  2  3  4  5  6  7  8  9  10 11 12 16 18 R
 \  ┌─────────────────────────────────────────────────
 0  │ 0                                              0
 1  │    1*#                                         1@#
 2  │       2*  2*                                   2
 3  │           3*                                   3
 4  │               4*                               4
 5  │                   5*                           5
 6  │                       6                        6
 7  │                           7                    7
 8  │
 9  │
 10 │
 11 │
 12 │
 16 │
 18 │
 R  │ 0  1# 2   R  4  5  6  7
 \  └─────────────────────────────────────────────────
```

*-Verify 'Current List Index' is the same for both operations
-Check whether request has been suppressed
-Verify UCL is not part of a converted command (triple); restart if it is.
R-Restart Design notes, for this example:
1) Response codes which generate a halt signal ==> 1
2) Command suppression response codes ==> 18, 19, 20, 253 and 254
3) For response code pairs (1,1), (2,2), (2,3), (3,3), (4,4) and (5,5) verify that the returned current list item (CLI) is the same for both commands. If the indexes don't match, break duplexing, request a dump and place the request on the hold queue.
4) Response code pair (2,3) can occur if the requester specifies an entry that is not Locked for castout. Since the entry is not locked for castout it is allowable for the entry to be absent from the secondary structure. As a result, this response code pair is to be tolerated. The Compare Mismatch on CO lock response code (RC 2) will be returned since this is the condition which allowed the entry to be absent from the secondary structure.
5) Response codes 6 and 7 can only be returned when Detachment Emulation (DTEMC=1) is requested.
6) Response code 6 may be returned in conjunction with the duplexing inactive (RC=20) response code.
7) A Restart on the primary and a RC=1 on the secondary, may be restarted because the restart token from the primary is to be returned if the UCL is part of a converted command (triple).

One example of a macro used to create the above table is as follows:

```
?RTE Command(UCL,(4,8),ListForm)
    HandleRedriveModified(KuclTimeout) RESULTS(
    (KUclOk,KUclOk,KUclOK)
    ,(KUclTimeout,KUclTimeout,KUclTimeout,Verify_
      UCL_INL_CLI)
    ,(KUclCastOutLockMismatch,
      KUclCastoutLockMismatch,
      kUclCastOutLockMismatch,Verify_UCL_INL_
      CLI)
    ,(KUclCastOutLockMismatch,
      KUclNameNotAssigned,
      KUclCastOutLockMismatch,Verify_UCL_INL_
      CLI)
    ,(KUclNameNotAssigned,KUclNameNotAssigned,
      KUclNameNotAssigned,Verify_UCL_INL_CLI)
    ,(KUclBadCastOutParity,KUclBadcastoutParity,
      KuclBadCastoutParity,Verify_UCL_INL_CLI)
    ,(KUclBadCastOutLockState,
      KUclBadCastOutLockState,
      KUclBadCastOutLockState,Verify_UCL_INL_
      CLI)
    ,(KUclStrAuthMisMatch,KUclStrAuthMismatch,
      KUclStrAuthMismatch)
    ,(KUclLcauMismatch,KUclLcauMismatch,
      KUclLcauMismatch)
    ,(Restart,KUclOk,KUclOK)
    ,(KUclOk,Restart,KUclOK)
    ,(Restart,KUclTimeout,KUclTimeout,Verify_UCL_
      NotTriple)
    ,(KUclTimeout,Restart,KUclTimeout)
    ,(Restart,KUclCastOutLockMismatch,
      KUclCastoutLockMismatch)
    ,(KUclCastOutLockMismatch,Restart,
      KUclCastoutLockMismatch)
    ,(KUclNameNotAssigned,Restart,
      KUclNameNotAssigned)
    ,(Restart,KUclBadCastOutLockState,
      KUclBadCastOutLockState)
    ,(KUclBadCastOutLockState,Restart,
      KUclBadCastOutLockState)
    ,(Restart,KUclStrAuthMismatch,
      KUclStrAuthMismatch)
    ,(KUclStrAuthMisMatch,Restart,
      KUclStrAuthMismatch)
    ,(Restart,KUclLcauMismatch,KUclLcauMismatch)
    ,(KUclLcauMismatch,Restart,KUclLcauMismatch)
    );
```

```
                WAR - Write And Register
P\S  0  1  2  3  4  5  6  7  8  9  10  11  12  16  18  R
 \
 0 : 0                                                  0
 1 :
 2 :        2                                       2
 3 :
 4 :              4                                 4   4
 5 :              5  5                              5   5
 6 :                                                6   6
 7 :
 8 :
 9 :
10 :
11 :
12 :
16 :
18 :              4  5
 R : 0     2      R  5                                  R
 \
```

R-Restart

Design notes, for this example:
1) Response codes which generate a halt signal ==> 4, 5 and 6
3) Command suppression response codes ==> 18, 19, 20, 253 & 254
4) Response code pair (5,4) can occur when the specified name exists unchanged in the primary structure, the version-number comparison fails in the primary structure, the name does not exist in the secondary and the secondary operation fails with a target-storage-class full condition. The Version number mismatch (RC 5) response code will be returned.
5) Response code (4,5) is not expected because it can only occur if the version numbers are out of synch between the primary and secondary structures.
6) Response code 6 should not be returned for commands driven to the secondary structure because assignment is not suppressed (ASC='0'B) on these commands. If this response code is returned on a secondary command, the MCB is in error.

One example of a macro used to create the above table is as follows:

```
?RTE Command(WAR,(4,6))
   HandleRedriveModified(KWAROk) RESULTS(
   (KWAROk,KWAROk,KWAROk)
   ,(KWARIncompatibleState,KWARIncompatibleState,
      KWARIncompatibleState)
   ,(KWARStgClassFull,KWARStgClassFull,
      KWARStgClassFull)
   ,(KWARStgClassFull,Execution_Halted,
      KWARStgClassFull)
   ,(KMLC_VersCompFailure,KWARStgClassFull,
      KMLC_VersCompFailure)
   ,(KMLC_VersCompFailure,KMLC_
      VerscompFailure,KMLC_VersCompFailure)
   ,(KMLC_VersCompFailure,Execution_Halted,
      KMLC_VersCompFailure)
   ,(KMLC_AssignmentSuppressed,Execution_Halted,
      KMLC_AssignmentSuppressed)
   ,(Execution_Halted,KWARStgClassFull,
      KWARStgClassFull)
   ,(Execution_Halted,KMLC_VersCompFailure,
      KMLC_VersCompFailure)
   ,(Restart,KWAROk,KWAROk)
   ,(KWAROk,Restart,KWAROk)
   ,(Restart,KWARIncompatibleState,
      KWARIncompatibleState)
   ,(KWARIncompatibleState,Restart,
      KWARIncompatibleState)
   ,(KWARStgClassFull,Restart,KWARStgClassFull)
   ,(Restart,KMLC_VersCompFailure,KMLC_
      VersCompFailure)
   ,(KMLC_VersCompFailure,Restart,KMLC_
      VersCompFailure)
   ,(KMLC_AssignmentSuppressed,ResteLrt,KMLC_
      AssignmentSuppressed)
   );
```

```
                WWR - Write When Registered
P\S  0  1  2  3  4  5  6  7  8  9  10  11  12  16  18  R
 \
 0 : 0                                                  0
 1 :           1  1                                 1   1
 2 :        2                                       2
 3 :
 4 :              4                                 4   4
 5 :              5  5                              5   5
 6 :
 7 :
 8 :
 9 :
10 :
11 :
12 :
16 :
18 :              4  5
 R : 0     2      R  R                                  R
 \
```

R-Restart

Design notes, for this example:
1) Response codes which generate a halt signal ==> 1, 4 and 5
2) Command suppression response codes ==> 18, 19, 20, 253 & 254
3) Response code 1 should not be returned on a command driven to the secondary. Secondary commands suppress the registration testing (SREGT=1) Leading to this response code.
4) Response code pairs (1,4) and (1,5) can occur because the registration test is suppressed in the command driven to the secondary structure.
5) Response code pair (5,4) can occur when the specified name exists unchanged in the primary structure, the version-number comparison fails in the primary structure, the name does not exist in the secondary and the secondary operation fails with a target-storage-class full condition. The Version number mismatch (RC 5) response code will be returned.
6) Response code (4,5) is not expected because it can only occur if the version numbers are out of synch between the primary and secondary structures.

One example of a macro used to create the above table is as follows:

```
?RTE Command(WWR,(4,5))
   HandleRedriveModified(KWWROk) RESULTS(
   (KWWROk,KWWROk,KWWROk)
   ,(KWWRLceNotReg,KWWRStgClassFull,
      KWWRLceNotReg)
   ,(KWWRLceNotReg,KMLC_VersCompFaiLure,
      KWWRLceNotReg)
   ,(KWWRLceNotReg,Execution_Halted,
      KWWRLceNotReg)
```

,(KWWRIncompatibleState,
   KWWRIncompatibleState,
   KWWRIncompatibleState)
,(KWWRStgClassFull,KWWRStgClassFull,
   KWWRStgClassFull)
,(KWWRStgClassFull,Execution_Halted,
   KWWRStgClassFull)
,(KMLC_VersCompFailure,KWWRStgClassFull,
   KMLC_VersCompFailure)
,(KMLC_VersCompFailure,KMLC_
   VerscompFailure,KMLC_VersCompFailure)
,(KMLC_VersCompFailure,Execution_Halted,
   KMLC_VersCompFailure)
,(Execution_Halted,KWWRStgClassFull,
   KWWRStgClassFull)
,(Execution_Halted,KMLC_VersCompFailure,
   KMLC_VersCompFailure)
,(Restart,KWAROk,KWAROk)
,(KWAROk,Restart,KWAROk)
,(KWWRLceNotReg,Restart,KWWRLceNotReg)
,(Restart,KWWRIncompatibleState,
   KWWRIncompatibleState)
,(KWWRIncompatibleState,Restart,
   KWWRIncompatibleState)
,(KWWRStgClassFull,Restart,KWWRStgClassFull)
);

CLGLM - Clear Global Lock Manager

```
P\S  0  1  2  3  4  5  6  7  8  9 10 11 12 16 18  R
 \  ┌────────────────────────────────────────────────
 0 │ 0                                              0
 1 │    1                                           1
 2 │
 3 │       3                                        3
 4 │
 5 │
 6 │
 7 │
 8 │                      8                         8
 9 │
10 │
11 │
12 │
16 │
18 │
 R │ 0  1     3           8
 \  └────────────────────────────────────────────────
```

R-Restart

Design notes, for this example:
1) Response codes which generate a halt signal ==> None
2) Command suppression response codes ==> 1, 3, 8, 18, 19, 20, 253 and 254
   One example of a macro used to create the above table is as follows:
   ?RTE Command(CLGLM,(3,37)) RESULTS(
   (kLM_Successfull,kLM_Successfull,kLM_
      Successfull)
   ,(kLM_InvalidType,kLM_InvalidType,kLM_
      InvalidType)
   ,(kLM_GlobalMismatch,kLM_GlobalMismatch,
      kLM_GlobalMismatch)
   ,(kLM_EntryNotFound,kLM_EntryNotFound,kLM_
      EntryNotFound)
   ,(Restart,kLM_Successfull,kLM_Successfull)
   ,(kLM_Successfull,Restart,kLM_Successfull)
   ,(Restart,kLM_InvalidType,kLM_InvalidType)
   ,(kLM_InvalidType,Restart,kLM_InvalidType)
   ,(Restart,kLM_GlobalMismatch,kLM_
      GlobalMismatch)
   ,(kLM_GlobalMismatch,Restart,kLM_
      GlobalMismatch)
   ,(Restart,kLM_EntryNotFound,kLM_
      EntryNotFound)
   ,(kLM_EntryNotFound,Restart,kLM_
      EntryNotFound)
   );

DLES - Delete List Entries

```
P\S  0  1  2  3  4  5  6  7  8  9 10 11 12 16 18  R
 \  ┌────────────────────────────────────────────────
 0 │ 0 0@
 1 │ 0@1*#
 2 │       2@
 3 │
 4 │             4*
 5 │                5
 6 │                   6
 7 │                      7*
 8 │                         8*
 9 │                            9              9
10 │
11 │
12 │                                      12*
16 │
18 │
 R │                            9
 \  └────────────────────────────────────────────────
```

R-Restart as a result of a suppression condition otherwise Restart is Not applicable . . . 'DLES' has a retry buffer.
*-1) For RC(1,1), RC(4,4), RC(7,7), RC(8,8), and RC(12,12) the CDX returned is the same for both structures.
-Check whether request has been suppressed
-Valid if DLES was done as part of a converted command (triple).

Design notes, for this example:
1) Response codes which generate a halt signal ==> 1
2) Command suppression response codes ==> 9, 18, 19, 20, 253 and 254
3) For response code pairs (1,1), (4,4), (7,7), (8,8) and (12,12) verify that the returned current data index (CDX) is the same for both commands. If the indexes don't match, break duplexing, request a dump and place the request on the hold queue.
4) Response code pairs (1,9) and (9,1) cannot occur because response code 1 can only be returned if one or more entries have been committed and response code 9 is a suppression condition.
5) When the DLES command is issued as part of a converted DL command (ICRTOC=1), special rules apply. This is because the forward scan to locate the list entry controls (of the next entry to process) is not serialized by the two CFs.
   A) For response code (1,1) the list entry controls returned by the two commands may be different. This is possible if an entry is being moved or deleted during the scan. On one CF the entry may be moved or deleted before the scan and on the other CF the entry may be moved or deleted after the scan. The CF that sees the 'moved' or 'deleted' entry will return its list entry controls while the other CF will return the list controls of the next valid list entry. Note however, that the CDXs should still be the same.
   B) Response code pairs (0,1) and (1,0) are to be tolerated. Since the forward scan is not serialized, it is possible for one CF to find a valid list entry while the other CF scans to the end of the list without finding a valid entry.

Since the entries have been deleted by another process these response code pairs are reconciled to 0 (last list entry scanned).

One example of a macro used to create the above table is as follows:

```
?RTE Command(DLES,(3,26),ListForm) RESULTS(
   (KDlesFinished,KDlesFinished,KDlesFinished,
      Verify_DLES_DLEC)
  ,(KDlesFinished,KDlesTimeout,KDlesFinished,
      Verify_DLES_Triple)
  ,(KDlesTimeout,KDlesFinished,KDlesFinished,
      Verify_DLES_Triple)
  ,(KDlesTimeout,KDlesTimeout,KDlesTimeout,
      Verify_DLES_CDX)
  ,(kDlesStrAuthMismatch,kDlesStrAuthMismatch,
      kDlesStrAuthMismatch,Verify_DLES_Triple)
  ,(kDlesversionMismatch,kDlesversionMismatch,
      kDlesversionMismatch,Verify_DLES_CDX)
  ,(KDlesLocalLockMgrMismatch,
      KDlesLocalLockMgrMismatch,
      KDlesLocalLockMgrMismatch)
  ,(KDlesGlobalLockMgrMismatch,
      KDlesGlobalLockMgrMismatch,
      KDlesGlobalLockMgrMismatch)
  ,(KDlesListNumMismatch,KDlesListNumMismatch,
      KDlesListNumMismatch,Verify_DLES_CDX)
  ,(KDlesDoesNotExist,KDlesDoesNotExist,
      KDlesDoesNotExist,Verify_DLES_CDX)
  ,(KDlesLauMismatch,KDlesLauMismatch,
      KDlesLauMismatch)
  ,(KDlesLauMismatch,Restart,KDlesLauMismatch)
  ,(KDlesKeyCompareFail,KDlesKeyCompareFail,
      KDlesKeyCompareFail,Verify_DLES_CDX)
  ,(Restart,KDlesLauMismatch,KDlesLauMismatch)
);
```

DLE - Delete List Entry

| P\S | 0 | 1 | 2 | 3 | 4 | 5 | 6 | 7 | 8 | 9 | 10 | 11 | 12 | 16 | 18 | R |
|---|---|---|---|---|---|---|---|---|---|---|---|---|---|---|---|---|
| 0 | 0 | | | | | | | | | | | | | | | |
| 1 | | 1 | | | | | | | | | | | | | | 1 |
| 2 | | | 2 | | | | | | | | | | | | | |
| 3 | | | | 3 | | | | | | | | | | | | 3 |
| 4 | | | | | 4 | | | | | | | | | | | 4 |
| 5 | | | | | | | | | | | | | | | | |
| 6 | | | | | | | | | | | | | | | | |
| 7 | | | | | | | | | 7 | | | | | | | 7 |
| 8 | | | | | | | | | | 8 | | | | | | 8 |
| 9 | | | | | | | | | | | | | | | | |
| 10 | | | | | | | | | | | | | | | | |
| 11 | | | | | | | | | | | | | | | | |
| 12 | | | | | | | | | | | | | | 12 | | 12 |
| 16 | | | | | | | | | | | | | | | | |
| 18 | | | | | | | | | | | | | | | | |
| R | | 1 | | 3 | 4 | | | 7 | 8 | | | | 12 | | | |

R-Restart as a result of a suppression condition otherwise Restart is Not applicable . . . 'DLE' has a retry buffer.

Design notes, for this example:
1) Response codes which generate a halt signal ==> None
2) Command suppression response codes ==> 1, 3, 4, 7, 8, 12, 18, 19, 20, 253 and 254

One example of a macro used to create the above table is as follows:

```
?RTE Command(DLE,(3,19)) RESULTS(
   (KMLL_Success,KMLL_Success,KMLL_Success)
  ,(kMLL_Timeout,kMLL_Timeout,kMLL_Timeout)
  ,(kMLL_Timeout,Restart,kMLL_Timeout)
  ,(KMLL_LocalLockFail,KMLL_LocalLockFail,
      KMLL_LocalLockFail)
  ,(KMLL_LockCont,KMLL_LockCont,KMLL_LockCont)
  ,(KMLL_LockCont,Restart,KMLL_LockCont)
  ,(KMLL_VersNumFail,KMLL_VersNumFail,
      KMLL_VersNumFail)
  ,(KMLL_VersNumFail,Restart,KMLL_VersNumFail)
  ,(KMLL_ListNumFail,KMLL_ListNumFail,
      KMLL_ListNumFail)
  ,(KMLL_ListNumFail,Restart,KMLL_ListNumFail)
  ,(KMLL_NoEntry,KMLL_NoEntry,KMLL_NoEntry)
  ,(KMLL_NoEntry,Restart,KMLL_NoEntry)
  ,(KMLL_KeyCompareFail,KMLL_
      KeyCompareFail,KMLL_KeyCompareFail)
  ,(KMLL_KeyCompareFail,Restart,KMLL_
      KeyCompareFail)
  ,(Restart,kMLL_Timeout,kMLL_Timeout)
  ,(Restart,KMLL_LockCont,KMLL_LockCont)
  ,(Restart,KMLL_VersNumFail,KMLL_
      VersNumFail)
  ,(Restart,KMLL_ListNumFail,KMLL_ListNumFail)
  ,(Restart,KMLL_NoEntry,KMLL_NoEntry)
  ,(Restart,KMLL_KeyCompareFail,KMLL_
      KeyCompareFail)
);
```

DLM - Deregister List Monitor

| P\S | 0 | 1 | 2 | 3 | 4 | 5 | 6 | 7 | 8 | 9 | 10 | 11 | 12 | 16 | 18 | R |
|---|---|---|---|---|---|---|---|---|---|---|---|---|---|---|---|---|
| 0 | 0 | | | | | | | | | | | | | | | 0 |
| 1 | | | | | | | | | | | | | | | | |
| 2 | | | | | | | | | | | | | | | | |
| 3 | | | | | | | | | | | | | | | | |
| 4 | | | | | | | | | | | | | | | | |
| 5 | | | | | | | | | | | | | | | | |
| 6 | | | | | | | | | | | | | | | | |
| 7 | | | | | | | | | | | | | | | | |
| 8 | | | | | | | | | | | | | | | | |
| 9 | | | | | | | | | | | | | | | | |
| 10 | | | | | | | | | | | | | | | | |
| 11 | | | | | | | | | | | | | | | | |
| 12 | | | | | | | | | | | | | | | | |
| 16 | | | | | | | | | | | | | | | | |
| 18 | | | | | | | | | | | | | | | | |
| R | 0 | | | | | | | | | | | | | | | |

R-Restart

Design notes, for this example:
1) Response codes which generate a halt signal ==> None
2) Command suppression response codes ==> 18, 19, 20, 253 & 254

One example of a macro used to create the above table is as follows:

```
?RTE Command(DLM,(3,9)) RESULTS(
   (KMLL_Success,KMLL_Success,KMLL_Success)
  ,(Restart,KMLL_Success,KMLL_Success)
  ,(KMLL_Success,Restart,KMLL_Success)
);
```

```
                    MRLE - Move and Read List Entry
P\S  0  1  2  3  4  5  6  7  8  9  10  11  12  16  18  R
  \ ┌───────────────────────────────────────────────────
  0 │ 0
  1 │    1        5                                    1
  2 │       2
  3 │          3  5                                    3
  4 │             4  5                                 4
  5 │    5        5  5  5     5  5      5   5       5  5
  6 │
  7 │             5     7                              7
  8 │             5        8                           8
  9 │
 10 │             5           10              10      10
 11 │          11             11              11
 12 │             5                           12      12
 16 │
 18 │             5
  R │    1     3  4  5     7  8      10  11  12
  \ └───────────────────────────────────────────────────
```

R-Restart as a result of a suppression condition otherwise Restart is Not applicable . . . 'MRLE' has a retry buffer.

Design notes, for this example:
1) Response codes which generate a halt signal ==> 5
2) Command suppression response codes ==> 1, 3, 4, 5, 7, 8, 10, 11, 12, 18, 19, 20, 253 and 254
3) Response code pair (11,5) can occur because the secondary command suppresses the data transfer on the read operation. As a result, the secondary command can encounter the list full condition (RC 5) while the primary command encounters the insufficient message buffer space (RC 11) condition. In this case, the insufficient message buffer space response code will be returned. The list full response code may be returned when command is redriven and the condition still exists.

One example of a macro used to create the above table is as follows:

```
?RTE Command(MRLE,(3,21)) RESULTS(
    (KMLL_Success,KMLL_Success,KMLL_Success)
    ,(kMLL_ListAuthFail,kMLL_ListAuthFail,kMLL_
      ListAuthFail)
    ,(kMLL_ListAuthFail,KMLL_ListFulL,KMLL_
      ListFull)
    ,(kMLL_ListAuthFail,Restart,kMLL_ListAuthFail)
    ,(KMLL_LocalLockFail,KMLL_LocalLockFail,
      KMLL_LocalLockFail)
    ,(KMLL_LockCont,KMLL_LockCont,KMLL_
      LockCont)
    ,(KMLL_LockCont,KMLL_ListFull,KMLL_
      ListFull)
    ,(KMLL_LockCont,Restart,KMLL_LockCont)
    ,(KMLL_VersNumFail,KMLL_VersNumFail,
      KMLL_VersNumFail)
    ,(KMLL_VersNumFail,KMLL_ListFull,KMLL_
      ListFull)
    ,(KMLL_VersNumFail,Restart,KMLL_
      VersNumFail)
    ,(KMLL_ListFull,kMLL_ListAuthFail,KMLL_
      ListFull)
    ,(KMLL_ListFull,KMLL_LockCont,KMLL_
      ListFull)
    ,(KMLL_ListFull,KMLL_VersNumFail,KMLL_
      ListFull)
    ,(KMLL_ListFull,KMLL_ListFull,KMLL_ListFull)
    ,(KMLL_ListFull,KMLL_ListNumFail,KMLL_
      ListFull)
    ,(KMLL_ListFull,KMLL_NoEntry,KMLL_ListFull)
    ,(KMLL_ListFull,KMLL_MaxListKeyFail,KMLL_
      ListFull)
    ,(KMLL_ListFull,kMLL_CmdBufTooSmall,
      KMLL_ListFull)
    ,(KMLL_ListFull,kMLL_KeyCompareFail,KMLL_
      ListFull)
    ,(KMLL_ListFull,Execution_halted,KMLL_
      ListFull)
    ,(KMLL_ListFull,Restart,KMLL_ListFull)
    ,(KMLL_ListNumFail,KMLL_ListFull,KMLL_
      ListFull)
    ,(KMLL_ListNumFail,KMLL_ListNumFail,
      KMLL_ListNumFail)
    ,(KMLL_ListNumFail,Restart,KMLL_ListNumFail)
    ,(KMLL_NoEntry,KMLL_ListFull,KMLL_ListFull)
    ,(KMLL_NoEntry,KMLL_NoEntry,KMLL_
      NoEntry)
    ,(KMLL_NoEntry,Restart,KMLL_NoEntry)
    ,(KMLL_MaxListKeyFail,KMLL_ListFull,KMLL_
      ListFull)
    ,(KMLL_MaxListKeyFail,KMLL_MaxListKeyFail,
      KMLL_MaxListKeyFail)
    ,(KMLL_MaxListKeyFail,Restart,KMLL_
      MaxListKeyFail)
    ,(kMll_CmdBufTooSmall,KMLL_ListFull,kMll_
      CmdBufTooSmall)
    ,(kMll_CmdBufTooSmall,KMLL_
      CmdBufTooSmall,kMll_CmdBufTooSmall)
    ,(kMll_CmdBufTooSmall,Restart,kMll_
      CmdBufTooSmall)
    ,(KMLL_KeyCompareFail,KMLL_ListFull,KMLL_
      ListFull)
    ,(KMLL_KeyCompareFail,KMLL_
      KeyCoinpareFail,KMLL_KeyCompareFail)
    ,(KMLL_KeyCompareFail,Restart,KMLL_
      KeyCompareFail)
    ,(Execution_halted,KMLL_ListFull,KMLL_
      ListFull)
    ,(Restart,kMLL_ListAuthFail,kMLL_ListAuthFail)
    ,(Restart,KMLL_LockCont,KMLL_LockcCont)
    ,(Restart,KMLL_VersNumFail,KMLL_
      VersNumFail)
    ,(Restart,KMLL_ListFull,KMLL_ListFull)
    ,(Restart,KMLL_ListNumFail,KMLL_ListNumFail)
    ,(Restart,KMLL_NoEntry,KMLL_NoEntry)
    ,(Restart,KMLL_MaxListKeyFail,KMLL_
      MaxListKeyFail)
    ,(Restart,KMLL_CmdBufTooSmall,kMll_
      CmdBufTooSmall)
    ,(Restart,KMLL_KeyCompareFail,KMLL_
      KeyCompareFail)
);
```

| MLES - Move List Entries |
|---|

| P\S | 0 | 1 | 2 | 3 | 4 | 5 | 6 | 7 | 8 | 9 | 10 | 11 | 12 | 15 | 18 | R |
|---|---|---|---|---|---|---|---|---|---|---|---|---|---|---|---|---|
| 0 | 0 | | | | | | | | | | | | | | | |
| 1 | | 1*# | | | | | | | | | | | | 15*# | | |
| 2 | | | | | | | | | | | | | | | | |
| 3 | | | | 3* | | | | | | | | | | | | |
| 4 | | | | | 4* | | | | | | | | | | | |
| 5 | | | | | | 5 | | | | | | | | | | |
| 6 | | | | | | | 6 | | | | | | | | | |
| 7 | | | | | | | | 7* | | | | | | | | |
| 8 | | | | | | | | | 8* | | | | | | | |
| 9 | | | | | | | | | | 9 | | | | | | 9 |
| 10 | | | | | | | | | | | 10* | | | | | |
| 11 | | | | | | | | | | | | | | | | |
| 12 | | | | | | | | | | | | | 12* | | | |
| 15 | | 15*# | | | | | | | | | | | | 15 | 15 | |
| 18 | | | | | | | | | | | | | | | 15 | |
| R | | | | | | | | | | 9 | | | | | | |

R-Restart as a result of a suppression condition otherwise Restart is Not applicable . . . 'MLES' has a retry buffer.
*-Verify CDX is the same for both structures
-Check whether request has been suppressed Design notes, for this example:
1) Response codes which generate a halt signal ==> 1, 15
2) Command suppression response codes ==> 9, 18, 19, 20, 253 and 254
3) For response code pairs (1,1), (1,15), (3,3), (4,4), (7,7), (8,8), (10,10), (12,12), (15,1) and (15,15) verify that the returned current data index (CDX) is the same for both commands. If the indexes don't match, break duplexing, request a dump and place the request on the hold queue.
4) For response code pairs (1,15) and (15,1) the list full response code (RC 15) is returned so the user knows the list full condition needs to be corrected before the command can be redriven.
5) Response code pairs (1,9) and (9,1) cannot occur because response code 1 can only be returned if one or more entries have been committed and response code 9 is a suppression condition.

One example of a macro used to create the above table is as follows:

```
?RTE Command(MLES,(3,39),ListForm) RESULTS(
    (KMLL_Success,KMLL_Success,KMLL_Success)
    ,(kMLL_Timeout,kMLL_Timeout,kMLL_Timeout,
        Verify_MLES_CDX)
    ,(kMLL_Timeout,kMLL_ListFull15,kMLL_
        ListFull15,Verify_MLES_CDX)
    ,(kMLL_InvalidTargetListNum,kMLL_
        InvalidTargetListNum,kMLL_
        InvalidTargetListNum,Verify_MLES_CDX)
    ,(KMLL_VersNumFail,KMLL_VersNumFail,
        KMLL_VersNumFail,Verify_MLES_CDX)
    ,(KMLL_LocalLockFail5,KMLL_LocalLockFail5,
        KMLL_LocalLockFail5)
    ,(KMLL_GlobalLockFail6,KMLL_GlobalLockFail6,
        KMLL_GlobalLockFail6)
    ,(KMLL_ListNumFail,KMLL_ListNumFail,
        KMLL_ListNumFail,Verify_MLES_CDX)
    ,(KMLL_NoEntry,KMLL_NoEntry,KMLL_
        NoEntry,Verify_MLES_CDX)
    ,(KMLL_ListAuthFailMult,KMLL_
        ListAuthFailMult,KMLL_ListAuthFailMult)
    ,(KMLL_ListAuthFailMult,Restart,KMLL_
        ListAuthFailMult)
    ,(KMLL_MaxListKeyFail,KMLL_MaxListKeyFail,
        KMLL_MaxListKeyFail,Verify_MLES_CDX)
    ,(KMLL_KeyCompareFail,KMLL_
        KeyCompareFail,KMLL_KeyCompareFail,
        Verify_MLES_CDX)
    ,(KMLL_ListFull15,KMLL_TimeOut,KMLL_
        ListFulllS,Verify_MLES_CDX)
    ,(KMLL_ListFull15,KMLL_ListFull15,KMLL_
        ListFull15,Verify_MLES_CDX)
    ,(KMLL_ListFull15,Execution_Halted,KMLL_
        ListFull15)
    ,(Execution_halted,KMLL_ListFull15,KMLL_
        ListFull15)
    ,(Restart,KMLL_ListAuthFailMult,KMLL_
        ListAuthFailMult)
);
```

| MLE - Move List Entry |
|---|

| P\S | 0 | 1 | 2 | 3 | 4 | 5 | 6 | 7 | 8 | 9 | 10 | 11 | 12 | 16 | 18 | R |
|---|---|---|---|---|---|---|---|---|---|---|---|---|---|---|---|---|
| 0 | 0 | | | | | | | | | | | | | | | |
| 1 | | 1 | | | | 5 | | | | | | | | | | 1 |
| 2 | | | 2 | | | | | | | | | | | | | |
| 3 | | | | 3 | | 5 | | | | | | | | | | 3 |
| 4 | | | | | 4 | 5 | | | | | | | | | | 4 |
| 5 | | 5 | | 5 | 5 | 5 | | 5 | 5 | | 5 | | 5 | | 5 | 5 |
| 6 | | | | | | | | | | | | | | | | |
| 7 | | | | | | 5 | | 7 | | | | | | | | 7 |
| 8 | | | | | | 5 | | | 8 | | | | | | | 8 |
| 9 | | | | | | | | | | | | | | | | |
| 10 | | | | | | 5 | | | | | 10 | | | | | 10 |
| 11 | | | | | | | | | | | | | | | | |
| 12 | | | | | | 5 | | | | | | | 12 | | | 12 |
| 16 | | | | | | | | | | | | | | | | |
| 18 | | | | | | 5 | | | | | | | | | | |
| R | | 1 | | 3 | 4 | 5 | | 7 | 8 | | 10 | | 12 | | | |

R-Restart as a result of a suppression condition otherwise Restart is Not applicable . . . 'MLE' has a retry buffer.

Design notes, for this example:

1) Response codes which generate a halt signal ==> 5
2) Command suppression response codes ==> 1, 3, 4, 5, 7, 8, 10, 12, 18, 19, 20, 253 and 254

One example of a macro used to create the above table is as follows:

```
?RTE Command(MLE,(3,18)) RESULTS(
    (KMLL_Success,KMLL_Success,KMLL_Success)
    ,(kMLL_ListAuthFail,kMLL_ListAuthFail,kMLL_
        ListAuthFail)
    ,(kMLL_ListAuthFail,KMLL_ListFull,KMLL_
        ListFull)
    ,(kMLL_ListAuthFail,Restart,kMLL_ListAuthFail)
    ,(KMLL_LocalLockFail,KMLL_LocalLockFail,
        KMLL_LocalLockFail)
    ,(KMLL_LockCont,KMLL_LockCont,KMLL_
        LockCont)
    ,(KMLL_LockCont,KMLL_ListFull,KMLL_
        ListFull)
,(KMLL_LockCont,Restart,KMLL_LockCont)
    ,(KMLL_VersNumFail,KMLL_VersNumFail,
        KMLL_VersNumFail)
    ,(KMLL_VersNumFail,KMLL_ListFull,KMLL_
        ListFull)
```

,(KMLL_VersNumFail,Restart,KMLL_
 VersNumFail)
,(KMLL_ListFull,kMLL_ListAuthFail,KMLL_
 ListFull)
,(KMLL_ListFull,KMLL_LockCont,KMLL_
 ListFull)
,(KMLL_ListFull,KMLL_VersNumFail,KMLL_
 ListFull)
,(KMLL_ListFull,KMLL_ListFull,KMLL_ListFull)
,(KMLL_ListFull,KMLL_ListNumFail,KMLL_
 ListFull)
,(KMLL_ListFull,KMLL_NoEntry,KMLL_ListFull)
,(KMLL_ListFull,KMLL_MaxListKeyFail,KMLL_
 ListFull)
,(KMLL_ListFull,kMLL_KeyCompareFail,KMLL_
 ListFull)
,(KMLL_ListFull,Execution_halted,KMLL_
 ListFull)
,(KMLL_ListFull,Restart,KMLL_ListFull)
,(KMLL_ListNumFail,KMLL_ListFull,KMLL_
 ListFull)
,(KMLL_ListNumFail,KMLL_ListNumFail,
 KMLL_ListNumFail)
,(KMLL_ListNumFail,Restart,KMLL_ListNumFail)
,(KMLL_NoEntry,KMLL_ListFull,KMLL_ListFull)
,(KMLL_NoEntry,KMLL_NoEntry,KMLL_
 NoEntry)
,(KMLL_NoEntry,Restart,KMLL_NoEntry)
,(KMLL_MaxListKeyFail,KMLL_ListFull,KMLL_
 ListFull)
,(KMLL_MaxListKeyFail,KMLL_MaxListKeyFail,
 KMLL_MaxListKeyFail)
,(KMLL_MaxListKeyFail,Restart,KMLL_
 MaxListKeyFail)
,(KMLL_KeyCompareFail,KMLL_ListFuLl,
 KMLL_ListFull)
,(KMLL_KeyCompareFail,KMLL_
 KeyCompareFail,KMLL_KeyCompareFail)
,(KMLL_KeyCompareFail,Restart,KMLL_
 KeyCompareFail)
,(Execution_halted,KMLL_ListFull,KMLL_
 ListFull)
,(Restart,kMLL_ListAuthFail,kMLL_ListAuthFail)
,(Restart,KMLL_LockCont,KMLL_LockCont)
,(Restart,KMLL_VersNumFail,KMLL_
 VersNumFail)
,(Restart,KMLL_ListFull,KMLL_ListFull)
,(Restart,KMLL_ListNumFail,KMLL_ListNumFail)
,(Restart,KMLL_NoEntry,KMLL_NoEntry)
,(Restart,KMLL_MaxListKeyFail,KMLL_
 MaxListKeyFail)
,(Restart,KMLL_KeyCompareFail,KMLL_
 KeyCompareFail)
);

| RDLE - Read and Delete List Entry | | | | | | | | | | | | | | | |
|---|---|---|---|---|---|---|---|---|---|---|---|---|---|---|---|
| P\S | 0 | 1 | 2 | 3 | 4 | 5 | 6 | 7 | 8 | 9 | 10 | 11 | 12 | 16 | 18 | R |
| 0 | 0 | | | | | | | | | | | | | | | |
| 1 | | 1 | | | | | | | | | | | | | | 1 |
| 2 | | | 2 | | | | | | | | | | | | | |
| 3 | | | | 3 | | | | | | | | | | | | 3 |
| 4 | | | | | 4 | | | | | | | | | | | 4 |
| 5 | | | | | | | | | | | | | | | | |
| 6 | | | | | | | | | | | | | | | | |
| 7 | | | | | | | | | 7 | | | | | | | 7 |
| 8 | | | | | | | | | | 8 | | | | | | 8 |
| 9 | | | | | | | | | | | | | | | | |
| 10 | | | | | | | | | | | | | | | | |
| 11 | | | | | | | | | | | | | | 11 | | 11 |
| 12 | | | | | | | | | | | | | | 12 | | 12 |
| 16 | | | | | | | | | | | | | | | | |
| 18 | | | | | | | | | | | | | | | | |
| R | | 1 | | 3 | 4 | | | | 7 | 8 | | | | 11 | 12 | |

R-Restart as a result of a suppression condition otherwise Restart is Not applicable . . . 'RDLE' has a retry buffer.

Design notes, for this example:

1) Response codes which generate a halt signal ==> None
2) Command suppression response codes ==> 1, 3, 4, 7, 8, 11, 12, 18, 19, 20, 253 and 254

One example of a macro used to create the above table is as follows:

?RTE Command(RDLE, (3,22)) RESULTS(
    (KMLL_Success,KMLL_Success,KMLL_Success)
    ,(kMLL_ListAuthFail,kMLL_ListAuthFail,kMLL_
     ListAuthFail)
    ,(kMLL_ListAuthFail,Restart,kMLL_ListAuthFail)
    ,(KMLL_LocalLockFail,KMLL_LocalLockFail,
     KMLL_LocalLockFail)
    ,(KMLL_LockCont,KMLL_LockCont,KMLL_
     LockCont)
    ,(KMLL_LockCont,Restart,KMLL_LockCont)
    ,(KMLL_VersNumFail,KMLL_VersNumFail,
     KMLL_VersNumFail)
    ,(KMLL_VersNumFail,Restart,KMLL_
     VersNumFail)
    ,(KMLL_ListNumFail,KMLL_ListNumFail,
     KMLL_ListNumFail)
    ,(KMLL_ListNumFail,Restart,KMLL_ListNumFail)
    ,(KMLL_NoEntry,KMLL_NoEntry,KMLL_
     NoEntry)
    ,(KMLL_NoEntry,Restart,KMLL_NoEntry)
    ,(kMll_CmdBufTooSmall,kMll_CmdbufTooSmall,
     kMll_CmdBufTooSmall)
    ,(kMll_CmdBufTooSmall,Restart,kMll_
     CmdBufTooSmall)
    ,(KMLL_KeyCompareFail,KMLL_
     KeyCompareFail,KMLL_KeyCompareFail)
    ,(KMLL_KeyCompareFail,Restart,KMLL_
     KeyCompareFail)

,(Restart,kMLL_ListAuthFail,kMLL_ListAuthFail)
,(Restart,KMLL_LockCont,KMLL_LockCont)
,(Restart,KMLL_VersNumFail,KMLL_
   VersNumFail)
,(Restart,KMLL_ListNumFail,KMLL_ListNumFail)
,(Restart,KMLL_NoEntry,KMLL_NoEntry)
,(Restart,kMll_CmdbufTooSmall,kMll_
   CmdBufTooSmall)
,(Restart,KMLL_KeyCompareFail,KMLL_
   KeyCompareFail)
);

```
                    RLE - Read List Entry
P\S  0  1  2  3  4  5  6  7  8  9  10  11  12  16  18  R
  \ --------------------------------------------------
  0 | 0
  1 |    1                                           1
  2 |       2
  3 |          3                                     3
  4 |             4                                  4
  5 |
  6 |
  7 |                      7                         7
  8 |                         8                      8
  9 |
 10 |
 11 |                                11              11
 12 |                                    12          12
 16 |
 18 |
  R |    1     3  4         7  8         11  12
  \ --------------------------------------------------
```

R-Restart as a result of a suppression condition otherwise Restart is Not applicable . . . 'RLE' has a retry buffer.

Design notes, for this example:
1) Response codes which generate a halt signal ==> None
2) Command suppression response codes ==> 1, 3, 4, 7, 8, 11, 12, 18, 19, 20, 253 and 254
3) Response code 11 should not be returned on a secondary command because the secondary command suppresses the data transfer on the read operation.

One example of a macro used to create the above table is as follows:
?RTE Command(RLE,(3,16)) RESULTS(
   (KMLL_Success,KMLL_Success,KMLL_Success)
   ,(kMLL_ListAuthFail,kMLL_ListAuthFail,kMLL_
      ListAuthFail)
   ,(kMLL_ListAuthFail,Restart,kMLL_ListAuthFail)
   ,(KMLL_LocalLockFail,KMLL_LocalLockFail,
      KMLL_LocalLockFail)
   ,(KMLL_LockCont,KMLL_LockCont,KMLL_
      LockCont)
   ,(KMLL_LockCont,Restart,KMLL_LockCont)
   ,(KMLL_VersNumFail,KMLL_VersNumFail,
      KMLL_VersNumFail)
   ,(KMLL_VersNumFail,Restart,KMLL_
      VersNumFail)
   ,(KMLL_ListNumFail,KMLL_ListNumFail,
      KMLL_ListNumFail)
   ,(KMLL_ListNumFail,Restart,KMLL_ListNumFail)
   ,(KMLL_NoEntry,KMLL_NoEntry,KMLL_
      NoEntry)
   ,(KMLL_NoEntry,Restart,KMLL_NoEntry)
   ,(kMll_CmdBufTooSmall,kMll_CmdbufTooSmall,
      kmll_CmdBufTooSmall)
   ,(kMll_CmdBufTooSmall,Restart,kMll_
      CmdBufTooSmall)
   ,(KMLL_KeyCompareFail,KMLL_
      KeyCompareFail,KMLL_KeyCompareFail)
   ,(KMLL_KeyCompareFail,Restart,KMLL_
      KeyCompareFail)
   ,(Restart,kMLL_ListAuthFail,kMLL_ListAuthFail)
   ,(Restart,KMLL_LockCont,KMLL_LockCont)
   ,(Restart,KMLL_VersNumFail,KMLL_
      VersNumFail)
   ,(Restart,KMLL_ListNumFail,KMLL_
      LLstNumFail)
   ,(Restart,kMLL_NoEntry,KMLL_NoEntry)
   ,(Restart,kMll_CmdbufTooSmall,kMll_
      CmdBufTooSmall)
   ,(Restart,KMLL_KeyCompareFail,KMLL_
      KeyCompareFail)
);

```
                RGLM - Record Global Lock Manager
P\S  0  1  2  3  4  5  6  7  8  9  10  11  12  13  18  R
  \ ---------------------------------------------------
  0 | 0
  1 |    1           6                                1
  2 |       2
  3 |          3     6                                3
  4 |
  5 |
  6 |    6     6     6                       6  6  6
  7 |
  8 |
  9 |
 10 |
 11 |
 12 |
 13 |                6                        13     13
 18 |                6
  R |    1     3     6                        13
  \ ---------------------------------------------------
```

R-Restart as a result of a suppression condition otherwise Restart is Not applicable . . . 'RGLM' has a retry buffer.

Design notes, for this example:
1) Response codes which generate a halt signal ==> 6
2) Command suppression response codes ==> 1, 3, 6, 13, 18, 19, 20, 253 and 254

One example of a macro used to create the above table is as follows:
?RTE Command(RGLM,(3,36)) RESULTS(
   (kLM_Successfull,kLM_Successfull,kLM_
      Successfull)
   ,(kLM_InvalidType,kLM_InvalidType,kLM_
      InvalidType)
   ,(kLM_InvalidType,kLM_ListSetFull,kLM_
      ListSetFull)
   ,(kLM_InvalidType,Restart,kLM_InvalidType)
   ,(kLM_LocalMismatch,kLM_LocalMismatch,kLM_
      LocalMismatch)
   ,(kLM_GlobalMismatch,kLM_GlobalMismatch,
      kLM_GlobalMismatch)
   ,(kLM_GlobalMismatch,kLM_ListSetFull,kLM_
      ListSetFull)
   ,(kLM_GlobalMismatch,Restart,kLM_
      GlobalMismatch)
   ,(kLM_ListSetFull,kLM_InvalidType,kLM_
      ListSetFull)
   ,(kLM_ListSetFull,kLM_GlobalMismatch,kLM_
      ListSetFull)
   ,(kLM_ListSetFull,kLM_ListSetFull,kLM_
      ListSetFull)

,(kLM_ListSetFull,kLM_LEIDExists,kLM_
    ListSetFull)
,(kLM_ListSetFull,Execution_halted,kLM_
    ListSetFull)
,(kLM_ListSetFull,Restart,kLM_ListSetFull)
,(kLM_LEIDExists,kLM_ListSetFull,kLM_
    ListSetFull)
,(kLM_LEIDExists,kLM_LEIDExists,kLM_
    LEIDExists)
,(kLM_LEIDExists,Restart,kLM_LEIDExists)
,(Execution_halted,kLM_ListSetFulL,kLM_
    ListSetFull)
,(Restart,kLM_InvalidType,kLM_InvalidType)
,(Restart,kLM_GlobalMismatch,kLM_
    GlobalMismatch)
,(Restart,kLM_ListSetFull,kLM_ListSetFull)
,(Restart,kLM_LEIDExists,kLM_LEIDExists)
);

---

REMS - Register Event Monitors

| P\S | 0 | 1 | 2 | 3 | 4 | 5 | 6 | 7 | 8 | 9 | 10 | 11 | 12 | 16 | 18 | R |
|---|---|---|---|---|---|---|---|---|---|---|---|---|---|---|---|---|
| 0 | 0 | | | | | | | | | | | | | | | 0 |
| 1 | | 1*#2*# | | | | | | | | | | | | | | R# |
| 2 | | 2*#2* | | | | | | | | | | | | 2 | | 2 |
| 3 | | | | 3 | | | | | | | | | | | | 3 |
| 4 | | | | | 4* | | | | | | | | | | | 4 |
| 5 | | | | | | 5* | | | | | | | | | | 5 |
| 6 | | | | | | | | | | | | | | | | |
| 7 | | | | | | | | | | | | | | | | |
| 8 | | | | | | | | | | | | | | | | |
| 9 | | | | | | | | | | | | | | | | |
| 10 | | | | | | | | | | | | | | | | |
| 11 | | | | | | | | | | | | | | | | |
| 12 | | | | | | | | | | | | | | | | |
| 16 | | | | | | | | | | | | | | 16* | | 16 |
| 18 | | 2 | | | | | | | | | | | | | | |
| R | 0 | R# | 2 | 3 | 4 | 5 | | | | | | | | 16 | | R |

*-Verify CTX is the same for both structures
-Check whether request has been suppressed
R-Restart Design notes, for this example:
1) Response codes which generate a halt signal ==> 1, 2
2) Command suppression response codes ==> 18, 19, 20, 253 and 254
3) For response code pairs (1,1), (1,2), (2,1), (2,2), (4,4), (5,5), and (16,16) verify that the returned current event index (CTX) is the same for both commands. If the indexes don't match, break duplexing, request a dump and place the request on the hold queue.
4) Response code 16 should not be returned for duplexed commands.
   One example of a macro used to create the above table is as follows:
   ?RTE Command(REMS,(3,30),ListForm) RESULTS(
       (kRemsSuccessful,kRemsSuccessful,
        kRemsSuccessful)
     ,(KRemsTimeout,KRemsTimeout,KRemsTimeout,
        Verify_REMS_CEX)
     ,(KRemsTimeout,KRemsInsuffEmcSpace,
        KRemsInsuffEmcSpace,Verify_REMS_CEX)
     ,(KRemsInsuffEmcSpace,KRemsTimeout,
        KRemsInsuffEmcSpace,Verify_REMS_CEX)
     ,(KRemsInsuffEmcSpace,KRemsInsuffEmcSpace,
        KRemsInsuffEmcSpace,Verify_REMS_CEX)
     ,(KRemsInsuffEmcSpace,Execution_Halted,
        KRemsInsuffEmcSpace)
     ,(KRemsInvalidLnt,KRemsInvalidLnt,
        KRemsInvalidLnt)
     ,(KRemsInvalidLn,KRemsInvalidLn,
        KRemsInvalidLn,Verify_REMS_CEX)
     ,(KRemsInvalidKT,KRemsInvalidKT,
        KRemsInvalidKT,Verify_REMS_CEX)
     ,(KRemsHaltOnInactiveUID,
        KRemsHaltOnInactiveUID,
        KRemsHaltOnInactiveUID,Verify_REMS_CEX)
     ,(Execution_halted,KRemsInsuffEmcSpace,
        KRemsInsuffEmcSpace)
     ,(Restart,kRemsSuccessful,kRemsSuccessful)
     ,(kRemsSuccessful,Restart,kRemsSuccessful)
     ,(Restart,KRemsInsuffEmcSpace,
        KRemsInsuffEmcSpace)
     ,(KRemsInsuffEmcSpace,Restart,
        KRemsInsuffEmcSpace)
     ,(Restart,KRemsInvalidLnt,KRemsInvalidLnt)
     ,(KRemsInvalidLnt,Restart,KRemsInvalidLnt)
     ,(Restart,KRemsInvalidLn,KRemsInvalidLn)
     ,(KRemsInvalidLn,Restart,KRemsInvalidLn)
     ,(Restart,KRemsInvalidKT,KRemsInvalidKT)
     ,(KRemsInvalidKT,Restart,KRemsInvalidKT)
     ,(Restart,KRemsHaltOnInactiveUID,
        KRemsHaltOnInactiveUID)
     ,(KRemsHaltOnInactiveUID,Restart,
        KRemsHaltOnInactiveUID)
   );

---

RLM - Register List Monitor

| P\S | 0 | 1 | 2 | 3 | 4 | 5 | 6 | 7 | 8 | 9 | 10 | 11 | 12 | 16 | 18 | R |
|---|---|---|---|---|---|---|---|---|---|---|---|---|---|---|---|---|
| 0 | 0 | | | 3 | | | | | | | | | | | | |
| 1 | | 1 | 2 | | | | | | | | | | | | | 1 |
| 2 | | 2 | 2 | | | | | | | | | | | 2 | | 2 |
| 3 | 3 | | | 3 | | | | | | | | | | | | 3 |
| 4 | | | | | | | | | | | | | | | | |
| 5 | | | | | | | | | | | | | | | | |
| 6 | | | | | | | | | | | | | | | | |
| 7 | | | | | | | | | | | | | | | | |
| 8 | | | | | | | | | | | | | | | | |
| 9 | | | | | | | | | | | | | | | | |
| 10 | | | | | | | | | | | | | | | | |
| 11 | | | | | | | | | | | | | | | | |
| 12 | | | | | | | | | | | | | | | | |
| 16 | | | | | | | | | | | | | | | | |
| 18 | | | 2 | | | | | | | | | | | | | |
| R | | 1 | 2 | 3 | | | | | | | | | | | | R |

R-Restart

Design notes, for this example:
1) Response codes which generate a halt signal ==> 2
2) Command suppression response codes ==> 1, 2, 18, 19, 20, 253 and 254
3) Response code pairs (0,3) and (3,0) can occur and are to be tolerated because key range initialization can proceed at different rates in the two structures. The key-range not initialized response code will be the resultant response code until the key range is initialized in both structures.
   One example of a macro used to create the above table is as follows:
   ?RTE Command(RLM,(3,8)) RESULTS(
       (KMLL_Success,KMLL_Success,KMLL_Success)
     ,(KMLL_Success,kRlmKeyRangeNotInit,
        kRlmKeyRangeNotInit)
     ,(KRLMInvalidLnt,KRLMInvalidLnt,
        KRLMInvalidLnt)

,(KRLMInvalidLnt,KRlmInsuffEmcSpace,
   KRlmInsuffEmcSpace)
,(KRlmInsuffEmcSpace,KRLMInvalidLnt,
   KRlmInsuffEmcSpace)
,(KRlmInsuffEmcSpace,KRlmInsuffEmcSpace,
   KRlmInsuffEmcSpace)
,(KRlmInsuffEmcSpace,Execution_Halted,
   KRlmInsuffEmcSpace)
,(kRlmKeyRangeNotInit,KMLL_Success,
   kRlmKeyRangeNotInit)
,(kRlmKeyRangeNotInit,kRlmKeyRangeNotInit,
   kRlmKeyRangeNotInit)
,(Execution_halted,KRlmInsuffEmcSpace,
   KRlmInsuffEmcSpace)
,(Restart,KRLMInvalidLnt,KRLMInvalidLnt)
,(KRLMInvalidLnt,Restart,KRLMInvalidLnt)
,(Restart,KRlmInsuffEmcSpace,
   KRlmInsuffEmcSpace)
,(KRlmInsuffEmcSpace,Restart,
   KRlmInsuffEmcSpace)
,(Restart,kRlmKeyRangeNotInit,
   kRlmKeyRangeNotInit)
,(kRlmKeyRangeNotInit,Restart,
   kRlmKeyRangeNotInit)
);

| RGLMV - Reset Global Lock Manager Value | | | | | | | | | | | | | | | |
|---|---|---|---|---|---|---|---|---|---|---|---|---|---|---|---|
| P\S | 0 | 1 | 2 | 3 | 4 | 5 | 6 | 7 | 8 | 9 | 10 | 11 | 12 | 16 | 18 | R |
| 0 | 0 | | | | | | | | | | | | | | | 0 |
| 1 | | | | | | | | | | | | | | | | |
| 2 | | | | | | | | | | | | | | | | |
| 3 | | | | 3 | | | | | | | | | | | | 3 |
| 4 | | | | | | | | | | | | | | | | |
| 5 | | | | | | | | | | | | | | | | |
| 6 | | | | | | | | | | | | | | | | |
| 7 | | | | | | | | | | | | | | | | |
| 8 | | | | | | | | | | | | | | | | |
| 9 | | | | | | | | | | | | | | | | |
| 10 | | | | | | | | | | | | | | | | |
| 11 | | | | | | | | | | | | | | | | |
| 12 | | | | | | | | | | | | | | | | |
| 13 | | | | | | | | | | | | | | | | |
| 18 | | | | | | | | | | | | | | | | |
| R | 0 | | | 3 | | | | | | | | | | | | |

R-Restart

Design notes, for this example:
1) Response codes which generate a halt signal ==> None
2) Command suppression response codes ==> 3, 18, 19, 20, 253 and 254

One example of a macro used to create the above table is as follows:
   ?RTE Command(RGLMV,(3,33)) RESULSTS(
      (kLM_Successfull,kLM_Successfull,kLM_
         Successfull)
      ,(kLM_GlobalMismatch,kLM_GlobalMismatch,
         kLM_GlobalMismatch)
      ,(Restart,kLM_Successfull,kLM_Successfull)
      ,(kLM_Successfull,Restart,kLM_Successfull)
      ,(Restart,kLM_GlobalMismatch,kLM_
         GlobalMismatch)
      ,(kLM_GlobalMismatch,Restart,kLM_
         GlobalMismatch)
   );

| RLLMV - Reset Local Lock Manager Value | | | | | | | | | | | | | | | |
|---|---|---|---|---|---|---|---|---|---|---|---|---|---|---|---|
| P\S | 0 | 1 | 2 | 3 | 4 | 5 | 6 | 7 | 8 | 9 | 10 | 11 | 12 | 16 | 18 | R |
| 0 | 0 | | | | | | | | | | | | | | | 0 |
| 1 | | | | | | | | | | | | | | | | |
| 2 | | | | | | | | | | | | | | | | |
| 3 | | | | 3 | | | | | | | | | | | | 3 |
| 4 | | | | | | | | | | | | | | | | |
| 5 | | | | | | | | | | | | | | | | |
| 6 | | | | | | | | | | | | | | | | |
| 7 | | | | | | | | | | | | | | | | |
| 8 | | | | | | | | | | | | | | | | |
| 9 | | | | | | | | | | | | | | | | |
| 10 | | | | | | | | | | | | | | | | |
| 11 | | | | | | | | | | | | | | | | |
| 12 | | | | | | | | | | | | | | | | |
| 13 | | | | | | | | | | | | | | | | |
| 18 | | | | | | | | | | | | | | | | |
| R | 0 | | | 3 | | | | | | | | | | | | |

R-Restart

Design notes, for this example:
1) Response codes which generate a halt signal ==> None
2) Command suppression response codes ==> 3, 18, 19, 20, 253 and 254

One example of a macro used to create the above table is as follows:
   ?RTE Command(RLLMV,(3,35)) RESULTS(
      (kLM_Successfull,kLM_Successfull,kLM_
         Successfull)
      ,(kLM_GlobalMismatch,kLM_GlobalMismatch,
         kLM_GlobalMismatch)
      ,(Restart,kLM_Successfull,kLM_Successfull)
      ,(kLM_Successfull,Restart,kLM_Successfull)
      ,(Restart,kLM_GlobalMismatch,kLM_
         GlobalMismatch)
      ,(kLM_GlobalMismatch,Restart,kLM_
         GlobalMismatch)
   );

| RLMS - Reset Lock Managers | | | | | | | | | | | | | | | |
|---|---|---|---|---|---|---|---|---|---|---|---|---|---|---|---|
| P\S | 0 | 1 | 2 | 3 | 4 | 5 | 6 | 7 | 8 | 9 | 10 | 11 | 12 | 16 | 18 | R |
| 0 | 0* | | | | | | | | | | | | | | | 0 |
| 1 | | 1*# | | | | | | | | | | | | | | 1# |
| 2 | | | 2* | | | | | | | | | | | | | 2 |
| 3 | | | | 3* | | | | | | | | | | | | 3 |
| 4 | | | | | 4* | | | | | | | | | | | 4 |
| 5 | | | | | | 5* | | | | | | | | | | 5 |
| 6 | | | | | | | | | | | | | | | | |
| 7 | | | | | | | | | | | | | | | | |
| 8 | | | | | | | | | | 8* | | | | | | 8 |
| 9 | | | | | | | | | | | | | | | | |
| 10 | | | | | | | | | | | | | | | | |
| 11 | | | | | | | | | | | | | | | | |
| 12 | | | | | | | | | | | | | | | | |
| 13 | | | | | | | | | | | | | | | | |
| 18 | | | | | | | | | | | | | | | | |
| R | 0 | 1# | 2 | 3 | 4 | 5 | | | | 8 | | | | | | |

*-Verify Lock Manager index is the same from each structures
-Check whether request has been suppressed
R-Restart Design notes, for this example:

1) Response codes which generate a halt signal ==> 1

2) Command suppression response codes ==> 2, 18, 19, 20, 253 and 254

3) For response code pairs (0,0), (1,1), (2,2), (3,3), (4,4), (5,5) and (8,8) verify that the returned lock-manager index (LMX) is the same for both commands. If the indexes don't match, break duplexing, request a dump and place the request on the hold queue.

4) Response code pairs (1,2) and (2,1) cannot occur because response code 1 can only be returned if one or more entries have been committed and response code 2 is a suppression condition.

One example of a macro used to create the above table is as follows:

```
?RTE Command(RLMS,(3,27),ListForm) RESULTS(
    (KRlmsFinished,KRlmsFinished,KRlmsFinished,
      Verify_RLMS_LMX)

,(KRlmsTimeout,KRlmsTimeout,KRlmsTimeout,
      Verify_RLMS_LMX)

,(KRlmsInvalidLst,KRlmsInvalidLst,
      KRlmsInvalidLst,Verify_RLMS_LMX)

,(KrlmsInvalidLten,KRlmsInvalidLten,
      KRlmsInvalidLten,Verify_RLMS_LMX)

,(KRlmsLockMgrMismatch,
      KRlmsLockMgrMismatch,
      KRlmsLockMgrMismatch,Verify_RLMS_LMX)

,(KRlmsInvalidUID,KRlmsInvalidUID,
      KRlmsInvalidUID,Verify_RLMS_LMX)

,(KRlmsEntryNotFound,KRlmsEntryNotFound,
      KRlmsEntryNotFound,Verify_RLMS_LMX)
   ,(Restart,KRlmsFinished,KRlmsFinished)
   ,(KRlmsFinished,Restart,KRlmsFinished)
   ,(Restart,KRlmsTimeout,KRlmsTimeout)
   ,(KRlmsTimeout,Restart,KRlmsTimeout)
   ,(Restart,KRlmsInvalidLst,KRlmsInvalidLst)
   ,(KRlmsInvalidLst,Restart,KRlmsInvalidLst)
   ,(Restart,KRlmsInvalidLten,KRlmsInvalidLten)
   ,(KRlmsInvalidLten,Restart,KRlmsInvalidLten)
   ,(Restart,KRlmsLockMgrMismatch,
      KRlmsLockMgrMismatch)
   ,(KRlmsLockMgrMismatch,Restart,
      KRlmsLockMgrMismatch)
   ,(Restart,KRlmsInvalidUID,KRlmsInvalidUID)
   ,(KRlmsInvalidUID,Restart,KRlmsInvalidUID)
   ,(Restart,KRlmsEntryNotFound,
      KRlmsEntryNotFound)
   ,(KRlmsEntryNotFound,Restart,
      KRlmsEntryNotFound)
);
```

| SGLMV - Set Global Lock Manager Value | | | | | | | | | | | | | | | |
|---|---|---|---|---|---|---|---|---|---|---|---|---|---|---|---|
| P\S | 0 | 1 | 2 | 3 | 4 | 5 | 6 | 7 | 8 | 9 | 10 | 11 | 12 | 16 | 18 | R |
| 0 | 0 | | | | | | | | | | | | | | | 0 |
| 1 | | | | | | | | | | | | | | | | |
| 2 | | | 2 | | | | | | | | | | | | | 2 |
| 3 | | | | 3 | | | | | | | | | | | | 3 |
| 4 | | | | | | | | | | | | | | | | |
| 5 | | | | | | | | | | | | | | | | |
| 6 | | | | | | | | | | | | | | | | |
| 7 | | | | | | | | | | | | | | | | |
| 8 | | | | | | | | | | | | | | | | |
| 9 | | | | | | | | | | | | | | | | |
| 10 | | | | | | | | | | | | | | | | |
| 11 | | | | | | | | | | | | | | | | |
| 12 | | | | | | | | | | | | | | | | |
| 13 | | | | | | | | | | | | | | | | |
| 18 | | | | | | | | | | | | | | | | |
| R | 0 | | 2 | 3 | | | | | | | | | | | | |

*-Verify Lock Manager index is the same from each structures
R-Restart

Design notes, for this example:

1) Response codes which generate a halt signal ==> None

2) Command suppression response codes ==> 3, 18, 19, 20, 253 and 254

One example of a macro used to create the above table is as follows:

```
?RTE Command(SGLMV,(3,32)) RESULTS(
    (kLM_Successfull,kLM_Successfull,kLM_
      Successfull)
   ,(kLM_LocalMismatch,kLM_LocalMismatch,kLM_
      LocalMismatch)
   ,(kLM_GlobalMismatch,kLM_GlobalMismatch,
      kLM_GlobalMismatch)
   ,(Restart,kLM_Successfull,kLM_Successfull)
   ,(kLM_Successfull,Restart,kLM_Successfull)
   ,(Restart,kLM_LocalMismatch,kLM_
      LocalMismatch)
   ,(kLM_LocalMismatch,Restart,kLM_
      LocalMismatch)
   ,(Restart,kLM_GlobalMismatch,kLM_
      GlobalMismatch)
   ,(kLM_GlobalMismatch,Restart,kLM_
      GlobalMismatch)
);
```

```
                    SLLMV - Set Local Lock Manager Value

P\S  0  1  2  3  4  5  6  7  8  9  10  11  12  16  18   R
     \ +------------------------------------------------------
     0 | 0                                                   0
     1 |
     2 |              2                                      2
     3 |                 3                                   3
     4 |
     5 |
     6 |
     7 |
     8 |
     9 |
    10 |
    11 |
    12 |
    13 |
    18 |
     R | 0        2  3
     \ +------------------------------------------------------
```

R-Restart

```
                      WMLE - Write and Move List Entry

P\S  0  1  2  3  4  5   6   7  8  9  10  11  12  13  18   R
     \ +---------------------------------------------------------
     0 | 0
     1 |    1           5   6*                                  1
     2 |       2
     3 |          3     5   6*                                  3
     4 |             4  5   6*                                  4
     5 |    5       5  5 5  6*  5  5  5       5   5   5        5
     6 |    6*      6* 6* 6* 6* 6* 6* 6*      6*  6*  6*  6*
     7 |                5   6*  7                               7
     8 |                5   6*     8                            8
     9 |                5   6*        9                         9
    10 |                5   6*           10                    10
    11 |
    12 |                5   6*                   12            12
    13 |                5   6*                       13        13
    18 |                5   6*
     R | 1           3  4  5  6*  7  8  9  10      12  13
     \ +---------------------------------------------------------
```

*-Force restart (retry) if RC 6 is returned with the FRPI bit on.
R-Restart as a result of a suppression condition otherwise Restart (as a returned action) is not applicable ... 'WMLE' has a retry buffer.

Design notes, for this example:

1) Response codes which generate a halt signal ==> None

2) Command suppression response codes ==> 3, 18, 19, 20, 253 and 254

One example of a macro used to create the above table is as follows:

?RTE Command(SLLMV,(3,34)) RESULTS(
   (kLM_Successfull,kLM_Successfull,kLM_
     Successfull)
  ,(kLM_LocalMismatch,kLM_LocalMismatch,kLM_
     LocalMismatch)
  ,(kLM_GlobalMismatch,kLM_GlobalMismatch,
     kLM_GlobalMismatch)
  ,(Restart,kLM_Successfull,kLM_Successfull)
  ,(kLM_Successfull,Restart,kLM_Successfull)
  ,(Restart,kLM_LocalMismatch,kLM_
     LocalMismatch)
  ,(kLM_LocalMismatch,Restart,kLM_
     LocalMismatch)
  ,(Restart,kLM_GlobalMismatch,kLM_
     GlobalMismatch)
  ,(kLM_GlobalMismatch,Restart,kLM_
     GlobalMismatch)
);

Design notes, for this example:

1) Response codes which generate a halt signal ==> 5, 6

2) Command suppression response codes ==> 1, 3, 4, 5, 6, 7, 8, 9, 10, 12, 13, 18, 19, 20, 253 and 254

3) Response code pairs (5,6) and (6,5) are to be reconciled because 'list full' (RC=5) and 'list set full' (RC=6) response codes have the same priority. These response code pairs will be reconciled to the List-set full response code.

One example of a macro used to create the above table is as follows:

?RTE Command(WMLE,(3,20))
  HandleRedriveModified(kWLEListEntryNotFound)
    Results(
  (kWLEOk,kWLEOk,kWLEOk)
  ,(KWLELAUMismatch,KWLELAUMismatch,
    KWLELAUMismatch)
  ,(KWLELAUMismatch,kWLEListFull,
    kWLEListFull)
  ,(KWLELAUMismatch,kWLEListSetFull,
    kWLEListSetFull,Verify_WMLE_WLE_
    RestartWhenSroaWLE6)
  ,(KWLELAUMismatch,Restart,
    KWLELAUMismatch)
  ,(kWLELocalLockMgrMismatch,
    kWLELocalLockMgrMismatch,
    kWLELocalLockMgrMismatch)
  ,(kWLEGlobalLockMgrMismatch,
    kWLEGlobalLockMgrMismatch,
    kWLEGlobalLockMgrMismatch)
  ,(kWLEGlobalLockMgrMismatch,kWLEListFull,
    kWLEListFull)

,(kWLEGlobalLockMgrMismatch,kWLEListSetFull,
   kWLEListSetFull,Verify_WMLE_WLE_
   RestartWhenSroaWLE6)
,(kWLEGlobalLockMgrMismatch,Restart,
   kWLEGlobalLockMgrMismatch)
,(kWLEVersionMismatch,kWLEVersionMismatch,
   kWLEVersionMismatch)
,(kWLEVersionMismatch,kWLEListFull,
   kWLEListFull)
,(kWLEVersionMismatch,kWLEListSetFull,
   kWLEListSetFull,Verify_WMLE_WLE_
   RestartWhenSroaWLE6)
,(kWLEVersionMismatch,Restart,
   kWLEVersionMismatch)
,(kWLEListFull,KWLELAUMismatch,
   kWLEListFull)
,(kWLEListFull,kWLEGlobalLockMgrMismatch,
   kWLEListFull)
,(kWLEListFull,kWLEVersionMismatch,
   kWLEListFull)
,(kWLEListFull,kWLEListFull,kWLEListFull)
,(kWLEListFull,kWLEListSetFull,kWLEListSetFull,
   Verify_WMLE_WLE_RestartWhenSroaWLE6)
,(kWLEListFull,kWLEListNumMismatch,
   kWLEListFull)
,(kWLEListFull,kWLEListEntryNotFound,
   kWLEListFull)
,(kWLEListFull,kWLEDupListEntryName,
   kWLEListFull)
,(kWLEListFull,kWLEAssignmentKeyHigh,
   kWLEListFull)
,(kWLEListFull,kWLEKeyCompareFail,
   kWLEListFull)
,(kWLEListFull,kWLEDuplicateLEID,kWLEListFull)
,(kWLEListFull,Execution_Halted,kWLEListFull)
,(kWLEListFull,Restart,kWLEListFull)
,(kWLEListSetFull,KWLELAUMismatch,
   kWLEListSetFull,Verify_WMLE_WLE_
   RestartWhenSroaWLE6)
,(kWLEListSetFull,kWLEGlobalLockMgrMismatch,
   kWLEListSetFull,Verify_WMLE_WLE_
   RestartWhenSroaWLE6)
,(kWLEListSetFull,kWLEVersionMismatch,
   kWLEListSetFull,Verify_WMLE_WLE_
   RestartWhenSroaWLE6)
,(kWLEListSetFull,kWLEListFull,kWLEListSetFull,
   Verify_WMLE_WLE_RestartWhenSroaWLE6)
,(kWLEListSetFull,kWLEListSetFuli,
   kWLEListSetFull,Verify_WMLE_WLE_
   RestartWhenSroaWLE6)
,(kWLEListSetFull,kWLEListNumMismatch,
   kWLEListSetFull,Verify_WMLE_WLE_
   RestartWhenSroaWLE6)
,(kWLEListSetFull,kWLEListEntryNotFound,
   kWLEListSetFull,Verify_WMLE_WLE_
   RestartWhenSroaWLE6)
,(kWLEListSetFull,kWLEDupListEntryName,
   kWLEListSetFull,Verify_WMLE_WLE_
   RestartWhenSroaWLE6)
,(kWLEListSetFull,kWLEAssignmentKeyHigh,
   kWLEListSetFull,Verify_WMLE_WLE_
   RestartWhenSroaWLE6)
,(kWLEListSetFull,kWLEKeyCompareFail,
   kWLEListSetFull,Verify_WMLE_WLE_
   RestartWhensroaWLE6)
,(kWLEListSetFull,kWLEDuplicateLEID,
   kWLEListSetFull,Verify_WMLE_WLE_
   RestartWhenSroaWLE6)
,(kWLEListSetFull,Execution_Halted,
   kWLEListSetFull,Verify_WMLE_WLE_
   RestartwhenSroawLE6)
,(kWLEListSetFull,Restart,kWLEListSetFull,Verify_
   WMLE_WLE_RestartWhenSroaWLE6)
,(kWLEListNumMismatch,kWLEListFuLl,
   kWLEListFull)
,(kWLEListNumMismatch,kWLEListSetFull,
   kWLEListSetFull,Verify_WMLE_WLE_
   RestartWhenSroaWLE6)
,(kWLEListNumMismatch,kWLEListNumMismatch,
   kWLEListNumMismatch)
,(kWLEListNumMismatch,Restart,
   kWLEListNumMismatch)
,(kWLEListEntryNotFound,kWLEListFull,
   kWLEListFull)
,(kWLEListEntryNotFound,kWLEListSetFull,
   kWLEListSetFull,Verify_WMLE_WLE_
   RestartWhenSroaWLE6)
,(kWLEListEntryNotFound,
   kWLEListEntryNotFound,
   kWLEListEntryNotFound)
,(kWLEListEntryNotFound,Restart,
   WLEListEntryNotFound)
,(kWLEDupListEntryName,kWLEListFull,
   kWLEListFull)
,(kWLEDupListEntryName,kWLEListSetFull,
   kWLEListSetFull,Verify_WMLE_WLE_
   RestartWhenSroaWLE6)
,(kWLEDupListEntryName,kWLEDupLis,
   tEntryName,kWLEDupListEntryName)
,(kWLEDupListEntryName,Restart,
   kWLEDupListEntryName)
,(kWLEAssignmentKeyHigh,kWLEListFull,
   kWLEListFull)
,(kWLEAssignmentKeyHigh,kWLEListFull,
   kWLEListSetFull,Verify_WMLE_WLE_
   RestartWhenSroaWLE6)
,(kWLEAssignmentKeyHigh,
   kWLEAssignmentKeyHigh,
   kWLEAssignmentKeyHigh)
,(kWLEAssignmentKeyHigh,Restart,
   kWLEAssignmentKeyHigh)
,(kWLEKeyCompareFail,kWLEListFull,
   kWLEListFull)
,(kWLEKeyCompareFail,kWLEListSetFull,
   kWLEListSetFull,Verify_WMLE_WLE_
   RestartWhenSroaWLE6)
,(kWLEKeyCompareFail,kWLEKeyCompareFail,
   kWLEKeyCompareFail)
,(kWLEKeyCompareFail,Restart,
   kWLEKeyCompareFail)
,(kWLEDuplicateLEID,kWLEListFull,kWLEListFull)
,(kWLEDuplicateLEID,kWLEListSetFull,
   kWLEListSetFull,VerifyWMLE_WLE_
   RestartWhenSroaWLE6)
,(kWLEDuplicateLEID,kWLEDuplicateLEID,
   kWLEDuplicateLEID)
,(kWLEDuplicateLEID,Restart,kWLEDuplicateLEID)
,(Execution_Halted,kWLEListFull,kWLEListFull)
,(Execution_Halted,kWLEListSetFull,
   kWLEListSetFull,Verify_WMLE_WLE_
   RestartWhenSroaWLE6)
,(Restart,KWLELAUMismatch,
   KWLELAUMismatch)
,(Restart,kWLEGlobalLockMgrMismatch,
   kWLEGlobalLockMgrMismatch)

,(Restart,kWLEVersionMismatch,
    kWLEVersionMismatch)
,(Restart,kWLEListFull,kWLEListFull)
,(Restart,kWLEListSetFull,kWLEListSetFull,Verify_
    WMLE_WLE_RestartWhenSroaWLE6)
,(Restart,kWLEListNumMismatch,
    kWEListNumMismatch)
,(Restart,kWLEListEntryNotFound,
    kWLEListEntryNotFound)
,(Restart,kWLEDupListEntryName,
    kWLEDupListEntryName)
,(Restart,kWLEAssignmentKeyHigh,
    kWLEAssignmentKeyHigh)
,(Restart,kWLEKeyCompareFail,
    kWLEKeyCompareFail)
,(Restart,kWLEDuplicateLEID,kWLEDuplicateLEID)
);

,(Restart,KWLCKeyRangeNotInit,
    KWLCKeyRangeNotInit)
,(Restart,KWLCBadLeid,KWLCBadLeid)
);

WLC - Write List Controls

| P\S | 0 | 1 | 2 | 3 | 4 | 5 | 6 | 7 | 8 | 9 | 10 | 11 | 12 | 17 | 18 | R |
|-----|---|---|---|---|---|---|---|---|---|---|----|----|----|----|----|---|
| 0   | 0 |   | 2 |   |   |   |   |   |   |   |    |    |    |    |    |   |
| 1   |   | 1 |   |   |   |   |   |   |   |   |    |    |    |    |    | 1 |
| 2   | 2 |   | 2 |   |   |   |   |   |   |   |    |    |    |    |    | 2 |
| 3   |   |   |   |   |   |   |   |   |   |   |    |    |    |    |    |   |
| 4   |   |   |   |   |   |   |   |   |   |   |    |    |    |    |    |   |
| 5   |   |   |   |   |   |   |   |   |   |   |    |    |    |    |    |   |
| 6   |   |   |   |   |   |   |   |   |   |   |    |    |    |    |    |   |
| 7   |   |   |   |   |   |   |   |   |   |   |    |    |    |    |    |   |
| 8   |   |   |   |   |   |   |   |   |   |   |    |    |    |    |    |   |
| 9   |   |   |   |   |   |   |   |   |   |   |    |    |    |    |    |   |
| 10  |   |   |   |   |   |   |   |   |   |   |    |    |    |    |    |   |
| 11  |   |   |   |   |   |   |   |   |   |   |    |    |    |    |    |   |
| 12  |   |   |   |   |   |   |   |   |   |   |    |    |    |    |    |   |
| 17  |   |   |   |   |   |   |   |   |   |   |    |    |    | 17 |    | 17 |
| 18  |   |   |   |   |   |   |   |   |   |   |    |    |    |    |    |   |
| R   |   | 1 | 2 |   |   |   |   |   |   |   |    |    |    | 17 |    |   |

R-Restart as a result of a suppression condition otherwise Restart is Not applicable . . . 'WLC' has a retry buffer.

Design notes, for this example:
1) Response codes which generate a halt signal ==> None
2) Command suppression response codes ==> 1, 2, 17 18, 19, 20, 253 and 254
3) Response code pairs (0,2) and (2,0) can occur and are to be tolerated because key range initialization can proceed at different rates in the two structures. The key-range not initialized response code will be the resultant response code until the key range is initialized in both structures.

One example of a macro used to create the above table is as follows:
    ?RTE Command(WLC,(3,5)) RESULTS(
    (kWlcOK,kWlcOK,kWlcOK)
    ,(kWlcOK,KWLCKeyRangeNotInit,
        KWLCKeyRangeNotInit)
    ,(KWLCLauMismatch,KWLCLauMismatch,
        KWLCLauMismatch)
    ,(KWLCLauMismatch,Restart,KWLCLauMismatch)
    ,(KWLCKeyRangeNotInit,KWlcOK,
        KWLCKeyRangeNotInit)
    ,(KWLCKeyRangeNotInit,KWLCKeyRangeNotInit,
        KWLCKeyRangeNotInit)
    ,(KWLCKeyRangeNotInit,Restart,
        KWLCKeyRangeNotInit)
    ,(KWLCBadLeid,KWLCBadLeid,KWLCBadLeid)
    ,(KWLCBadLeid,Restart,KWLCBadLeid)
    ,(Restart,KWLCLauMismatch,KWLCLauMismatch)

WLE - Write List Entry

| P\S | 0 | 1 | 2 | 3 | 4 | 5 | 6 | 7 | 8 | 9 | 10 | 11 | 12 | 13 | 18 | R |
|-----|---|---|---|---|---|---|---|---|---|---|----|----|----|----|----|---|
| 0   | 0 |   |   |   |   |   |   |   |   |   |    |    |    |    |    |   |
| 1   |   | 1 |   |   |   | 5 | 6*|   |   |   |    |    |    |    |    | 1 |
| 2   |   |   | 2 |   |   |   |   |   |   |   |    |    |    |    |    |   |
| 3   |   |   |   | 3 |   | 5 | 6*|   |   |   |    |    |    |    |    | 3 |
| 4   |   |   |   |   | 4 | 5 | 6*|   |   |   |    |    |    |    |    | 4 |
| 5   | 5 |   |   | 5 | 5 | 5 | 6*| 5 | 5 | 5 | 5  |    | 5  | 5  | 5  | 5 |
| 6   | 6*|   |   | 6*| 6*| 6*| 6*| 6*| 6*| 6*| 6* |    | 6* | 6* | 6* | 6*|
| 7   |   |   |   |   |   | 5 | 6*| 7 |   |   |    |    |    |    |    | 7 |
| 8   |   |   |   |   |   | 5 | 6*|   | 8 |   |    |    |    |    |    | 8 |
| 9   |   |   |   |   |   | 5 | 6*|   |   | 9 |    |    |    |    |    | 9 |
| 10  |   |   |   |   |   | 5 | 6*|   |   |   | 10 |    |    |    |    | 10|
| 11  |   |   |   |   |   |   |   |   |   |   |    |    |    |    |    |   |
| 12  |   |   |   |   |   | 5 | 6*|   |   |   |    |    | 12 |    |    | 12|
| 13  |   |   |   |   |   | 5 | 6*|   |   |   |    |    |    | 13 |    | 13|
| 18  |   |   |   |   |   | 5 | 6*|   |   |   |    |    |    |    |    |   |
| R   |   | 1 |   | 3 | 4 | 5 | 6*| 7 | 8 | 9 | 10 |    | 12 | 13 |    |   |

*-Force restart (retry) if RC 6 is returned with the FRPI bit on.
R-Restart as a result of a suppression condition otherwise Restart (as a returned action) is not applicable . . . 'WLE' has a retry buffer.

Design notes, for this example:
1) Response codes which generate a halt signal ==> 5, 6
2) Command suppression response codes ==> 1, 3, 4, 5, 6, 7, 8, 9, 10, 12, 13, 18, 19, 20, 253 and 254
3) Response code pairs (5,6) and (6,5) are to be reconciled because 'list full' (RC=5) and 'list set full' (RC=6) response codes have the same priority. These response code pairs will be reconciled to the 'list set full' response code.

One example of a macro used to create the above table is as follows:
    ?RTE Command(WLE,(3,17))
    HandleRedriveModified(kWLEListEntryNotFound)
    Results(
    (kWLEOk,kWLEOk,kWLEOk)
    ,(KWLELAUMismatch,KWLELAUMismatch,
        KWLELAUMismatch)
    ,(KWLELAUMismatch,kWLEListFull,
        kWLEListFull)
    ,(KWLELAUMismatch,kWLEListSetFull,
        kWLEListSetFull,Verify_WMLE_WLE_
        RestartWhenSroaWLE6)
    ,(KWLELAUMismatch,Restart,
        KWLELAUMismatch)
    ,(kWLELocalLockMgrMismatch,
        kWLELocalLockMgrMismatch,
        kWLELocalLockMgrMismatch)
    ,(kWLEGlobalLockMgrMismatch,
        kWLEGlobalLockMgrMismatch,
        kWLEGlobalLockMgrMismatch)
    ,(kWLEGlobalLockMgrMismatch,kWLEListFull,
        kWLEListFull)
    ,(kWLEGlobalLockMgrMismatch,kWLEListSetFull,
        kWLEListSetFull,Verify_WMLE_WLE_
        RestartWhenSroaWLE6)
    ,(kWLEGlobalLockMgrMismatch,Restart,
        kWLEGlobalLockMgrMismatch)
    ,(kWLEVersionMismatch,kWLEVersionMismatch,
        kWLEVersionMismatch)

,(kWLEVersionMismatch,kWLEListFull,
kWLEListFull)
,(kWLEVersionMismatch,kWLEListSetFull,
kWLEListSetFull,Verify_WMLE_WLE_
RestartWhenSroaWLE6)
,(kWLEVersionMismatch,Restart,
kWLEVersionMismatch)
,(kWLEListFull,KWLELAUMismatch,
kWLEListFull)
,(kWLEListFull,kWLEGlobalLockMgrMismatch,
kWLEListFull)
,(kWLEListFull,kWLEVersionMismatch,
kWLEListFull)
,(kWLEListFull,kWLEListFull,kWLEListFull)
,(kWLEListFull,kWLEListSetFull,kWLEListSetFull,
Verify_WMLE_WLE_RestartWhenSroaWLE6)
,(kWLEListFull,kWLEListNumMismatch,
kWLEListFull)
,(kWLEListFull,kWLEListEntryNotFound,
kWLEListFull)
,(kWLEListFull,kWLEDupListEntryName,
kWLEListFull)
,(kWLEListFull,kWLEAssignmentKeyHigh,
kWLEListFull)
,(kWLEListFull,kWLEKeyCompareFail,
kWLEListFull)
,(kWLEListFull,kWLEDuplicateLEID,kWLEListFull)
,(kWLEListFull,Execution_Halted,kWLEListFull)
,(kWLEListFull,Restart,kWLEListFull)
,(kWLEListSetFull,KWLELAUMismatch,
kWLEListSetFull,Verify_WMLE_WLE_
RestartWhenSroaWLE6)
,(kWLEListSetFull,kWLEGlobalLockMgrMismatch,
kWLEListSetFull,Verify_WMLE_WLE_
RestartWhenSroaWLE6)
,(kWLEListSetFull,kWLEVersionMisinatch,
kWLEListSetFull,Verify_WMLE_WLE_
RestartWhenSroaWLE6)
,(kWLEListSetFull,kWLEListFull,kWLEListSetFull,
Verify_WMLE_WLE_RestartWhenSroaWLE6)
,(kWLEListSetFull,kWLEListSetFull,
kWLEListSetFull,Verify_WMLE_WLE_
RestartWhenSroaWLE6)
,(kWLEListSetFull,kWLEListNumMismatch,
kWLEListSetFull,Verify_WMLE_WLE_
RestartWhenSroaWLE6)
,(kWLEListSetFull,kWLEListEntryNotFound,
kWLEListSetFull,Verify_WMLE_WLE_
RestartWhenSroaWLE6)
,(kWLEListSetFull,kWLEDupListEntryName,
kWLEListSetFull,Verify_WMLE_WLE_
RestartWhenSroaWLE6)
,(kWLEListSetFull,kWLEAssignmentKeyHigh,
kWLEListSetFull,Verify_WMLE_WLE_
RestartWhenSroaWLE6)
,(kWLEListSetFull,kWLEKeyCompareFail,
kWLEListSetFull,Verify_WMLE_WLE_
RestartWhenSroaWLE6)
,(kWLEListSetFull,kWLEDuplicateLEID,
kWLEListSetFull,Verify_WMLE_WLE_
RestartWhenSroaWLE6)
,(kWLEListSetFull,Execution_Halted,
kWLEListSetFull,Verify_WMLE_WLE_
RestartWhenSroaLWLE6)
,(kWLEListSetFull,Restart,kWLEListSetFull,Verify_
WMLE_WLE_RestartWhenSroaWLE6)
,(kwLEListNumMismatch,kWLEListFull,
kWLEListFull)
,(kWLEListNumMismatch,kWLEListSetFull,
kWLEListSetFull,Verify_WMLE_WLE_
RestartWhenSroaWLE6)
,(kWLEListNumMismatch,kWLEListNumMismatch,
kWLEListNumMismatch)
,(kWLEListNumMismatch,Restart,
kWLEListNumMismatch)
,(kWLEListEntryNotFound,kWLEListFull,
kWLEListFull)
,(kWLEListEntryNotFound,kWLEListSetFull,
kWLEListSetFull,Verify_WMLE_WLE_
RestartWhenSroaWLE6)
,(kWLEListEntryNotFound,
kWLEListEntryNotFound,
kWLEListEntryNotFound)
,(kWLEListEntryNotFound,Restart,
WLEListEntryNotFound)
,(kwLEDupListEntryName,kWLEListFull,
kWLEListFull)
,(kwLEDupListEntryName,kWLEListSetFull,
kWLEListSetFull,Verify_WMLE_WLE_
RestartWhenSroaWLE6)
,(kWLEDupListEntryName,kWLEDupLis,
tEntryName,kWLEDupListEntryName)
,(kWLEDupListEntryName,Restart,
kWLEDupListEntryName)
,(kWLEAssignmentKeyHigh,kWLEListFull,
kWLEListFull)
,(kWLEAssignmentKeyHigh,kWLEListSetFull,
kWLEListSetFull,Verify_WMLE_WLE_
RestartWhenSroaWLE6)
,(kWLEAssignmentKeyHigh,
kWLEAssignmentKeyHigh,
kWLEAssignmentKeyHigh)
,(kWLEAssignmentKeyHigh,Restart,
kWLEAssignmentKeyHigh)
,(kWLEKeyCompareFail,kWLEListFull,
kWLEListFull)
,(kWLEKeyCompareFail,kWLEListSetFull,
kWLEListSetFull,Verify_WMLE_WLE_
RestartWhenSroaWLE6)
,(kWLEKeyCompareFail,kWLEKeyCompareFail,
kWLEKeyCompareFail)
,(kWLEKeyCompareFail,Restart,
kWLEKeyCompareFail)
,(kWLEDuplicateLEID,kWLEListFull,kWLEListFull)
,(kWLEDuplicateLEID,kWLEListSetFull,
kWLEListSetFull,Verify_WMLE_WLE_
RestartWhenSroaWLE6)
,(kWLEDuplicateLEID,kWLEDuplicateLEID,
kWLEDuplicateLEID)
,(kWLEDuplicateLEID,Restart,
kWLEEDuplicateLEID)
,(Execution_Halted,kWLEListFull,kWLEListFull)
,(Execution_Halted,kWLEListSetFull,
kWLEListSetFull,Verify_WMLE_WLE_
RestartWhenSroaWLE6)
,(Restart,KWLELAUMismatch,
KWLELAUMismatch)
,(Restart,kWLEGlobalLockMgrMismatch,
kWLEGlobalLockMgrMismatch)
,(Restart,kWLEVersionMismatch,
kWLEVersionMismatch)
,(Restart,kWLEListFull,kWLEListFull)
,(Restart,kWLEListSetFull,kWLEListSetFull,Verify_
WMLE_WLE_RestartWhenSroaWLE6)
,(Restart,kWLEListNumMismatch,
kWLEListNumMismatch)

,(Restart,kWLEListEntryNotFound,
  kWLEListEntryNotFound)
,(Restart,kWLEDupListEntryName,
  kWLEDupListEntryName)
,(Restart,kWLEAssignmentKeyHigh,
  kWLEAssignmentKeyHigh)
,(Restart,kWLEKeyCompareFail,
  kWLEKeyCompareFail)
,(Restart,kWLEDuplicateLEID,kWLEDuplicateLEID)
);

| WLTE - Write Lock Table Entry |
|---|

| P\S | 0 | 1 | 2 | 3 | 4 | 5 | 6 | 7 | 8 | 9 | 10 | 11 | 12 | 16 | 18 | R |
|---|---|---|---|---|---|---|---|---|---|---|---|---|---|---|---|---|
| 0 | 0 | | | | | | | | | | | | | | | 0 |
| 1 | | | | | | | | | | | | | | | | |
| 2 | | | 2 | | | | | | | | | | | | | 2 |
| 3 | | | | 3 | | | | | | | | | | | | 3 |
| 4 | | | | | | | | | | | | | | | | |
| 5 | | | | | | | | | | | | | | | | |
| 6 | | | | | | | 6 | | | | | | | | | 6 |
| 7 | | | | | | | | | | | | | | | | |
| 8 | | | | | | | | | | | | | | | | |
| 9 | | | | | | | | | | | | | | | | |
| 10 | | | | | | | | | | | | | | | | |
| 11 | | | | | | | | | | | | | | | | |
| 12 | | | | | | | | | | | | | | | | |
| 16 | | | | | | | | | | | | | | | | |
| 18 | | | | | | | | | | | | | | | | |
| R | 0 | | 2 | 3 | | | 6 | | | | | | | | | |

R-Restart

Design notes, for this example:
1) Response codes which generate a halt signal ==> None
2) Command suppression response codes ==> 3, 6, 18, 19, 20, 253 and 254

One example of a macro used to create the above table is as follows:
  ?RTE Command(WLTE,(3,11)) RESULTS(
    (kWLTEOk,kWLTEOk,kWLTEOk)
    ,(KWLTELlmMismatch,KWLTELlmMismatch,
      KWLTELlmMismatch)
    ,(KWLTEGlmMismatch,KWLTEGlmMismatch,
      KWLTEGlmMismatch)
    ,(KWLTEStrAuthMismatch,
      KWLTEStrAuthMismatch,
      KWLTEStrAuthMismatch)
    ,(Restart,kWLTEOk,kWLTEOk)
    ,(kWLTEOk,Restart,kWLTEOk)
    ,(Restart,KWLTELlmMismatch,KWLTElmMismatch)
    ,(KWLTELlmMismatch,Restart,
      KWLTELlmMismatch)
    ,(Restart,KWLTEGlmMismatch,KWLTElmMismatch)
    ,(KWLTEGlmMismatch,Restart,
      KWLTEGlmMismatch)
    ,(Restart,KWLTEStrAuthMismatch,
      KWLTEStrAuthMismatch)
    ,(KWLTEStrAuthMismatch,Restart,
      KWLTEStrAuthMismatch)
  );

Software Processing Phases—Establishing Duplexing

Figure 6:
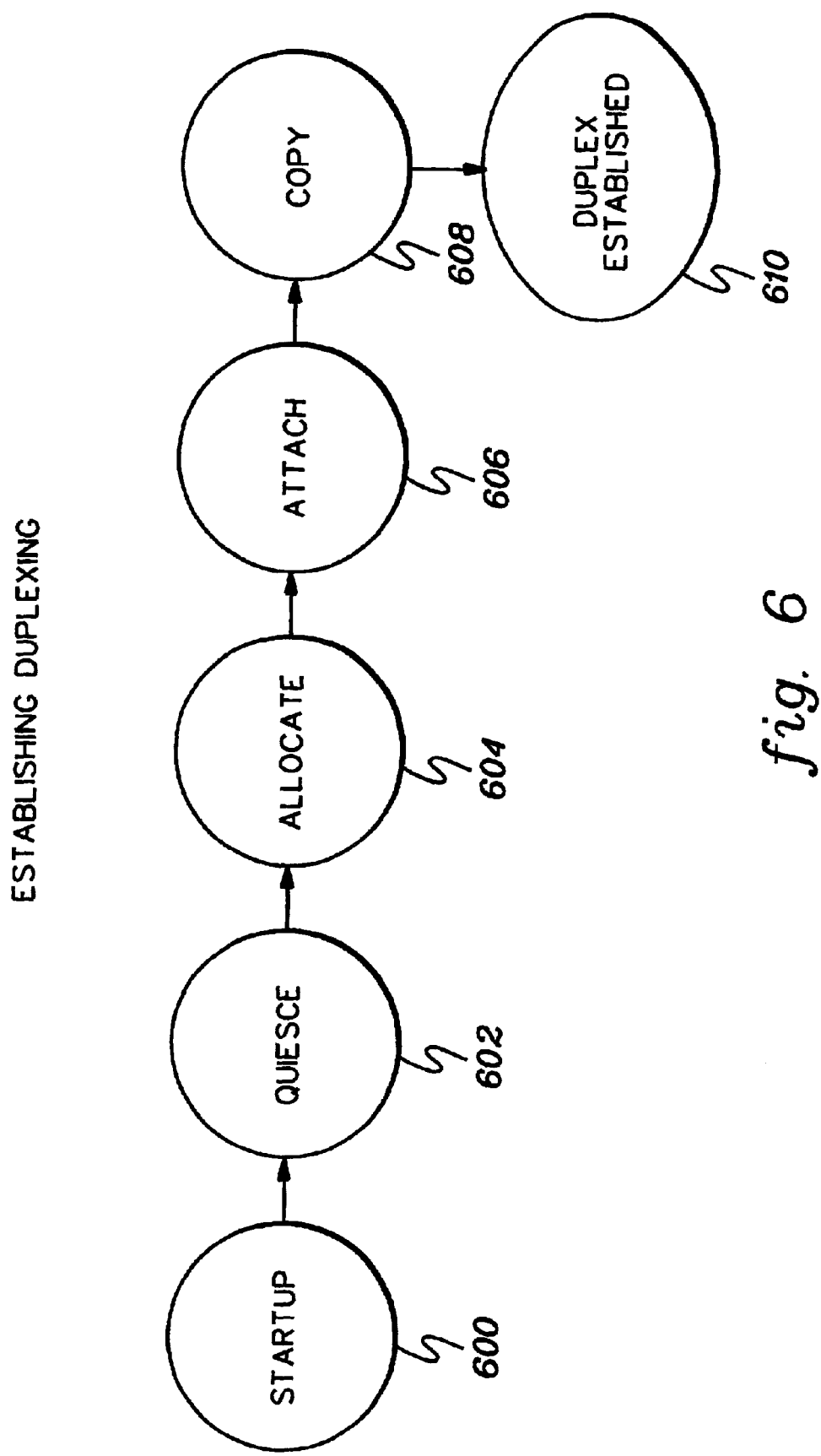
FIG. 6 depicts one embodiment of the processing phases to establish duplexing for a system-managed duplexing rebuild process, in accordance with an aspect of the present invention.

In one aspect of the present invention, there are various processing phases associated with establishing system-managed duplexing. One embodiment of these phases is described with reference to FIG. 6. Since some of the processing associated with these phases is similar to that for system-managed rebuild, which is known and described in one or more of the previously incorporated applications/patents, it is not covered in great detail here. The system-managed processing is assumed to occur except as otherwise noted. Where significant differences relating to system-managed duplexing occur, those differences and extensions are Sully described.

When the system-managed duplexing rebuild process is started, it enters a Startup phase (600). The exploiters are notified of this via an event exit event, such as Structure Temporarily Unavailable, which each active exploiter confirms. The exploiter instances may or may not take any action in response to this event. As one example of taking an action, an exploiter may choose to suppress or quiesce further structure activity at its level, rather than relying on the operating system for this.

When the active exploiter instances have confirmed this event, the process transitions into a Quiesce phase (602). In this system-managed phase, the operating system quiesces structure activity, waiting for the completion of any in-progress requests, and sending future requests (if any) received from the structure exploiter to a delay queue.

When the systems have quiesced activity against the structure, the process transitions into an Allocate phase (604). In this system-managed phase, the operating system allocates a new structure instance which, when populated with data, is used as the secondary structure of the duplex pair. The structure allocation process is a system-managed process, which proceeds independently with respect to active connectors to the structure (and in fact, may operate without any active connectors to the structure).

The structure allocation process runs on a single system whose "ownership" of the structure allocation process is maintained by the operating system so that, in the event of a system failure, the ownership can be transferred or assumed by another system. The structure allocation process can also transfer ownership voluntarily to run on another system, if necessary or desired. However, when transferring ownership for duplexing, an additional factor is to be taken into account: coupling facility-to-coupling facility connectivity.

In particular, a given system might be unable to allocate the secondary structure because it does not have connectivity to any suitable coupling facility in the preference list (an ordered list of preferred coupling facilities), which has peer connectivity to the coupling facility in which the primary structure is allocated. Therefore, in order to maximize the chances of a successful structure allocation, ownership of the structure allocation process is to be transferred to a system, which not only has connectivity to some of the coupling facilities in the preference list, but has connectivity to the subset of the coupling facilities in the preference list which have peer connectivity to the coupling facility in which the primary structure is allocated.

Additionally, for system-managed duplexing, any in-progress alter process that is going on for the structure is explicitly stopped, prior to secondary structure allocation. The structure allocation process allocates, in one example, the secondary structure with the exact same object counts as the primary structure, and so those counts are not to be a moving target, as the structure allocation process proceeds. (In another embodiment, the secondary structure may have a differing number of object counts.)

For system-managed duplexing, secondary structure allocation assumes a rebuild attribute of LOCATION=OTHER, so that the primary and secondary structure instances are not allocated in the same coupling facility with one another. When there are active connectors to the structure, it also assumes a rebuild attribute of LESSCONNACTION= TERMINATE, so that the attempt to start duplexing for the structure is automatically stopped, if it would cause a loss of coupling facility connectivity for any active connector to the structure.

In addition to the primary and secondary structures being allocated in different coupling facilities from one another, the structure allocation process gives strong preference to placing the structures in two different coupling facilities, which are failure-isolated with respect to one another (that is, which are duplex failure-isolated).

The structure allocation technique for system-managed duplexing allocates the secondary structure taking the following considerations into account.

ENFORCEORDER
    When the installation has specified that the preference list order is to be strictly enforced for the structure, the operating system applies those eligibility list considerations (see below) that involve dropping ineligible coupling facilities from the preference list. The operating system does not, in this example, apply the considerations that involve weighting the coupling facilities and reordering the preference list based on these attribute weights (i.e., considerations for volatility, failure-isolation from connectors, failure-isolation from primary coupling facility, and exclusion list).

COUPLING FACILITY-TO-COUPLING FACILITY LINK CONNECTIVITY
    In order to support the architected coupling facility duplexing protocols between the coupling facilities, there is to be coupling facility-to-coupling facility link connectivity (at the time of secondary structure allocation) between the coupling facility in which the primary structure is allocated and any coupling facility in which the secondary structure is to be allocated. Any coupling facility in the preference list which does not have coupling facility-to-coupling facility link connectivity to the coupling facility where the primary structure resides is dropped from the eligibility list. During secondary structure allocation, the operating system uses a Read Connected Facility Controls (RCFC) command to read the table of remote connected coupling facilities from the coupling facility where the primary structure is allocated, and similarly, uses RCFC to read the table of remote connected coupling facilities from each of the target coupling facilities which are considered for allocation of the secondary structure. The operating system removes from the eligibility list consideration of any coupling facility, which does not occur in the list of remote connected coupling facilities for the coupling facility in which the primary structure is allocated, or does not contain the coupling facility in which the primary structure is allocated in its list of remotely connected coupling facilities.

LOCATION (OTHER)
    The secondary structure is not, in this example, to be allocated in the same coupling facility as the primary. Thus, the coupling facility which contains the primary structure is dropped from the eligibility list.

LESSCONNACTION (TERMINATE)
    The operating system does not tolerate the loss of active connectors simply in order to establish duplexing for the structure. That is, active connectors to the primary structure are to also have connectivity to the coupling facility in which the secondary structure is to be allocated. Therefore, any coupling facility which does not provide connectivity for currently active connectors to the structure is dropped from the eligibility list.

When there are no active connectors to the structure, the operating system tolerates the allocation of the structure in a coupling facility, which has less connectivity to systems than does the coupling facility in which the primary structure is allocated. There is value in establishing a secondary copy of the structure data, even if that secondary copy of the data is not as easily accessible as is the primary copy.

Later, when an exploiter instance attempts to connect to the now-duplexed structure, the operating system may observe that the would-be connector is running on a system that does not have connectivity to both structure instances of the duplexed structure (but has connectivity to at least one of the two structure instances). When this occurs, the operating system drops the structure out of duplexing, keeping the structure that is accessible to the attempted connector, and connects the connector to the now-simplex structure instance. Note that after the connector connects, the structure may subsequently be reduplexed into another coupling facility that does provide full connectivity for the set of active connectors to the structure at that time, as described in further detail hereinafter.

AVAILABLE SPACE
    For system-managed duplexing, the secondary structure is allocated as a copy of the primary structure. In one example, the same primary structure attributes and total/maximum counts for the structure objects are obtained in the secondary structure.
    To achieve the above, the size of the secondary structure may end up being significantly different from the size of the primary structure (e.g., due to different coupling facility storage allocation mechanisms that may exist at different CFLEVELs). Therefore, the operating system processes as follows, for each coupling facility in the preference list:
    Determine the target size (and minimum desired control space) of a structure allocated in this particular coupling facility, which has the same structure attributes and total/maximum object counts, as the primary structure. Note that the maximum structure size from the CFRM policy is not used as an upper bound to the determined target structure size; rather, the maximum structure size is allowed to "float" to whatever size is desired to accommodate the number of structure objects that exist in the primary structure.
    Compare the determined target size and minimum desired control space results to the actual free space and free control space in this coupling facility:
    If the coupling facility has sufficient free space and free control space to accommodate the allocation of the structure, include this coupling facility in the eligibility list.
    If not, drop this coupling facility from the eligibility list.

CFLEVEL
    A coupling facility of at least CFLEVEL=10 is desired to support system-managed duplexing, so any coupling facility in the preference list which is at a lower CFLEVEL is dropped from the eligibility list.

VOLATILITY
  If any active or failed-persistent connectors to the structure requested nonvolatility, the operating system gives preference in the eligibility list to allocating the structure in a nonvolatile coupling facility, using the normal eligibility list weighting for nonvolatility.

FAILURE-ISOLATION FROM CONNECTORS
  If any active or failed-persistent connectors to the structure requested nonvolatility (and thus implicitly requested failure-isolation), the operating system gives preference to allocating the secondary structure in a coupling facility which is standalone, that is, failure-isolated with respect to active connectors to the structure.
  Non-standalone coupling facilities, which do not provide failure-isolation from active connectors, are allowed to remain in the eligibility list, but behind those that do provide full failure-isolation, using the normal eligibility list weighting for failure-isolation.

FAILURE-ISOLATION FROM PRIMARY COUPLING FACILITY
  The operating system gives preference to allocating the secondary structure in a coupling facility, which is duplex failure-isolated (i.e., in a different CEC) from the primary coupling facility. Coupling facilities which do not provide failure isolation from the primary coupling facility are allowed to remain in the eligibility list, behind the coupling facilities that do provide this failure-isolation. This failure-isolation from the primary coupling facility is thus in effect a very high-weighted attribute in determining the eligibility list order, in this example.
  If the secondary structure is allocated in a coupling facility, which is not duplex failure-isolated from the primary, the operating system issues a highlighted eventual action warning message to that effect to provide a persistent warning to the installation that, while the structure is duplexed, it is not providing full robustness because of the lack of coupling facility-to-coupling facility failure isolation.

EXCLUSION LIST
  As usual for exclusion list, the operating system prefers to allocate the secondary structure in a coupling facility which does not contain any allocated structure instances (primary or secondary) for any structure listed in this structure's exclusion list. Coupling facilities containing such structure instances are allowed to remain in the eligibility list, subsequent to those that do not contain such structures, given the normal eligibility list weighting for exclusion list.

APPLICATION OF PENDING POLICY
  A system-managed duplexing rebuild process is not started, when there is a CFRM policy change pending for the structure. If a system-managed duplexing rebuild is started and then a policy change becomes pending prior to processing for the allocate phase, the duplexing rebuild is stopped, at that time.

If the eligibility list of coupling facilities is reduced to zero after applying these considerations, then duplexing is not established, at this time. The duplexing rebuild is automatically stopped by the operating system, in this case. Otherwise, the operating system proceeds to attempt allocation in each of the coupling facilities, which remain in the eligibility list, in the order in which they appear in the eligibility list.

For system-managed duplexing, in one example, if the system successfully allocates the secondary structure, it is allocated with the same total/maximum object counts as the primary structure. Directed Allocation commands are used to request that the secondary structure be allocated with the same attributes and total/maximum object counts as the primary. If the directed allocation is successful in a particular coupling facility in the eligibility list, processing stops at that point; the secondary structure has been allocated. If not, allocation proceeds to be attempted in the next eligible coupling facility in the eligibility list.

When the coupling facilities in the eligibility list have been processed, if the secondary structure has not been successfully allocated, the operating system automatically stops the system-managed duplexing rebuild, because no secondary structure could be allocated. Otherwise, allocate phase processing continues.

For system-managed duplexing, the operating system sets the duplexing controls for each structure to indicate that duplexing is active. The system issues an Activate Duplexing (ADPLX) command to each structure instance, setting the other coupling facility's remote facility system identifier (RFSYID) and remote facility node descriptor (RFND) values; setting the other structure's remote facility structure identifier (RFSID) and remote facility structure authority (RFSAU) values, in each of the structures; and setting a duplexing active bit in a duplexing vector, thereby activating duplexing in each structure instance. This establishes a duplex pair of structures. Note that in the future when the system switches or stops duplexing and reverts to simplex mode, this binding of the structure instances is undone by issuing a Deactivate Duplexing (DDPLX) command against the surviving structure instance.

Embodiments of the Activate Duplexing Command and Deactivate Duplexing Command are described in a co-filed patent application entitled "Coupling Of A Plurality Of Coupling Facilities Using Peer Links," Brooks et al. Ser. No. 09/968,244, which is hereby incorporated herein by reference in its entirety.

If the secondary structure is successfully allocated, the system proceeds with system-managed duplexing structure attachment processing by transitioning into an Attach phase (606). In this system-managed phase, the operating system attaches the active connectors (attached to the primary structure) to the secondary structure, as well.

When the active connectors are attached to the secondary structure, processing transitions into a Copy phase (608). The copy process is a system-managed process, which proceeds independently with respect to active connectors to the structure (and is performed even if there are no active connectors to the structure). The copy process is, in most respects, similar to that used for system-managed rebuild. However, there are some differences for system-managed duplexing.

One difference that relates to the copy process is that, in this embodiment, storage class statistics are not copied from the old structure to the new structure for system-managed duplexing, nor are they duplexed on an ongoing basis between the two structure instances. Rather, each structure instance maintains its own storage class statistics independently. A request to read storage class statistics information from a duplexed structure returns one set of storage class information, from the primary structure instance.

Another difference in copy processing is that, for system-managed duplexing, copying of cache structure registrations is not performed. There is no need to copy registrations as part of establishing duplexing, since the operating system does not duplex any subsequent structure operations that register interest, once the structure is Duplex Established.

The implication of this is that whenever switching forward to simplex mode using the secondary cache structure, the operating system is to ensure that all users' local cache vectors are overindicated as not valid (and thus, all local cache buffers are invalidated), since there are no valid registration information in the surviving simplex (formerly secondary) structure when that switchover occurs.

Another difference in copy processing has to do with copying of list structure registrations, especially sublist-monitoring registrations contained in Event Monitor Controls (EMCs). The registrations (e.g., list monitoring, key-range monitoring, event-queue monitoring, and sublist monitoring) are copied from the old structure to the new structure. However, the duplexing copy process does not request initial notification (INRT=0) and does request suppression of notification (SNC=1), when it registers interest in these things in the new structure. For list monitoring, key-range monitoring, and event-queue monitoring, this suppresses the generation of list notification signals, which is valid because the local vector is already in the correct state anyway. For sublist monitoring, this suppresses the queueing of created EMCs to the user's event queue. In effect, the EMCs in the new structure are unqueued at the time of copy, and remain unqueued throughout normal duplexed operation, as a result of the suppression of notification (SNC=1) on mainline operations to the secondary structure, regardless of whether or not the corresponding EMCs are being queued in the primary structure.

To correct for this lack of duplexing synchronization in the queueing of EMCs, before switching to simplex mode using the secondary structure instance, the operating system needs to prepare the secondary structure by using a command, referred to as Queue Pending EMCs or QPE, that causes EMCs associated with nonempty sublists to be queued to their respective event queues at that time. This processing may "overindicate" some events, but it ensures that initiatives to process nonempty sublists are not lost across a transition from duplex mode to simplex mode using the secondary structure instance. One embodiment of QPE is described in a co-filed patent application entitled "Coupling Of A Plurality Of Coupling Facilities Using Peer Links", Brooks et al., Ser. No. 09/968,244, which is hereby incorporated herein by reference in its entirety.

An implication of the way list registrations and notifications are handled for duplexed list structures is that, when switching to the secondary structure, the list notification vectors are cleared to overindicate the nonempty state for the monitored list resources.

When the copy process completes, the duplexing rebuild proceeds into a Duplex Established phase (610). This is different from system-managed rebuild processing, where at this point processing would have transitioned into the cleanup phase, the old structure would have been deallocated, and the new structure would have been kept. Here, the intent of creating a new copy of the structure is to keep it around indefinitely in the Duplex Established phase, and transparently duplex required or desired operations to the structure in order to preserve the synchronization between the primary and secondary structures that the copy processing has just established.

On entry to the Duplex Established phase, the operating system modifies its internal control structures to reflect the fact that the structure is duplexed, so that subsequent requests are driven against the structure in duplex mode, if appropriate (see STEP 300 (FIG. 3)). Also, the structure is unquiesced by the operating system, so that new requests submitted by the exploiters can execute in duplexed mode. Furthermore, requests that were delayed while the structure was quiesced are similarly redriven, so that they can now execute in duplexed mode. In one example, the exploiters receive two event exit events on entry to the Duplex Established phase: Structure State Change Notification (informing them that the structure has now become duplexed), and Structure Available (the counterpart to the Structure Temporarily Unavailable event that they received back in the Startup phase, which lets the users know that the structure is usable again).

As long as the structure remains in the Duplex Established phase, which may be a very long time, structure operations by the exploiters are transparently duplexed by the operating system (as described above and in FIGS. 3, 4 and 5a–5h).

Composition of Structure Attributes

In previous techniques, at various points in time, users of coupling facility structures were informed about the structure attributes of the structure to which they are connected. Many of these structure attributes relate in some way to the physical aspects of the coupling facility in which the structure is allocated, or of the physical structure instance itself.

For one aspect of the present invention, this poses an obstacle to the "transparency" of system-managed coupling facility structure duplexing to the exploiters, because in general, the attributes of the primary and secondary structure may differ significantly from one another. Thus, as the structure transitions from simplex mode using the original structure, to duplexed with two structure instances allocated, to (eventually) simplex mode using the former secondary structure, several different sets of structure attributes potentially may need to become visible to the exploiters who depend on an understanding of these attributes.

In order to notify exploiters about structure attributes, a known Structure State Change Notification event is utilized. On entry to the Duplex Established phase, the Structure State Change Notification event is used to report the new attributes of the duplexed structure to the users, as described above. However, unlike before, the attributes presented on entry to the Duplex Established phase are "composite" attributes of the duplexed pair of structures. That is, the reported attributes are not the attributes of the primary or the secondary structure per se, but rather a composite of the two. The composite attributes reported on the Structure State Change Notification event are defined in terms of the following "composition rules" for the various structure attributes:

VOLATILITY
  If either structure instance is nonvolatile, the composite state is nonvolatile.

FAILURE-ISOLATION
  Failure-isolation is reported as a bit string, where each bit represents the failure-isolation state of a given connector relative to the structure. If a connector is failure-isolated from either structure instance, the composite state for that connector is failure-isolated.

PHYSICAL STRUCTURE VERSION NUMBERS
  There is no composite state of this attribute. The unique physical structure version numbers for each structure instance (primary and secondary) are presented. As part of supporting system-managed processes (rebuild and duplexing), the exploiters are prepared to handle these two unique structure version numbers appropriately.

CFNAME
  The composite state of this attribute is the CFNAME of the primary structure's coupling facility.

CFLEVEL
When establishing duplexing, the secondary structure is allocated in at least as high of a CFLEVEL as that which has been previously reported back to any connector as the primary structure's CFLEVEL. Therefore, when the structure is duplexed, the composite state of the CFLEVEL attribute does not change as seen by any connector. It is the lower of the actual CFLEVEL of the primary structure instance, or the connector's requested CFLEVEL.

DUPLEXING STATE INDICATORS
These are attributes that are added, in support of one or more aspects of the present invention, to the attribute information presented on the Structure State Change Notification event. The intent is to inform the connectors about the structure being duplexed, and about the extent to which the duplex pair of structures are failure-isolated from one another, on the assumption that exploiters might operate differently, if they knew their data were protected via coupling facility redundancy. There are two indicators: an indicator of whether the structure is simplex or duplexed, and if duplexed, an indication of whether or not the primary structure instance is failure-isolated from the secondary structure instance.

Software Processing Phases—Stopping/Breaking Duplexing

In one aspect of the present invention, there are various phases associated with stopping/breaking duplexing for a system-managed duplexing rebuild process. One embodiment of these phases is described with reference to FIG. 7. Duplexing may be broken, or stopped, either voluntarily or as the result of a failure affecting one or the other of the structure instances. (As described above, it can also be caused by various types of failures of the duplexing protocols themselves, during the Duplex Established phase.)

Figure 7:
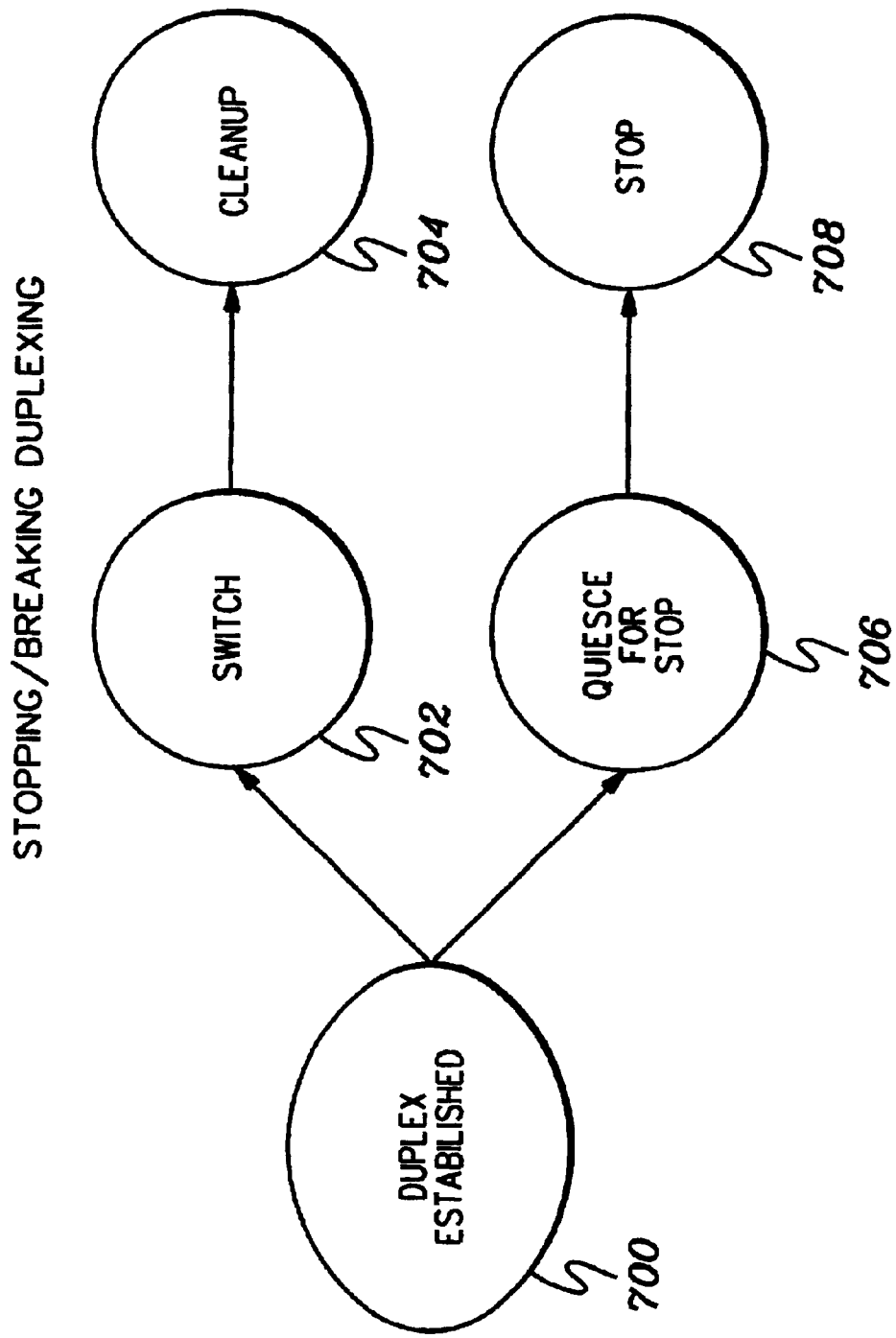
FIG. 7 shows one embodiment of the processing phases to stop/break duplexing for a system-managed duplexing rebuild process, either switching to keep the secondary structure, or stopping to keep the primary structure, in accordance with an aspect of the present invention.

With reference to FIG. 7, regardless of the reason for stopping duplexing for a structure in the Duplex Established phase (700), there is an inherent "directionality" about the stop process. Processing either intends to keep the secondary structure as the surviving simplex structure (leading to the Switch (702) and Cleanup (704) phases), or it intends to keep the primary structure as the surviving simplex structure (leading to the Quiesce for Stop (706) and Stop (708) phases).

If the stop or switch processing is initiated as the result of a failure of a duplexed operation, such as a structure failure or a loss of connectivity to the coupling facility containing one of the two duplexed structure instances, then (unlike user-managed duplexing) knowledge of that failure condition is "hidden" from the exploiters. No loss of connectivity nor structure failure event exit events are presented; and the requests to the coupling facility which experienced the failure are placed on a special "hold" queue rather than being returned to the user with any response code indicative of the failure. This "hiding" of the failure conditions affecting a duplexed structure is part of the philosophy behind system-managed duplexing, in which exploiters do not have to see these failure conditions, nor have any unique support to deal with these failure conditions, since they will be handled transparently by the system-managed duplexing failover mechanism in the operating system. Once the operating system has completed stop or switch processing and reverted to simplex mode, the requests on the hold queue are dispensed with appropriately, as discussed below.

When a switch to secondary is initiated, the Switch phase (702) is entered. During this system-managed phase, no external event exit events are presented to the exploiters. Each system internally quiesces access to the structure, so that any new requests received from the exploiter are internally queued and delayed until the structure has reverted to simplex mode (requests experiencing a failure condition are also placed on the "hold" queue). Once the systems have quiesced access to the structure and held the in-progress requests against the structure, the processing transitions into the Cleanup phase (704).

Figure 8A:
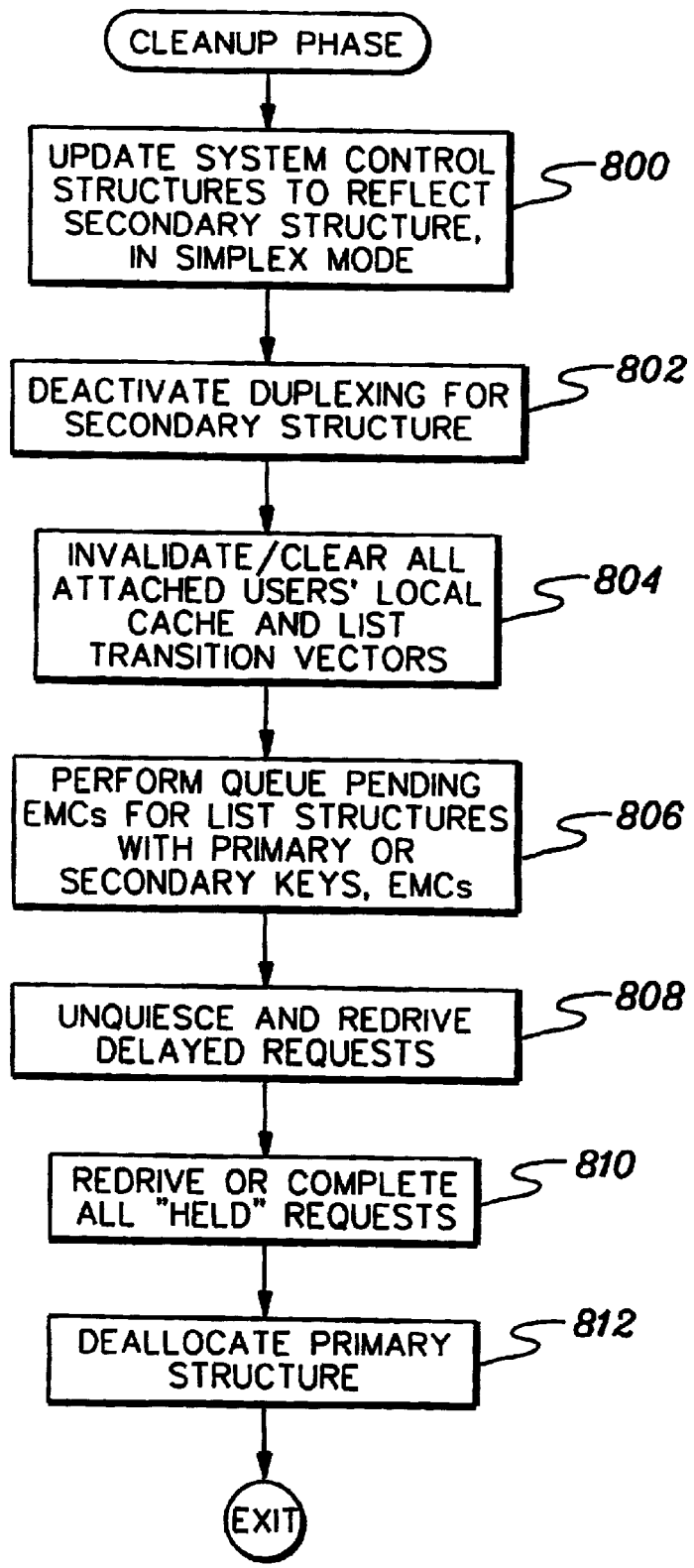
FIG. 8a depicts one embodiment of the logic associated with a cleanup phase of a system-managed duplexing rebuild process, in accordance with an aspect of the present invention.

One embodiment of the logic associated with the Cleanup phase is described with reference to FIG. 8*a*. The Cleanup phase is a system-managed phase in which each operating system image updates its internal control structures to reflect the fact that the structure has reverted to simplex mode, so that subsequent operations driven against the structure are executed as simplex requests targeted to the former secondary structure instance, STEP 800 (see also STEP 300 (FIG. 3)).

For example, there is a control block that represents a user's connection to the structure. In simplex mode, it includes the MFID and SID that identify the coupling facility and structure within that coupling facility. In duplex mode, it includes two sets of MFID and SID information, one for the primary structure and one for the secondary. If there is only one valid set of information in this control block, the structure is in simplex mode; if there are two, the structure is in duplex mode.

The following additional processing is performed by the operating system, as well during this phase:

The secondary structure instance, in order to operate correctly in simplex mode, has duplexing deactivated for it via the Deactivate Duplexing (DDPLX) command, STEP 802. This command breaks the bind between the primary and secondary structure instances, and informs the coupling facility that the structure is henceforth to operate in simplex mode.

Local cache vectors and list transition notification vectors for the users are overindicated to the invalid/nonempty state, STEP 804. Cache registrations are not maintained by duplexing protocols in the secondary structure instance, so the registration information is lost when switching to the secondary. Thus, the local cache vectors are correspondingly invalidated. List notification registrations are maintained by duplexing protocols in the secondary structure, however, since list transition notifications are processed asynchronously by the coupling facility, and since list transition notifications from the secondary structure are suppressed during duplexing via the SNC request operand, there are timing windows during which list transition notifications may be lost during the switch process; therefore, the list notification vectors are correspondingly invalidated.

For list structures with Event Monitor Controls (EMCs), the event queues have not been maintained by duplexing protocols in the secondary structure instance. However, before switching over to the secondary structure, it is possible to reconstruct the appearance of the event queues from the primary structure into the secondary structure, based on information about the state of sublists in the secondary structure. A command, Queue Pending EMCs (QPE), is executed against the secondary structure for each list and sublist in order to cause EMCs to be appropriately queued on, or dequeued from, the event queues within the structure. This queueing/dequeueing is done by the QPE command based on the current empty/nonempty state of the sublist which is associated with the monitoring EMC.

Note also that if the structure supports secondary keys, then two sets of QPE operations are performed: one to scan the primary key sublists and build the primary event queues; the other to scan the secondary key sublists and build the secondary event queues, STEP 806.

The structure is unquiesced, so that new requests against the structure may execute in simplex mode. Requests which were delayed during the Switch and Cleanup phases are now redriven from the delay queue, STEP 808.

Requests on the "hold" queue are either redriven against the structure in simplex mode, or completed back to the user without being redriven, depending on the state of processing that had occurred prior to being placed on the hold queue, STEP 810. Recall that the hold queue is used to contain requests that were being processed, or had been processed, perhaps unsuccessfully, against the duplexed structure, while in the Duplex Established phase. Now that the structure has reverted to simplex mode using the secondary structure, the results of the "held" requests are examined to determine whether or not the request processed successfully against the secondary structure instance, prior to being placed on the hold queue. If so, then there is no need to redrive the request against the secondary structure (now the simplex structure) again, the system simply returns the stored results of the request to the exploiter. If not, then the request is setup for redrive against the former secondary structure in simplex mode.

The primary structure instance, which is no longer needed, is deallocated, STEP 812.

Upon completion of the Cleanup phase, the users are presented with an event exit event, Structure State Change Notification, to inform them that the structure has reverted to simplex mode. The information presented in this event refers to the former secondary structure instance as the surviving structure.

Referring again to FIG. 7, when a stop to keep the primary is initiated, the Quiesce for Stop phase (706) is entered. During this system-managed phase, no external event exit events are presented to the exploiters. Each system internally quiesces access to the structure, so that any new requests received from the exploiter are internally queued and delayed until the structure has reverted to simplex mode (requests experiencing a failure condition are also placed on the "hold" queue). Once all systems have quiesced access to the structure and held all in-progress requests against the structure, the processing transitions into the Stop phase (708).

Figure 8B:
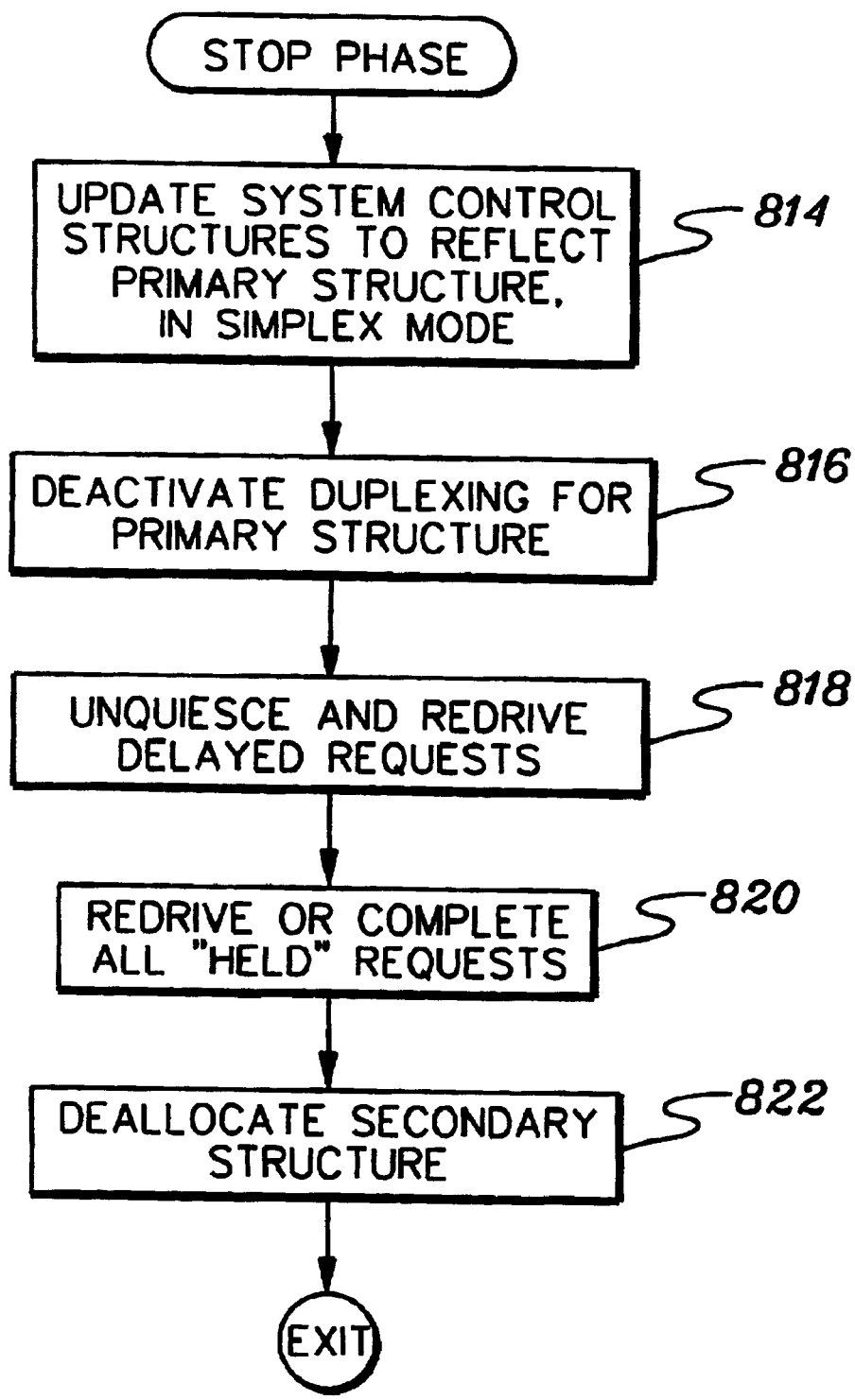
FIG. 8b depicts one embodiment of the logic associated with a stop phase of a system-managed duplexing rebuild process, in accordance with an aspect of the present invention.

One embodiment of the logic associated with the Stop phase is described with reference to FIG. 8b. The Stop phase is a system-managed phase in which each operating system image updates its internal control structures to reflect the fact that the structure has reverted to simplex mode, so that subsequent operations driven against the structure execute as simplex requests targeted to the former primary structure instance, STEP 814 (see also STEP 300 (FIG. 3)).

The following additional processing is performed by the operating system, as well during this phase:

The primary structure instance, in order to operate correctly in simplex mode, has duplexing deactivated for it via the Deactivate Duplexing (DDPLX) command, STEP 816. This command breaks the bind between the primary and secondary structure instances, and informs the coupling facility that the structure is henceforth to operate in simplex mode.

The structure is unquiesced, so that new requests against the structure may execute in simplex mode. Requests which were delayed during the Quiesce for Stop and Stop phases are now redriven from the delay queue, STEP 818.

Requests on the "hold" queue are either redriven against the structure in simplex mode, or completed back to the user without being redriven, depending on the state of processing that had occurred prior to being placed on the hold queue, STEP 820. Recall that the hold queue is used to contain requests that were being processed, or had been processed, perhaps unsuccessfully, against the duplexed structure, while in the Duplex Established phase. Now that the structure has reverted to simplex mode using the primary structure, the results of the "held" requests are examined to determine whether or not the request processed successfully against the primary structure instance, prior to being placed on the hold queue. If so, then there is no need to redrive the request against the primary structure (now the simplex structure) again, the system simply returns the stored results of the request to the exploiter. If not, then the request is setup for redrive against the former primary structure in simplex mode.

The secondary structure instance, which is no longer needed, is deallocated, STEP 822.

Upon completion of the Stop phase, the users are presented with an event exit event, Structure State Change Notification, to inform them that the structure has reverted to simplex mode. The information presented in this event refers to the former primary structure instance as the surviving structure.

The above describes processing for switching/stopping to fall out of duplexing when the structure is currently in the Duplex Established phase at the time of the switch/stop request. Requests to switch or stop to fall out of duplexing can also occur during other phases of the overall system-managed duplexing rebuild process. Such requests will be handled as follows by aspects of the present invention:

Requests to switch to the secondary structure
  Prior to the Duplex Established phase
    A request to switch to the secondary structure received prior to the Duplex Established phase is rejected, since the secondary copy of the structure is not viable (fully synchronized), yet. It, therefore, cannot serve as the simplex copy of the structure.
  During Switch/Cleanup phases
    A request to switch to the secondary structure received during these phases is rejected, since it is requesting processing that is already in progress.
  During Quiesce for Stop/Stop phases
    A request to switch to the secondary structure received during these phases is rejected, since it is requesting processing that is contrary to stop processing that is already in progress.
Requests to stop to fall back to the primary structure
  Prior to the Duplex Established phase
    A request to fall back to the primary structure received during these phases is accepted and processed. However, several of the process steps normally associated with stop processing may not be processed in this case where Duplex Established had not yet been reached. For example, internal control structures are not updated to reflect simplex mode processing using the primary structure (STEP 814), since they have not been updated to reflect duplexed processing yet; the structure is not quiesced, if it has already been quiesced; the Deactivate Duplexing (DDPLX) command is not performed for the structure (STEP 816), if duplexing has not yet been activated via the Activate Duplexing command; "held" requests are not processed (STEP 820), since there cannot possibly be any held requests if the Duplex Established phase was not reached; and the secondary structure is not deallocated (STEP 822), if it had not yet been allocated.

During Switch/Cleanup phases

A request to fall back to the primary structure received during these phases is rejected, since it is requesting processing that is contrary to stop processing that is already in progress.

During Quiesce for Stop/Stop phases

A request to fall back to the primary structure received during these phases is rejected, since it is requesting processing that is already in progress.

The operating system also handles failure conditions (structure failure, coupling facility failure, loss of connectivity) that affect one or the other of the structure instances in an appropriate manner, based on the phase of the duplexing rebuild process:

Prior to reaching the Duplex Established phase, the secondary copy of the structure is not yet viable, so failures affecting the primary structure result in failure events being presented to the connectors, as if the structure were simplex (which, in effect, it still is). A switch to the secondary structure cannot be made, and thus, there is no hiding of these failure conditions, at this time.

While falling out of duplexing back to simplex mode, either during Switch/Cleanup or Quiesce for Stop/Stop phases, failures affecting the structure which is going to be deallocated are ignored; while failures affecting the structure which is to survive in simplex mode are deferred and result in the presentation of failure events after the structure has been returned to simplex mode.

As described in detail above, failures affecting a structure while in the Duplex Established phase result in duplexing failover processing, with no failure events presented to the connectors. Such failures are hidden from the exploiters via the duplexing failover mechanism.

Connecting to a Structure in the Duplex Established Phase

In one aspect of the present invention, when a new instance of an exploiter attempts to connect to a duplexed structure during the Duplex Established phase of a system-managed duplexing rebuild process, the operating system transparently connects the new user to either: both of the duplexed structure instances, in duplex mode; or if that is not possible, to a simplex structure (either the former primary or former secondary structure instance).

In the case where the new user is successfully connected to both instances of the duplexed pair of structures, the outward appearance to the user is largely the same as if the structure had been in simplex mode, but with composite structure attributes being presented to the user in the connect response information. The rules for formulating this composite structure attribute information are the same composition rules as described above in the context of the presentation of the Structure State Change Notification event to active connectors on entry to the Duplex Established phase.

In the event that a new connector is able to be connected to one structure instance or the other of the duplex pair, but not both (e.g., due to lack of connectivity to one or the other of the coupling facilities), the operating system transparently falls out of duplexing, allowing the connect request to succeed to the one simplex structure instance that the connector is able to access. Once the new user is connected to the structure in simplex mode, the operating system attempts to reduplex the structure (if appropriate) into another suitable coupling facility to which the connectors, including the new one, have access. If it is not possible to reestablish duplexing in this way, the net result is that, in one aspect of the present invention, the allowing of new connectors to connect to the structure (and thus, to provide service to their clients), is favored over maintaining the duplexed state of the structure.

Figure 9:
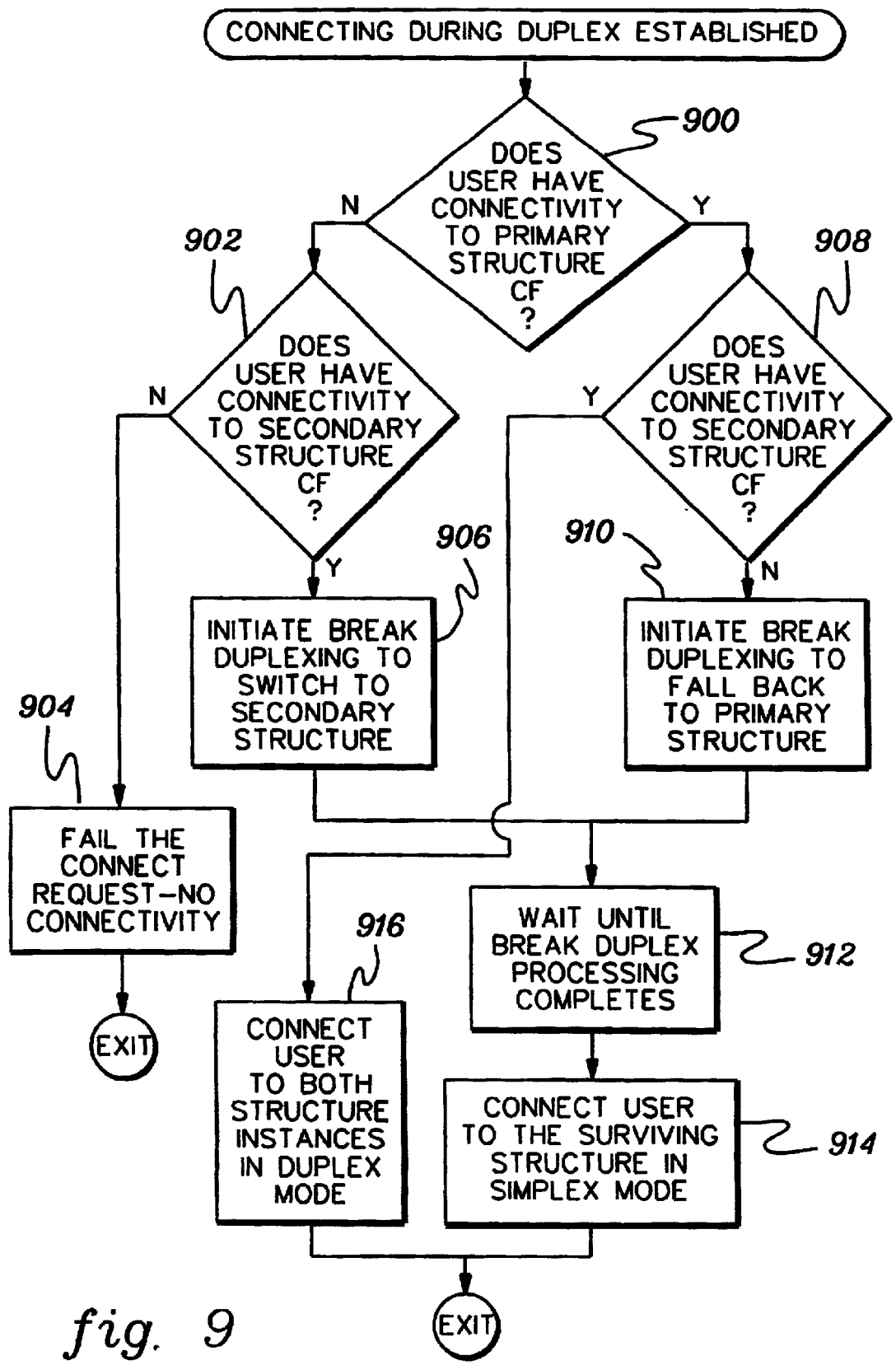
FIG. 9 depicts one embodiment of the processing associated with connecting to a duplexed structure during the Duplex Established phase, in accordance with an aspect of the present invention.

One embodiment of the logic associated with connecting to a duplexed structure during the Duplex Established phase is described with reference to FIG. 9. Initially, a determination is made as to whether the new user who is connecting to the structure has connectivity to the coupling facility where the primary structure resides, INQUIRY 900. If not, then a further determination is made as to whether the new user who is connecting to the structure has connectivity to the coupling facility where the secondary structure resides, INQUIRY 902. If not, then the user has no connectivity to either structure instance, and the operating system fails the connect request due to this total lack of relevant coupling facility connectivity, STEP 904.

However, if the user does have connectivity to the secondary structure at INQUIRY 902, then the system initiates break duplexing to switch to the secondary structure instance, STEP 906, in order to allow this user to connect in simplex mode to the secondary structure.

Returning to INQUIRY 900, if the user does have connectivity to the primary structure, then a further determination is made as to whether the new user who is connecting to the structure has connectivity to the coupling facility where the secondary structure resides, INQUIRY 908. If not, then the system initiates break duplexing to fall back to the primary structure instance, STEP 910, in order to allow this user to connect in simplex mode to the primary structure.

In either case where break duplexing processing was initiated, STEPS 906, 910, connect processing waits until this processing completes, STEP 912, and then proceeds to connect the new user to the surviving structure instance (be it the former primary or former secondary) in simplex mode, STEP 914. In this case, the system builds control structures that reflect the fact that the structure is operating in simplex mode.

If, however, the user had connectivity to the secondary structure's coupling facility at INQUIRY 908, then the new user has connectivity to both structure instances of the duplexed pair, and connect processing proceeds to connect the new user to both of the structure instances in duplex mode, STEP 916. In this case, the system builds control structures that reflect the fact that the structure is operating in duplex mode with two structure instances being used. Accordingly, coupling facility access requests made by the new connector are transparently split and processed as duplexed requests, as described earlier. Also note that the structure attributes returned to the new user via the connect response information will reflect the composite attributes of the duplexed structure, using the composition rules described earlier.

Duplex Enabled Monitoring/Duplex Feasibility Checking

As one aspect of the present invention, the operating system periodically monitors all allocated coupling facility structures (or a subset of structures in another embodiment) to evaluate whether any structures that are currently in simplex mode should become duplexed, and if so, to determine the feasibility of starting duplexing for those simplex structures, based on current conditions.

This evaluation may determine that duplexing has now become possible for such a structure, in which case it initiates a duplexing rebuild process for the structure; or it may determine that duplexing remains infeasible at present, for any of a number of reasons, in which case it does not needlessly initiate a duplexing rebuild process for the structure which would be doomed to failure. Note that either a user-managed or a system-managed duplexing rebuild process can be initiated as a result of this feasibility checking.

The intent of duplex feasibility checking is to keep structures that are defined as "supposed to be duplexed" duplexed whenever possible, as much as is possible, without causing unnecessary system overhead by initiating duplexing rebuild processes that cannot possibly succeed in duplexing the structure because of environmental conditions that preclude successful duplexing.

Figure 10:
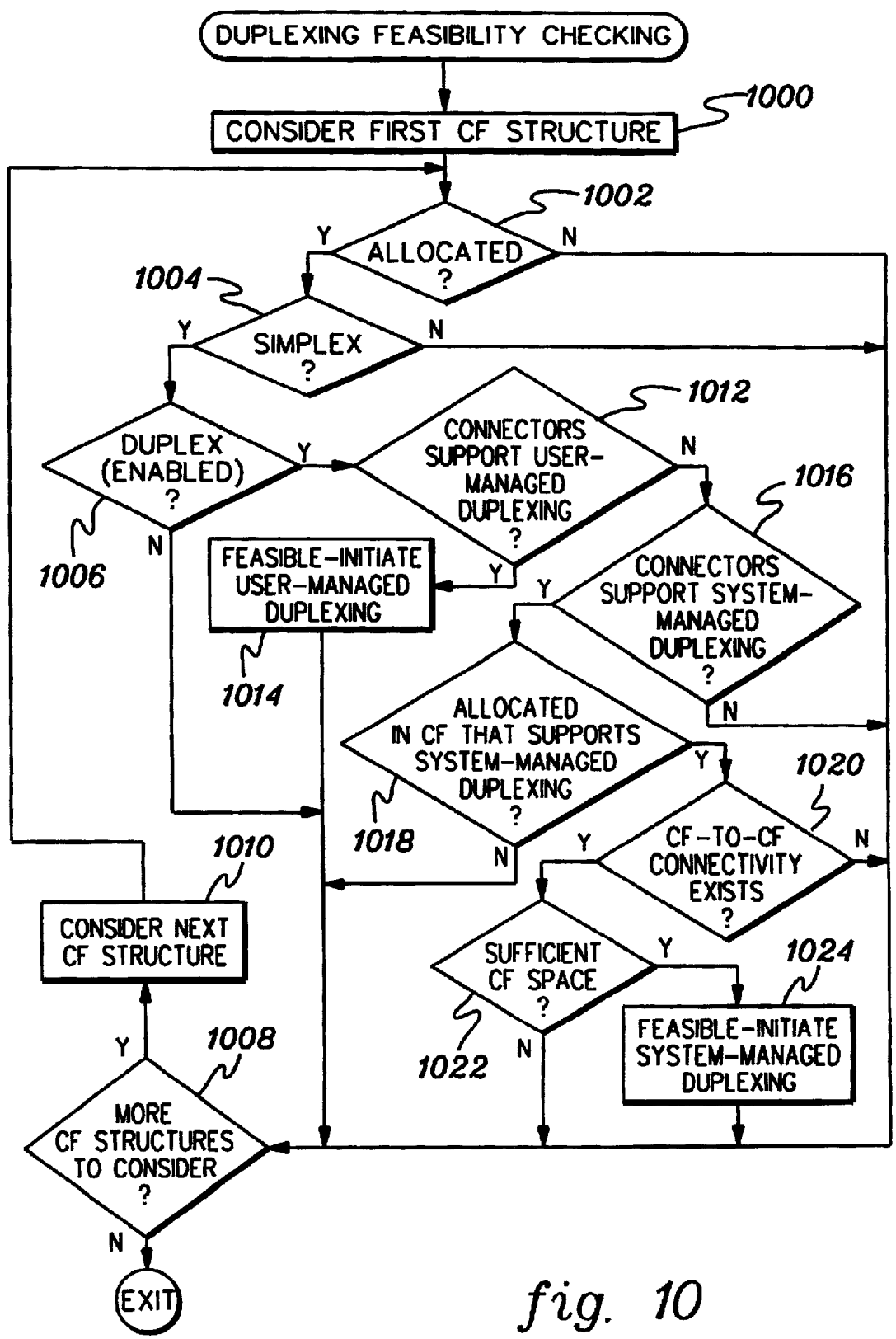
FIG. 10 depicts one embodiment of the logic associated with duplexing feasibility checking, in accordance with an aspect of the present invention.

One embodiment of the logic associated with this duplexing feasibility checking is described with reference to FIG. 10.

At periodic intervals (e.g., every 15 minutes), feasibility checking processing is run. When it runs, each coupling facility structure defined in the current CFRM policy definition is evaluated, starting with the first defined structure, STEP 1000. If the structure is allocated, INQUIRY 1002, and is currently in simplex mode, INQUIRY 1004, and is defined in the CFRM policy as DUPLEX(ENABLED), INQUIRY 1006, evaluation for the structure continues; otherwise, if any of these preliminary checks fail, processing flows to INQUIRY 1008, in which a determination is made as to whether there are more defined structures to be considered. If so, feasibility checking proceeds with considering the next structure defined by the CFRM policy, STEP 1010. If not, feasibility checking processing exits.

Returning to INQUIRY 1006, if structure evaluation continues, then a further determination is made as to whether the connectors to the structure support user-managed duplexing, INQUIRY 1012. If so, then processing flows to STEP 1014, where a user-managed duplexing rebuild, having been determined to be feasible at present, is initiated. Processing then flows to INQUIRY 1008 to consider other structures.

However, if the connectors do not support user-managed duplexing at INQUIRY 1012, then a further determination is made as to whether the connectors to the structure support system-managed duplexing, INQUIRY 1016. If not, then no type of duplexing rebuild is supported by the connectors and processing flows to INQUIRY 1008 to consider other structures. If so, then evaluation for the structure continues with additional feasibility checks applicable to system-managed duplexing.

A determination is made as to whether the structure is allocated in a coupling facility that supports system-managed duplexing (e.g., CFLEVEL=10 or higher, in support of the architected duplexing signal exchanges and protocols), INQUIRY 1018. If not, processing flows to INQUIRY 1008 to consider other structures.

If the structure is allocated in a coupling facility that supports system-managed duplexing, then a further determination is made as to whether the structure is allocated in a coupling facility that has coupling facility-to-coupling facility connectivity to one or more other coupling facilities, which appear in this structure's preference list, INQUIRY 1020. If not, processing flows to INQUIRY 1008 to consider other structures.

Should CF-to-CF connectivity exist, but none of the other coupling facilities which had coupling facility-to-coupling facility connectivity to the coupling facility in which the structure is currently allocated has sufficient space to accommodate the allocation of the secondary structure in that target coupling facility with the structure attributes required, INQUIRY 1022, then processing flows to INQUIRY 1008 to consider other structures.

If all of these feasibility checks related to system-managed duplexing are successful, then a system-managed duplexing rebuild process is initiated for the structure, STEP 1024. Processing then flows to INQUIRY 1008 to consider other structures.

Described in detail above is a system-managed duplexing capability. The creating of a duplex copy of a structure includes having the operating system maintain information about two allocated coupling facility structure instances having the same name, for some period of time. By creating the duplex copy of the structure in advance of any failure, and then maintaining the structures in a synchronized duplexed state during normal mainline operation, a robust failure recovery capability is provided through the ability to failover to the structure instance which was unaffected by the failure.

Furthermore, many of the difficult steps that formerly required exploiter support and participation (e.g., in user-managed duplexing rebuild and user-managed rebuild) are internalized into the operating system, thus greatly reducing the exploiter's cost to provide a structure duplexing capability.

System-managed duplexing rebuild thus provides both a robust failure recovery capability for coupling facility structure data and content via the redundancy that the duplexing paradigm provides, and at the same time, it provides low exploitation cost via system-managed, internalized processing. Additionally, advantageously, system-managed duplexing rebuild supports all types of coupling facility structures (e.g., list, lock, and cache).

Although in the embodiments described herein, duplexing results in two structures of two coupling facilities, this can be extended to a plurality of structures in a plurality of coupling facilities.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of duplexing coupling facility structures, said method comprising:

creating, independent of user control, an instance of a coupling facility structure, wherein said instance of the coupling facility structure and another instance of the coupling facility structure co-exist; and processing a command against the instance of the coupling facility structure and the another instance of the coupling facility structure.

2. The method of claim 1, wherein said creating is facilitated, at least in part, by one or more operating systems coupled to the coupling facility structure.

3. The method of claim 1, wherein said instance of the coupling facility structure resides in one coupling facility and said another instance of the coupling facility structure resides in another coupling facility.

4. The method of claim 3, wherein said one coupling facility and said another coupling facility are connected via one or more CF-to-CF connections.

5. The method of claim 1, wherein said creating comprises selecting a coupling facility within which said instance of the coupling facility structure is to reside.

6. The method of claim 5, wherein said selecting comprises selecting the coupling facility, by an operating system, based on one or more policy considerations.

7. The method of claim 6, wherein one policy consideration of the one or more policy considerations comprises choosing a coupling facility which is different than the coupling facility that includes said another instance of the coupling facility structure.

8. The method of claim 7, wherein one policy consideration of the one or more policy considerations comprises selecting a coupling facility for the instance of the coupling facility structure that has a CF-to-CF connection to the coupling facility including the another instance of the coupling facility structure.

9. The method of claim 7, wherein one policy consideration of the one or more policy considerations comprises choosing a coupling facility for the instance of the coupling facility structure that is failure isolated from the coupling facility including the another instance of the coupling facility structure.

10. The method of claim 1, wherein said processing comprises:

splitting said command into one instance of the command and another instance of the command; and forwarding said one instance of the command to said instance of the coupling facility structure and said another instance of the command to the another instance of the coupling facility structure.

11. The method of claim 10, wherein said splitting is transparent to a requester of said command.

12. The method of claim 10, wherein said forwarding is transparent to a requester of said command.

13. The method of claim 10, wherein said forwarding is performed substantially in parallel.

14. The method of claim 10, wherein said splitting comprises:

providing a command block and message buffer address list for each of said one instance of said command and said another instance of said command; and setting one or more operands in one or more of the command blocks to enable duplexing.

15. The method of claim 14, wherein said one or more operands comprise at least one command-specific operand.

16. The method of claim 10, further comprising:

receiving a plurality of responses from executing the one instance of the command and the another instance of the command; and forwarding to a requester of the command one response to the command.

17. The method of claim 16, further comprising reconciling the plurality of responses to obtain the one response to be forwarded.

18. The method of claim 17, wherein said reconciling comprises using a command specific reconciliation data structure to reconcile the plurality of responses into the one response.

19. The method of claim 10, further comprising converting a requested command into the command to be split.

20. The method of claim 19, wherein the converting is transparent to a requester of the requested command.

21. The method of claim 19, wherein said converting comprises:

converting the requested command into another command;

processing the another command to obtain a result; and using the result as input to the command to be split.

22. The method of claim 1, wherein said processing comprises:

determining whether one resource associated with accessing the instance of the coupling facility structure and another resource associated with accessing the another instance of the coupling facility structure are available; and continuing with the processing, in response to the one resource and the another resource being available.

23. The method of claim 22, wherein the one resource comprises one subchannel for accessing the instance and the another resource comprises another subchannel for accessing the another instance.

24. The method of claim 22, further comprising queuing the command, in response to at least one of the one resource and the another resource being unavailable.

25. The method of claim 1, wherein said coupling facility structure comprises a cache structure.

26. The method of claim 1, wherein said coupling facility structure comprises a list structure.

27. The method of claim 1, wherein said coupling facility structure comprises a lock structure.

28. A method of facilitating access to coupling facility structures, said method comprising:

splitting a command to be processed against a duplexed coupling facility structure into multiple instances of the command; and forwarding at least a plurality of instances of the multiple instances of the command to a plurality of instances of the duplexed coupling facility structure.

29. The method of claim 28, wherein said splitting is transparent to a requester of the command.

30. The method of claim 28, wherein said forwarding is transparent to a requester of the command.

31. The method of claim 28, wherein said forwarding of said at least a plurality of instances of the command is performed substantially in parallel.

32. The method of claim 28, further comprising:

receiving a plurality of responses in response to executing the plurality of instances of the command; and forwarding to a requester of the command one response to the command.

33. The method of claim 32, further comprising reconciling the plurality of responses to obtain the one response to be forwarded.

34. The method of claim 28, further comprising converting a requested command into the command to be split.

35. The method of claim 34, wherein the converting is transparent to a requester of the requested command.

36. The method of claim 34, wherein said converting comprises:
converting the requested command into another command;
processing the another command to obtain a result; and
using the result as input to the command to be split.

37. A method of providing duplexing within a computing environment, said method comprising:
duplexing a coupling facility structure, wherein one instance of the coupling facility structure is located within one coupling facility of the computing environment and another instance of the coupling facility structure is located within another coupling facility of the computing environment, the one coupling facility and the another coupling facility being coupled via one or more CF-to-CF connections;
splitting a command to be processed against the coupling facility structure into one command instance and another command instance;
forwarding, substantially in parallel, the one command instance to the one instance of the coupling facility structure and the another command instance to the another instance of the coupling facility structure; and
processing the one command instance and the another command instance.

38. The method of claim 37, further comprising:
receiving responses from the one command instance and the another command instance;
merging the responses into one response; and
forwarding the one response to a requester of the command.

39. The method of claim 38, wherein said merging comprises using a command specific reconciliation data structure to reconcile the responses into one response.

40. The method of claim 37, wherein the splitting is transparent to a requester of the command.

41. A system of duplexing coupling facility structures, said system comprising:
means for creating, independent of user control, an instance of a coupling facility structure, wherein said instance of the coupling facility structure and another instance of the coupling facility structure co-exist; and
means for processing a command against the instance of the coupling facility structure and the another instance of the coupling facility structure.

42. The system of claim 41, wherein the creating is facilitated, at least in part, by one or more operating systems coupled to the coupling facility structure.

43. The system of claim 41, wherein said instance of the coupling facility structure resides in one coupling facility and said another instance of the coupling facility structure resides in another coupling facility.

44. The system of claim 43, wherein said one coupling facility and said another coupling facility are connected via one or more CF-to-CF connections.

45. The system of claim 41, wherein said means for creating comprises means for selecting a coupling facility within which said instance of the coupling facility structure is to reside.

46. The system of claim 45, wherein said means for selecting comprises an operating system to select the coupling facility, based on one or more policy considerations.

47. The system of claim 46, wherein one policy consideration of the one or more policy considerations comprises choosing a coupling facility which is different than the coupling facility that includes said another instance of the coupling facility structure.

48. The system of claim 47, wherein one policy consideration of the one or more policy considerations comprises choosing a coupling facility for the instance of the coupling facility structure that has a CF-to-CF connection to the coupling facility including the another instance of the coupling facility structure.

49. The system of claim 47, wherein one policy consideration of the one or more policy considerations comprises choosing a coupling facility for the instance of the coupling facility structure that is failure isolated from the coupling facility including the another instance of the coupling facility structure.

50. The system of claim 41, wherein said means for processing comprises:
means for splitting said command into one instance of the command and another instance of the command; and
means for forwarding said one instance of the command to said instance of the coupling facility structure and said another instance of the command to the another instance of the coupling facility structure.

51. The system of claim 50, wherein the splitting is transparent to a requester of said command.

52. The system of claim 50, wherein the forwarding is transparent to a requester of said command.

53. The system of claim 50, wherein the forwarding is performed substantially in parallel.

54. The system of claim 50, wherein said means for splitting comprises:
means for providing a command block and message buffer address list for each of said one instance of said command and said another instance of said command; and
means for setting one or more operands in one or more of the command blocks to enable duplexing.

55. The system of claim 54, wherein said one or more operands comprise at least one command-specific operand.

56. The system of claim 50, further comprising:
means for receiving a plurality of responses from executing the one instance of the command and the another instance of the command; and
means for forwarding to a requester of the command one response to the command.

57. The system of claim 56, further comprising means for reconciling the plurality of responses to obtain the one response to be forwarded.

58. The system of claim 57, wherein said means for reconciling comprises means for using a command specific reconciliation data structure to reconcile the plurality of responses into the one response.

59. The system of claim 50, further comprising means for converting a requested command into the command to be split.

60. The system of claim 59, wherein the converting is transparent to a requester of the requested command.

61. The system of claim 59, wherein said means for converting comprises:
means for converting the requested command into another command;

means for processing the another command to obtain a result; and means for using the result as input to the command to be split.

62. The system of claim 41, wherein said means for processing comprises:

means for determining whether one resource associated with accessing the instance of the coupling facility structure and another resource associated with accessing the another instance of the coupling facility structure are available; and means for continuing with the processing, in response to the one resource and the another resource being available.

63. The system of claim 62, wherein the one resource comprises one subchannel for accessing the instance and the another resource comprises another subchannel for accessing the another instance.

64. The system of claim 62, further comprising means for queuing the command, in response to at least one of the one resource and the another resource being unavailable.

65. The system of claim 41, wherein said coupling facility structure comprises a cache structure.

66. The system of claim 41, wherein said coupling facility structure comprises a list structure.

67. The system of claim 41, wherein said coupling facility structure comprises a lock structure.

68. A system of facilitating access to coupling facility structures, said system comprising:

means for splitting a command to be processed against a duplexed coupling facility structure into multiple instances of the command; and means for forwarding at least a plurality of instances of the multiple instances of the command to a plurality of instances of the duplexed coupling facility structure.

69. The system of claim 68, wherein the splitting is transparent to a requester of the command.

70. The system of claim 68, wherein the forwarding is transparent to a requester of the command.

71. The system of claim 68, wherein the forwarding of said at least a plurality of instances of the command is performed substantially in parallel.

72. The system of claim 63, further comprising:

means for receiving a plurality of responses in response to executing the plurality of instances of the command; and means for forwarding to a requester of the command one response to the command.

73. The system of claim 72, further comprising means for reconciling the plurality of responses to obtain the one response to be forwarded.

74. The system of claim 68, further comprising means for converting a requested command into the command to be split.

75. The system of claim 74, wherein the converting is transparent to a requester of the requested command.

76. The system of claim 74, wherein said means for converting comprises:

means for converting the requested command into another command;

means for processing the another command to obtain a result; and means for using the result as input to the command to be split.

77. A system of providing duplexing within a computing environment, said system comprising:

means for duplexing a coupling facility structure, wherein one instance of the coupling facility structure is located within one coupling facility of the computing environment and another instance of the coupling facility structure is located within another coupling facility of the computing environment, the one coupling facility and the another coupling facility being coupled via one or more CF-to-CF connections;

means for splitting a command to be processed against the coupling facility structure into one command instance and another command instance;

means for forwarding, substantially in parallel, the one command instance to the one instance of the coupling facility structure and the another command instance to the another instance of the coupling facility structure; and means for processing the one command instance and the another command instance.

78. The system of claim 77, further comprising:

means for receiving responses from the one command instance and the another command instance;

means for merging the responses into one response; and means for forwarding the one response to a requester of the command.

79. The system of claim 78, wherein said means for merging comprises means for using a command specific reconciliation data structure to reconcile the responses into one response.

80. The system of claim 77, wherein the splitting is transparent to a requester of the command.

81. A system of duplexing coupling facility structures, said system comprising:

an instance of a coupling facility structure, created, independent of user control, wherein said instance of the coupling facility structure and another instance of the coupling facility structure co-exist; and a command to be processed against the instance of the coupling facility structure and the another instance of the coupling facility structure.

82. A system of facilitating access to coupling facility structures, said system comprising:

a command to be processed against a duplexed coupling facility structure, said command split into multiple instances of the command; and at least one operating system to forward at least a plurality of instances of the multiple instances of the command to a plurality of instances of the duplexed coupling facility structure.

83. A system of providing duplexing within a computing environment, said system comprising:

one instance of a duplexed coupling facility structure located within one coupling facility of the computing environment and another instance of the coupling facility structure located within another coupling facility of the computing environment, the one coupling facility and the another coupling facility being coupled via one or more CF-to-CF connections;

a command to be processed against the coupling facility structure, said command split into one command instance and another command instance;

at least one operating system to forward, substantially in parallel, the one command instance to the one instance of the coupling facility structure and the another command instance to the another instance of the coupling facility structure; and wherein the one coupling facility is to process the one command instance and the another coupling facility is to process the another command instance.

84. At least one program storage device readable by a machine tangibly embodying at least one program of instructions executable by the machine to perform a method of duplexing coupling facility structures, said method comprising:

creating, independent of user control, an instance of a coupling facility structure, wherein said instance of the coupling facility structure and another instance of the coupling facility structure co-exist; and processing a command against the instance of the coupling facility structure and the another instance of the coupling facility structure.

85. The at least one program storage device of claim 84, wherein said creating is facilitated, at least in part, by one or more operating systems coupled to the coupling facility structure.

86. The at least one program storage device of claim 84, wherein said instance of the coupling facility structure resides in one coupling facility and said another instance of the coupling facility structure resides in another coupling facility.

87. The at least one program storage device of claim 86, wherein said one coupling facility and said another coupling facility are connected via one or more CF-to-CF connections.

88. The at least one program storage device of claim 84, wherein said creating comprises selecting a coupling facility within which said instance of the coupling facility structure is to reside.

89. The at least one program storage device of claim 88, wherein said selecting comprises selecting the coupling facility, by an operating system, based on one or more policy considerations.

90. The at least one program storage device of claim 89, wherein one policy consideration of the one or more policy considerations comprises choosing a coupling facility which is different than the coupling facility that includes said another instance of the coupling facility structure.

91. The at least one program storage device of claim 90, wherein one policy consideration of the one or more policy considerations comprises selecting a coupling facility for the instance of the coupling facility structure that has a CF-to-CF connection to the coupling facility including the another instance of the coupling facility structure.

92. The at least one program storage device of claim 90, wherein one policy consideration of the one or more policy considerations comprises choosing a coupling facility for the instance of the coupling facility structure that is failure isolated from the coupling facility including the another instance of the coupling facility structure.

93. The at least one program storage device of claim 84, wherein said processing comprises:

splitting said command into one instance of the command and another instance of the command; and forwarding said one instance of the command to said instance of the coupling facility structure and said another instance of the command to the another instance of the coupling facility structure.

94. The at least one program storage device of claim 93, wherein said splitting is transparent to a requester of said command.

95. The at least one program storage device of claim 93, wherein said forwarding is transparent to a requester of said command.

96. The at least one program storage device of claim 93, wherein said forwarding is performed substantially in parallel.

97. The at least one program storage device of claim 93, wherein said splitting comprises:

providing a command block and message buffer address list for each of said one instance of said command and said another instance of said command; and setting one or more operands in one or more of the command blocks to enable duplexing.

98. The at least one program storage device of claim 97, wherein said one or more operands comprise at least one command-specific operand.

99. The at least one program storage device of claim 93, wherein said method further comprises:

receiving a plurality of responses from executing the one instance of the command and the another instance of the command; and forwarding to a requester of the command one response to the command.

100. The at least one program storage device of claim 99, wherein said method further comprises reconciling the plurality of responses to obtain the one response to be forwarded.

101. The at least one program storage device of claim 100, wherein said reconciling comprises using a command specific reconciliation data structure to reconcile the plurality of responses into the one response.

102. The at least one program storage device of claim 93, wherein said method further comprises converting a requested command into the command to be split.

103. The at least one program storage device of claim 102, wherein the converting is transparent to a requester of the requested command.

104. The at least one program storage device of claim 102, wherein said converting comprises:

converting the requested command into another command;

processing the another command to obtain a result; and using the result as input to the command to be split.

105. The at least one program storage device of claim 84, wherein said processing comprises:

determining whether one resource associated with accessing the instance of the coupling facility structure and another resource associated with accessing the another instance of the coupling facility structure are available; and continuing with the processing, in response to the one resource and the another resource being available.

106. The at least one program storage device of claim 105, wherein the one resource comprises one subchannel for accessing the instance and the another resource comprises another subchannel for accessing the another instance.

107. The at least one program storage device of claim 105, wherein said method further comprises queuing the command, in response to at least one of the one resource and the another resource being unavailable.

108. The at least one program storage device of claim 84, wherein said coupling facility structure comprises a cache structure.

109. The at least one program storage device of claim 84, wherein said coupling facility structure comprises a list structure.

110. The at least one program storage device of claim 84, wherein said coupling facility structure comprises a lock structure.

111. At least one program storage device readable by a machine tangibly embodying at least one program of instructions executable by the machine to perform a method of facilitating access to coupling facility structures, said method comprising:

splitting a command to be processed against a duplexed coupling facility structure into multiple instances of the command; and forwarding at least a plurality of instances of the multiple instances of the command to a plurality of instances of the duplexed coupling facility structure.

112. The at least one program storage device of claim 111, wherein said splitting is transparent to a requester of the command.

113. The at least one program storage device of claim 111, wherein said forwarding is transparent to a requester of the command.

114. The at least one program storage device of claim 111, wherein said forwarding of said at least a plurality of instances of the command is performed substantially in parallel.

115. The at least one program storage device of claim 111, wherein said method further comprises:

receiving a plurality of responses in response to executing the plurality of instances of the command; and forwarding to a requester of the command one response to the command.

116. The at least one program storage device of claim 115, wherein said method further comprises reconciling the plurality of responses to obtain the one response to be forwarded.

117. The at least one program storage device of claim 111, wherein said method further comprises converting a requested command into the command to be split.

118. The at least one program storage device of claim 117, wherein the converting is transparent to a requester of the requested command.

119. The at least one program storage device of claim 117, wherein said converting comprises:

converting the requested command into another command;

processing the another command to obtain a result; and using the result as input to the command to be split.

120. At least one program storage device readable by a machine tangibly embodying at least one program of instructions executable by the machine to perform a method of providing duplexing within a computing environment, said method comprising:

duplexing a coupling facility structure, wherein one instance of the coupling facility structure is located within one coupling facility of the computing environment and another instance of the coupling facility structure is located within another coupling facility of the computing environment, the one coupling facility and the another coupling facility being coupled via one or more CF-to-CF connections;

splitting a command to be processed against the coupling facility structure into one command instance and another command instance;

forwarding, substantially in parallel, the one command instance to the one instance of the coupling facility structure and the another command instance to the another instance of the coupling facility structure; and processing the one command instance and the another command instance.

121. The at least one program storage device of claim 120, wherein said method further comprises:

receiving responses from the one command instance and the another command instance;

merging the responses into one response; and forwarding the one response to a requester of the command.

122. The at least one program storage device of claim 121, wherein said merging comprises using a command specific reconciliation data structure to reconcile the responses into one response.

123. The at least one program storage device of claim 120, wherein the splitting is transparent to a requester of the command.

* * * * *

UNITED STATES PATENT AND TRADEMARK OFFICE
CERTIFICATE OF CORRECTION

PATENT NO. : 6,944,787 B2
DATED : September 13, 2005
INVENTOR(S) : Allen et al.

It is certified that error appears in the above-identified patent and that said Letters Patent is hereby corrected as shown below:

<u>Title page,</u>
Item [75], Inventors, delete "Catherine M. Moxey, Newbury (GB);".

Signed and Sealed this

Sixteenth Day of May, 2006

JON W. DUDAS
*Director of the United States Patent and Trademark Office*

UNITED STATES PATENT AND TRADEMARK OFFICE
CERTIFICATE OF CORRECTION

PATENT NO. : 6,944,787 B2
DATED : September 13, 2005
INVENTOR(S) : Allen et al.

It is certified that error appears in the above-identified patent and that said Letters Patent is hereby corrected as shown below:

Title page,
Item [75], Inventors, delete "Catherine M. Moxey, Newbury (GB);".

Signed and Sealed this

Twenty-third Day of May, 2006

JON W. DUDAS
*Director of the United States Patent and Trademark Office*